(12) United States Patent
Hattori

(10) Patent No.: US 9,049,427 B2
(45) Date of Patent: Jun. 2, 2015

(54) PLAYBACK DEVICE, PLAYBACK METHOD, AND PROGRAM FOR IDENTIFYING A STREAM

(75) Inventor: Shinobu Hattori, Tokyo (JP)

(73) Assignee: SONY CORPORATION, Tokyo (JP)

(*) Notice: Subject to any disclaimer, the term of this patent is extended or adjusted under 35 U.S.C. 154(b) by 544 days.

(21) Appl. No.: 12/995,612

(22) PCT Filed: Apr. 2, 2010

(86) PCT No.: PCT/JP2010/056080
§ 371 (c)(1),
(2), (4) Date: Dec. 1, 2010

(87) PCT Pub. No.: WO2010/116957
PCT Pub. Date: Oct. 14, 2010

(65) Prior Publication Data
US 2011/0075989 A1  Mar. 31, 2011

(30) Foreign Application Priority Data

Apr. 8, 2009  (JP) .................................. 2009-094258
Mar. 19, 2010  (JP) .................................. 2010-065113

(51) Int. Cl.
*H04N 13/00* (2006.01)
*G11B 20/12* (2006.01)
(Continued)

(52) U.S. Cl.
CPC .......... *H04N 13/004* (2013.01); *G11B 20/1252* (2013.01); *G11B 2020/10537* (2013.01);
(Continued)

(58) Field of Classification Search
CPC .................................................... H04N 19/597

USPC ................................ 386/341; 348/42, 55, 51
See application file for complete search history.

(56) References Cited

U.S. PATENT DOCUMENTS 6,573,819 B1  6/2003  Oshima et al.
6,819,395 B2 * 11/2004  Werner ......................... 352/40
(Continued)

FOREIGN PATENT DOCUMENTS

CN  1197574 A  10/1998
CN  1326298 A  12/2001
(Continued)

OTHER PUBLICATIONS

ITU-T H.264, "Series H: Audiovisual and Multimedia Systems", Infrastructure of audiovisual services—Coding of moving video, International Telecommunication Union, pp. 596-646 (Mar. 2009).

(Continued)

*Primary Examiner* — David Harvey
(74) *Attorney, Agent, or Firm* — Oblon, McClelland, Maier & Neustadt, L.L.P.

(57) ABSTRACT

The present invention relates to a playback device, a playback method, and a program, which enable a 3D content to be played by determining which stream of a basic stream and an extended stream is a left image stream in the event of displaying a 3D image for example. In the event that the value of view_type is 0, of the data stored in a DPB 151, data obtained by decoding a Base view video packet which is identified by PID=0 is output to an L video plane generating unit 161. The value 0 of the vie and w_type represents that a Base view video stream is an L view stream. In this case, data obtained by decoding a Dependent view video packet which is identified by a PID other than 0 is output to an R video plane generating unit 162. The present invention can be applied to a playback device compatible with the BD-ROM standard.

19 Claims, 77 Drawing Sheets

(51) Int. Cl.
*H04N 19/597* (2014.01)
*G11B 20/10* (2006.01)

(52) U.S. Cl.
CPC . *G11B2020/1289* (2013.01); *G11B 2220/2541* (2013.01); *H04N 13/0055* (2013.01); *H04N 19/597* (2014.11)

(56) References Cited

U.S. PATENT DOCUMENTS

| | | |
|---|---|---|
| 6,831,950 B2 * | 12/2004 | Penain et al. ............ 375/240.12 |
| 7,817,865 B2 * | 10/2010 | Yang ............................ 382/233 |
| 8,045,844 B2 * | 10/2011 | Sasaki et al. .................. 386/341 |
| 8,116,369 B2 * | 2/2012 | Choi et al. ............... 375/240.01 |
| 2002/0009137 A1 * | 1/2002 | Nelson et al. .............. 375/240.1 |
| 2006/0013490 A1 * | 1/2006 | Sun ............................... 382/232 |
| 2006/0221178 A1 * | 10/2006 | Yun et al. ....................... 348/42 |
| 2007/0147502 A1 * | 6/2007 | Nakamura ............... 375/240.12 |
| 2007/0230914 A1 * | 10/2007 | Garrido et al. ................... 386/98 |
| 2008/0089428 A1 * | 4/2008 | Nakamura et al. ........ 375/240.26 |
| 2009/0052529 A1 * | 2/2009 | Kim et al. ................. 375/240.12 |
| 2009/0190662 A1 * | 7/2009 | Park et al. ................. 375/240.16 |
| 2009/0195640 A1 * | 8/2009 | Kim et al. ....................... 348/42 |
| 2010/0086285 A1 * | 4/2010 | Sasaki et al. .................. 386/108 |
| 2010/0165077 A1 * | 7/2010 | Yin et al. ......................... 348/42 |
| 2010/0195900 A1 * | 8/2010 | Kim et al. ..................... 382/154 |
| 2011/0075989 A1 * | 3/2011 | Hattori ........................... 386/240 |
| 2011/0134214 A1 * | 6/2011 | Chen et al. ...................... 348/43 |
| 2011/0222605 A1 * | 9/2011 | Kashiwagi et al. ...... 375/240.16 |
| 2011/0234760 A1 * | 9/2011 | Yang et al. ....................... 348/46 |
| 2011/0242105 A1 * | 10/2011 | Takahashi et al. ............. 345/427 |
| 2011/0261158 A1 * | 10/2011 | Suh et al. ......................... 348/43 |
| 2011/0279646 A1 * | 11/2011 | Suh et al. ......................... 348/43 |
| 2012/0062711 A1 * | 3/2012 | Ikeda et al. ..................... 348/51 |
| 2012/0069903 A1 * | 3/2012 | Lim et al. ................. 375/240.12 |
| 2012/0092453 A1 * | 4/2012 | Suh ................................. 348/43 |
| 2013/0101015 A1 * | 4/2013 | He et al. .................... 375/240.02 |

FOREIGN PATENT DOCUMENTS

| | | |
|---|---|---|
| CN | 1659819 A | 8/2005 |
| EP | 1 094 674 A2 | 4/2001 |
| JP | 2007 166651 | 6/2007 |
| WO | 2010 038365 | 4/2010 |

OTHER PUBLICATIONS

International Search Report Issued Jun. 22, 2010 in PCT/JP10/056080 filed Apr. 2, 2010.

Combined Office Action and Search Report issued Aug. 1, 2013 in Chinese Patent Application No. 201080001744.5 (with English-language translation).

Extended European Search Report Issued Jun. 5, 2013 in Patent Application No. 10761656.7.

Anthony Vetro, "MVC Profile/Level Definitions for Stereo", Joint Video Team (JVT) of ISO/IEC MPEG & ITU-T VCEG, XP090007423, Jul. 20-25, 2008, 4 pages.

* cited by examiner

FIG. 11

| Syntax | No. of bits | Mnemonic |
|---|---|---|
| xxxxx.mpls { | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++) { | | |
|         padding_word | 16 | bslbf |
|     } | | |
|     PlayList() | | |
|     for(i=0; i<N2; i++) { | | |
|         padding_word | 16 | bslbf |
|     } | | |
|     PlayListMark() | | |
|     for(i=0; i<N3; i++) { | | |
|         padding_word | 16 | bslbf |
|     } | | |
|     ExtensionData() | | |
|     for(i=0; i<N4; i++) { | | |
|         padding_word | 16 | bslbf |
|     } | | |
| } | | |

FIG. 12

| xxxxx.mpls{ | | |
|---|---|---|
| ... snip ... | | |
| 3D_PL_type | 2 | |
| if(3D_PL_type==01b\|\|3D_PL_type==10) { | | |
| view_type | 1 | |
| reserved_for_future_use | 157 | |
| }else{ | | |
| reserved_for_future_use | 158 | |
| } | | |
| ... snip ... | | |
| } | | |

FIG. 13

| 3D_PL_type | Meaning |
|---|---|
| 00 | 2D PlayList |
| 01 | 3D B-D1 PlayList |
| 10 | 3D B-D2 PlayList |

FIG. 14

| view_type (is_L_Base_view_flag) | Meaning |
|---|---|
| 0 | L view or 2D AVC video stream |
| 1 | R view |

FIG. 15

PlayList-Syntax

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0; | | |
|     PlayItem_id<number_of_PlayItems; | | |
|     PlayItem_id++) { | | |
|     PlayItem() | | |
|   } | | |
|   for (SubPath_id= 0; | | |
|     SubPath_id<number_of_SubPaths; | | |
|     SubPath_id++) { | | |
|     SubPath() | | |
|   } | | |
| } | | |

FIG. 16

SubPath-Syntax

| Syntax | No. of bits | Mnemonic |
|---|---|---|
| SubPath() { | | |
|   length | 32 | uimsbf |
|   reserved_for_future_use | 8 | bslbf |
|   SubPath_type | 8 | uimsbf |
|   reserved_for_future_use | 15 | uimsbf |
|   is_repeat_SubPath | 1 | bslbf |
|   reserved_for_future_use | 8 | bslbf |
|   number_of_SubPlayItems | 8 | uimsbf |
|   for(i=0;i< number_of_SubPlayItems;i++) { | | |
|     SubPlayItem(i) | | |
|   } | | |
| } | | |

FIG. 17

SubPlayItem(i)-Syntax

| Syntax | No. of bits | Mnemonic |
|---|---|---|
| SubPlayItem(i) { | | |
|     length | 16 | uimsbf |
|     Clip_Information_file_name[0]        //subclip_entry_id=0 | 8*5 | bslbf |
|     Clip_codec_identifier[0] | 8*4 | bslbf |
|     reserved_for_future_use | 31 | bslbf |
|     is_multi_Clip_entries | 1 | bslbf |
|     ref_to_STC_id[0] | 8 | uimsbf |
|     SubPlayItem_IN_time | 32 | uimsbf |
|     SubPlayItem_OUT_time | 32 | uimsbf |
|     sync_PlayItem_id | 16 | uimsbf |
|     sync_start_PTS_of_PlayItem | 32 | uimsbf |
|     if(is_multi_Clip_entries==1b) { | | |
|         reserved_for_future_use | 8 | bslbf |
|         num_of_Clip_entries | 8 | uimsbf |
|         for(subclip_entry_id=1;//Note:Entries after subclip_entry_id=0 | | |
|         subclip_entry_id<num_of_Clip_entries;subclip_entry_id ++) { | | |
|             Clip_Information_file_name[subclip_entry_id] | 8*5 | bslbf |
|             Clip_codec_identifier[subclip_entry_id] | 8*4 | bslbf |
|             ref_to_STC_id[subclip_entry_id] | 8 | uimsbf |
|             reserved_for_future_use | 8 | bslbf |
|         } | | |
|     } | | |
| } | | |

FIG. 18

PlayItem-Syntax

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     }else{ | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|         angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 19

STN_table()

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (audio_stream_id2=0;<br>        audio_stream_id2 < number_of_audio_stream2_entries;<br>        audio_stream_id2++) { | | |
|         stream_entry() | | |
|         stream_attributes() | | |
|     } | | |
|     for (PG_textST_stream_id=0;<br>        PG_textST_stream_id < number_of_PG_textST_stream_entries;<br>        PG_textST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |
| } | | |

FIG. 38

Frame-rate Progressive/Interlace

| MAXIMUM FIELD NUMBER TO BE DISPLAYED WITHIN 1 GOP | | |
|---|---|---|
| 29.97 | Interlace | 60 |
| 25 | Interlace | 50 |
| MAXIMUM FRAME NUMBER TO BE DISPLAYED WITHIN 1 GOP | | |
| 59.94 | Progressive | 60 |
| 50 | Progressive | 50 |
| 23.976 | Progressive | 24 |
| 24 | Progressive | 24 |

FIG. 62
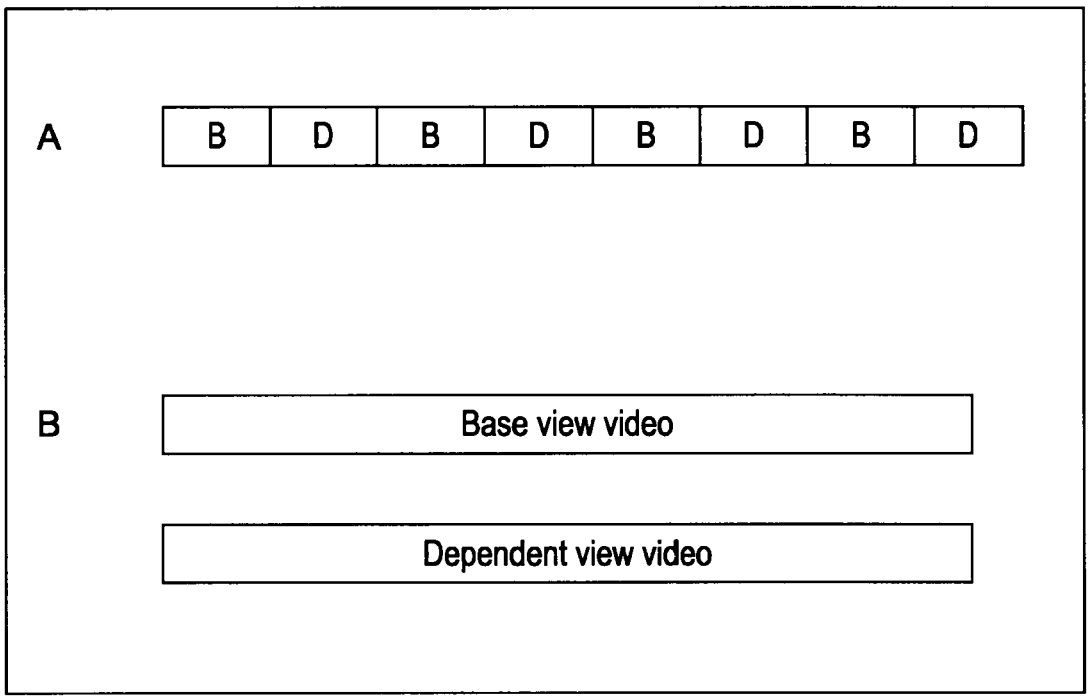
FIG. 63
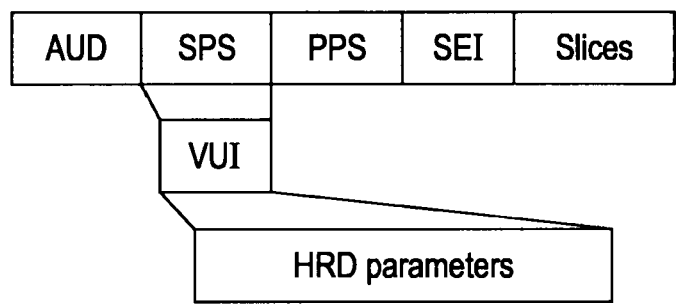
FIG. 64
```
seq_parameter_set_data() {           vui_parameters() {
  ...                                  ...
  vui_parameters()                     hrd_parameters()
  ...                                  ...
}                                    }
```

Base view video STREAM

Dependent view video STREAM

FIG. 69

```
subset_seq_parameter_set_data( ) {
  ...
  seq_parameter_set_data()
  ...
  mvc_vui_parameters_extension()  ─────►  mvc_vui_parameters_extension( ) {
  ...                                       ...
}                                           hrd_parameters()
                                            ...
                                          }
```

FIG. 71

```
subset_seq_parameter_set_data() {
  ...
  seq_parameter_set_data()  ────→  vui_parameters() {
  ...                                  ...
  mvc_vui_parameters_extension()       max_dec_frame_buffering
  ...                                  ...
}                                    }
```

FIG. 86

```
program_stream_map () {
  ...
  for (i=0; i<N; i++) {
    descriptor ()
  }
  ...
  for (i=0; i<N2; i++) {
    descriptor ()
  }
}
```

```
MVC_video_stream_descriptor () {
  descriptor_tag
  descriptor_length
  view_type
  ...
}
```

PLAYBACK DEVICE, PLAYBACK METHOD, AND PROGRAM FOR IDENTIFYING A STREAM

TECHNICAL FIELD

The present invention relates to a playback device, a playback method, and a program, and specifically relates to a playback device, a playback method, and a program, which enable a 3D content to be played by determining which stream of a basic stream and an extended stream is a left image stream in the event of displaying a 3D image for example.

BACKGROUND ART

Two-dimensional image contents are the mainstream as contents, such as movies and so forth, but recently, stereoscopic image contents enabling stereoscopic vision have attracted attention.

A dedicated device is necessary for display of a stereoscopic image, and as an example of such a stereoscopic device there is an IP (Integral Photography) stereoscopic image system developed by NHK (Japan Broadcasting Corporation).

The image data of a stereoscopic image is made up of the image data of multiple view points (the image data of an image shot from multiple view points), the greater the number of view points, and also the wider the range that the view points cover, a subject can be viewed from more various directions, and accordingly, a sort of "television which can be looked into" can be realized.

Of stereoscopic images, the least number of view points is a stereo image (so-called 3D image) of which the number view points is two. The image data of a stereo image is made up of the data of a left image that is an image observed by the left eye, and the data of a right image that is an image observed by the right eye.

On the other hand, a high-resolution image content has great data amount, and accordingly, in order to record such a great data amount content, a large capacity recording medium is necessary.

As a such a large capacity recording medium, there is Blu-Ray (registered trademark) Disc (hereafter, also referred to as BD) such as BD (Blu-Ray (registered trademark))-ROM (Read Only Memory) or the like.

CITATION LIST

Patent Literature

PTL 1: Japanese Unexamined Patent Application Publication No. 2005-348314

SUMMARY OF INVENTION

Technical Problem

Incidentally, with the BD standard, it has not been stipulated how to record the image data of a stereoscopic image including a stereo image in a BD, or how to play it.

For example, the image data of a stereo image is made up of two data streams of the data stream of a left image, and the data stream of a right image. Therefore, it is necessary to define a decoder model whereby a stereo image can by displayed by playing these two data streams, and to mount a decoder in accordance with this model on a playback device.

The present invention has been made in light of such a situation, and enables a 3D content to be played by determining which stream of a basic stream and an extended stream is a left image stream in the event of displaying a 3D image for example.

Solution to Problem

A playback device according to a first aspect of the present invention includes: obtaining means configured to obtain a basic stream and an extended stream obtained by encoding a plurality of video data using a predetermined encoding method; decoding means configured to decode the basic stream and the extended stream obtained by the obtaining means; and switching means configured to switch the output destination of the data of decoding results by the decoding means based on a flag representing which stream of the basic stream and the extended stream is a left image stream and which stream is a right image stream.

The playback device further includes: first generating means configured to generate a left image plane; and second generating means configured to generate a right image plane. In this case, the playback device may cause the switching means to output the data of the decoding results of one stream of the basic stream and the extended stream, represented by the flag to the effect that this stream is a left image stream, to the first generating means, and to output the data of the decoding results of the other stream to the second generating means.

The playback device may cause the switching means to identify whether the data decoded by the decoding means is the data of the decoding results of the basic stream or the data of the decoding results of the extended stream, based on PIDs.

The playback device may cause the switching means to identify whether the data decoded by the decoding means is the data of the decoding results of the basic stream or the data of the decoding results of the extended stream, based on the identification information of a viewpoint set to the extended stream at the time of encoding.

The playback device may cause the switching means to identify the data of the decoding results of the extended stream based on the identification information of the viewpoint that has been set, and to identify the data of the decoding results of a stream to which the identification information of the viewpoint has not been set as the data of the decoding results of the basic stream.

The playback device may cause the obtaining means to read out and obtain the basic stream and the extended stream from a mounted recording medium, and also to read out playback control information to be used for playback control of the basic stream and the extended stream, in which the flag is described, from the recording medium, and may cause the switching means to switch the output destination of the data of the decoding results by the decoding means based on the flag described in the playback control information read out from the recording medium by the obtaining means.

The playback device may cause the obtaining means to obtain additional information in which the flag is described, which is added to each stream of at least any of the basic stream and the extended stream, and may cause the switching means to switch the output destination of the data of the decoding results by the decoding means based on the flag described in the additional information obtained by the obtaining means.

The playback device may cause the obtaining means to obtain additional information in which the flag is described, which is added to each stream of at least any of the basic stream and the extended stream which have been broadcast.

The playback device may cause the obtaining means to receive and obtain the basic stream and the extended stream which have been transmitted, and also to receive transmission control information to be used for transmission control of the basic stream and the extended stream, in which the flag is described, and may cause the switching means to switch the output destination of the data of the decoding results by the decoding means based on the flag described in the transmission control information received by the obtaining means.

The playback device may cause the obtaining means to receive and obtain the basic stream and the extended stream which have been transmitted via broadcast waves, and also to receive transmission control information to be used for transmission control of the basic stream and the extended stream, in which the flag is described.

A playback method according to an aspect of the present invention includes the steps of: obtaining a basic stream and an extended stream obtained by encoding a plurality of video data using a predetermined encoding method; decoding the basic stream and the extended stream which have been obtained; and switching the output destination of the data of decoding results based on a flag representing which stream of the basic stream and the extended stream is a left image stream and which stream is a right image stream.

A program according to an aspect of the present invention causes a computer to execute processing including the steps of: obtaining a basic stream and an extended stream obtained by encoding a plurality of video data using a predetermined encoding method; decoding the basic stream and the extended stream which have been obtained; and switching the output destination of the data of decoding results based on a flag representing which stream of the basic stream and the extended stream is a left image stream and which stream is a right image stream.

With an aspect of the present invention, a basic stream and an extended stream obtained by encoding a plurality of video data using a predetermined encoding method are obtained, the basic stream and the extended stream which have been obtained are decoded, and the output destination of the data of decoding results is switched based on a flag representing which stream of the basic stream and the extended stream is a left image stream and which stream is a right image stream.

Advantageous Effects of Invention

According to the present invention, a 3D content may be played by determining which stream of a basic stream and an extended stream is a left image stream in the event of displaying a 3D image for example.

BRIEF DESCRIPTION OF DRAWINGS

FIG. 11 is a diagram illustrating the syntax of a PlayList file.

FIG. 12 is a diagram illustrating an example of how to use the reserved_for_future_use in FIG. 11.

FIG. 13 is a diagram illustrating the meaning of the value of a 3D_PL_type

FIG. 14 is a diagram illustrating the meaning of the value of a view_type.

FIG. 15 is a diagram illustrating the syntax of the PlayList( ) in FIG. 11.

FIG. 16 is a diagram illustrating the syntax of the SubPath( ) in FIG. 15.

FIG. 17 is a diagram illustrating the syntax of the SubPlayItem(i) in FIG. 16.

FIG. 18 is a diagram illustrating the syntax of the PlayItem( ) in FIG. 15.

FIG. 19 is a diagram illustrating the syntax of the STN_table( ) in FIG. 18.

FIG. 38 is a diagram illustrating the maximum number of frames/fields within a GOP.

FIG. 62 is a diagram illustrating the states of a Base view video stream and a Dependent view video stream.

FIG. 63 is a diagram illustrating an example of the encoding position of HRD parameters of the Base view video stream.

FIG. 64 is a diagram illustrating a description format in the event of having encoded HRD parameters at the position illustrated in FIG. 63.

FIG. 69 is a diagram illustrating another description format in the event of having encoded HRD parameters at the position illustrated in FIG. 67.

FIG. 71 is a diagram illustrating a description format in the event of having encoded the max_dec_frame_buffering at the position illustrated in FIG. 70.

FIG. 86 is a diagram illustrating a description example of the view_type.

DESCRIPTION OF EMBODIMENTS

First Embodiment

Configuration Example of the Playback System

Figure 1:
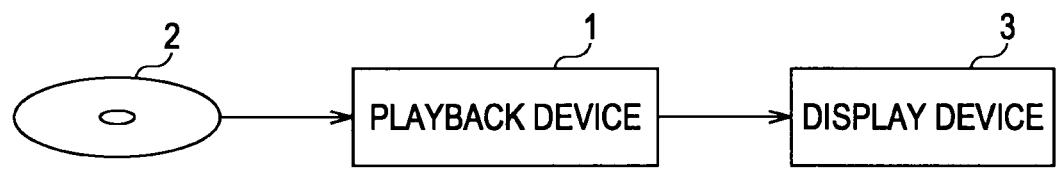
FIG. 1 is a diagram illustrating a configuration example of a playback system including a playback device to which the present invention has been applied.

FIG. 1 is a diagram illustrating a configuration example of a playback system including a playback device 1 to which the present invention has been applied.

As illustrated in FIG. 1, this playback system is configured by the playback device 1 and a display device 3 being connected by an HDMI (High Definition Multimedia Interface) cable or the like. An optical disc 2 such as BD or the like is mounted on the playback device 1.

Streams necessary for displaying a stereo image (so-called a 3D image) of which the number of view points is two are recorded in the optical disc 2.

The playback device 1 is a player compatible with 3D playback of streams recorded in the optical disc 2. The playback device 1 plays streams recorded in the optical disc 2, and displays a 3D image obtained by playback on the display device 3 made up of a television receiver or the like. Audio is also played by the playback device 1 in the same way, and is output from a speaker or the like to be provided to the display device 3.

Various methods have been proposed as a 3D image display method. Now, as a 3D image display method, the following type-1 display method and type-2 display method will be employed.

The type-1 display method is a method wherein the data of a 3D image is made up of the data of an image (L image) observed by the left eye, and the data of an image (R image) observed by the right eye, and a 3D image is displayed by alternately displaying the L image and the R image.

The type-2 display method is a method for displaying a 3D image by displaying the L image and the R image to be generated using the data of an original image that is an image serving as the origin for generating a 3D image, and the data of Depth. The data of a 3D image to be used by the type-2 display method is made up of the data of the original image, and the data of Depth that can generate the L image and R image by the original image being provided thereto.

The type-1 display method is a display method wherein glasses are necessary at the time of viewing and listening. The type-2 display method is a display method wherein a 3D image can be viewed and listened to without glasses.

Streams are recorded in the optical disc 2 whereby a 3D image can be displayed by one of the type-1 and type-2 display methods.

As an encoding method for recording such streams in the optical disc 2, for example, the H.264 AVC (Advanced Video Coding)/MVC (Multi-view Video coding) profile standard is employed.

[H.264 AVC/MVC Profile]

With the H.264 AVC/MVC profile standard, an image stream called as Base view video, and an image stream called as Dependent view video are defined. Hereafter, the H.264 AVC/MVC profile standard is simply referred to as MVC as appropriate.

Figure 2:
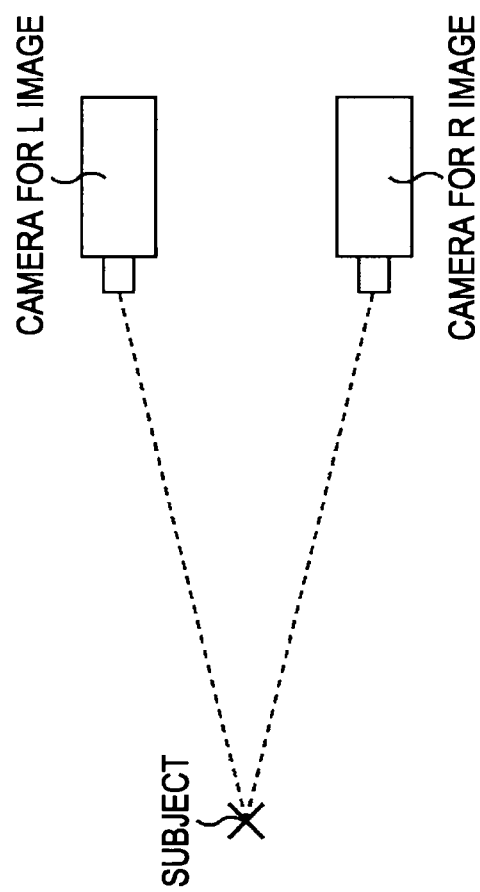
FIG. 2 is a diagram illustrating a shooting example.

FIG. 2 is a diagram illustrating a shooting example.

As illustrated in FIG. 2, shooting is performed by a camera for L image, and a camera for R image with the same subject as an object. The elementary stream of video shot by the camera for L image, and the camera for R image is input to an MVC encoder.

Figure 3:
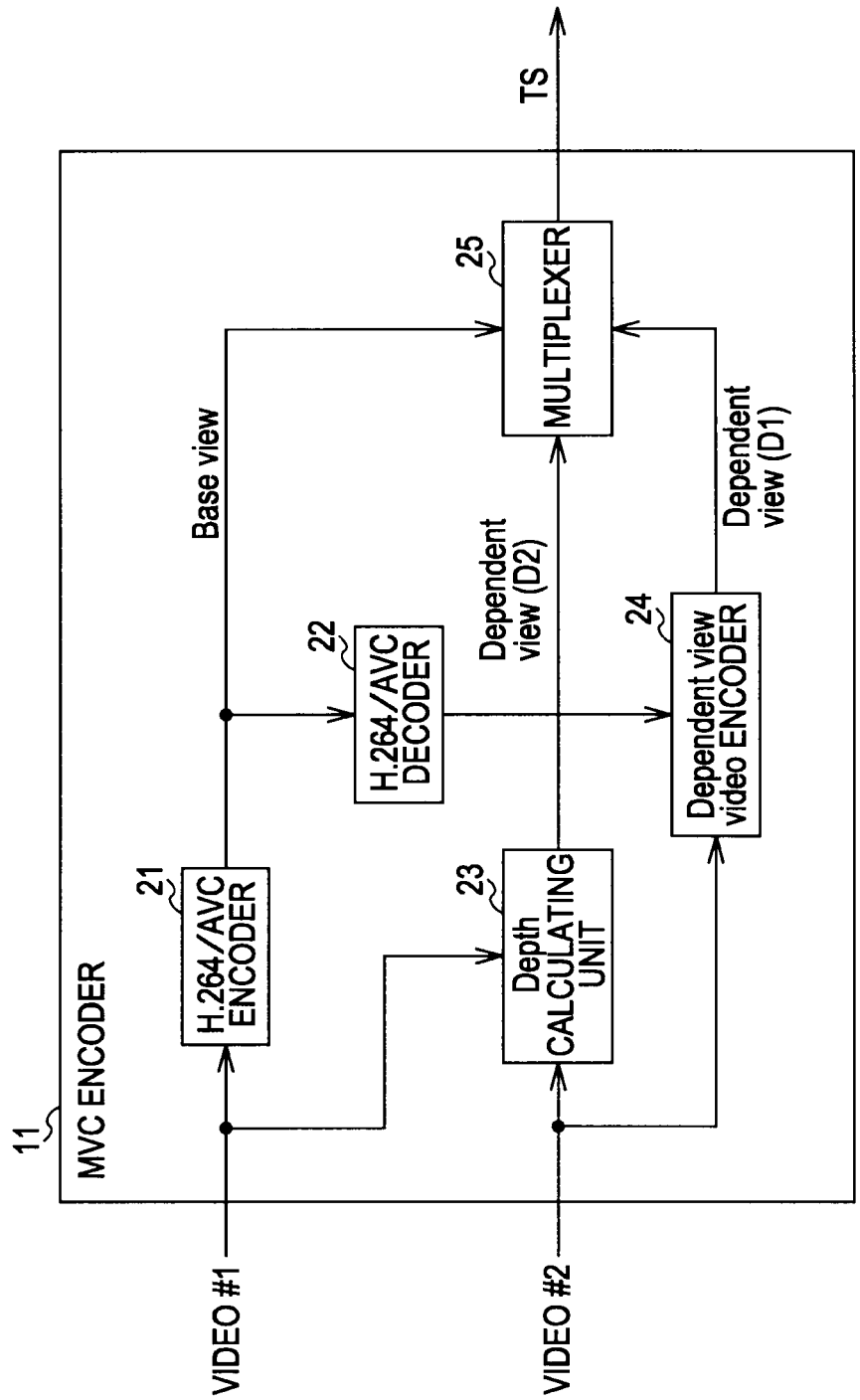
FIG. 3 is a block diagram illustrating a configuration example of a MVC encoder.

FIG. 3 is a block diagram illustrating a configuration example of the MVC encoder.

As illustrated in FIG. 3, an MVC encoder 11 is configured of an H.264/AVC encoder 21, an H.264/AVC decoder 22, a Depth calculating unit 23, a Dependent view video encoder 24, and a multiplexer 25.

The stream of video #1 shot by the camera for L image is input to the H.264/AVC encoder 21 and the Depth calculating unit 23. Also, the stream of video #2 shot by the camera for R image is input to the Depth calculating unit 23 and the Dependent view video encoder 24. An arrangement may be made wherein the stream of the video #2 is input to the H.264/AVC encoder 21 and the Depth calculating unit 23, and the stream of the video #1 is input to the Depth calculating unit 23 and the Dependent view video encoder 24.

The H.264/AVC encoder 21 encodes the stream of the video #1, for example, as a H.264 AVC/High Profile video stream. The H.264/AVC encoder 21 outputs the encoded and obtained AVC video stream to the H.264/AVC decoder 22 and the multiplexer 25 as a Base view video stream.

The H.264/AVC decoder 22 decodes the AVC video stream supplied from the H.264/AVC encoder 21, and outputs the decoded and obtained stream of the video #1 to the Dependent view video encoder 24.

The Depth calculating unit 23 calculates Depth based on the stream of the video #1, and the stream of the video #2, and outputs the calculated Depth data to the multiplexer 25.

The Dependent view video encoder 24 encodes the stream of the video #1 supplied from the H.264/AVC decoder 22, and the stream of the video #2 externally input, and outputs the Dependent view video stream.

Figure 4:
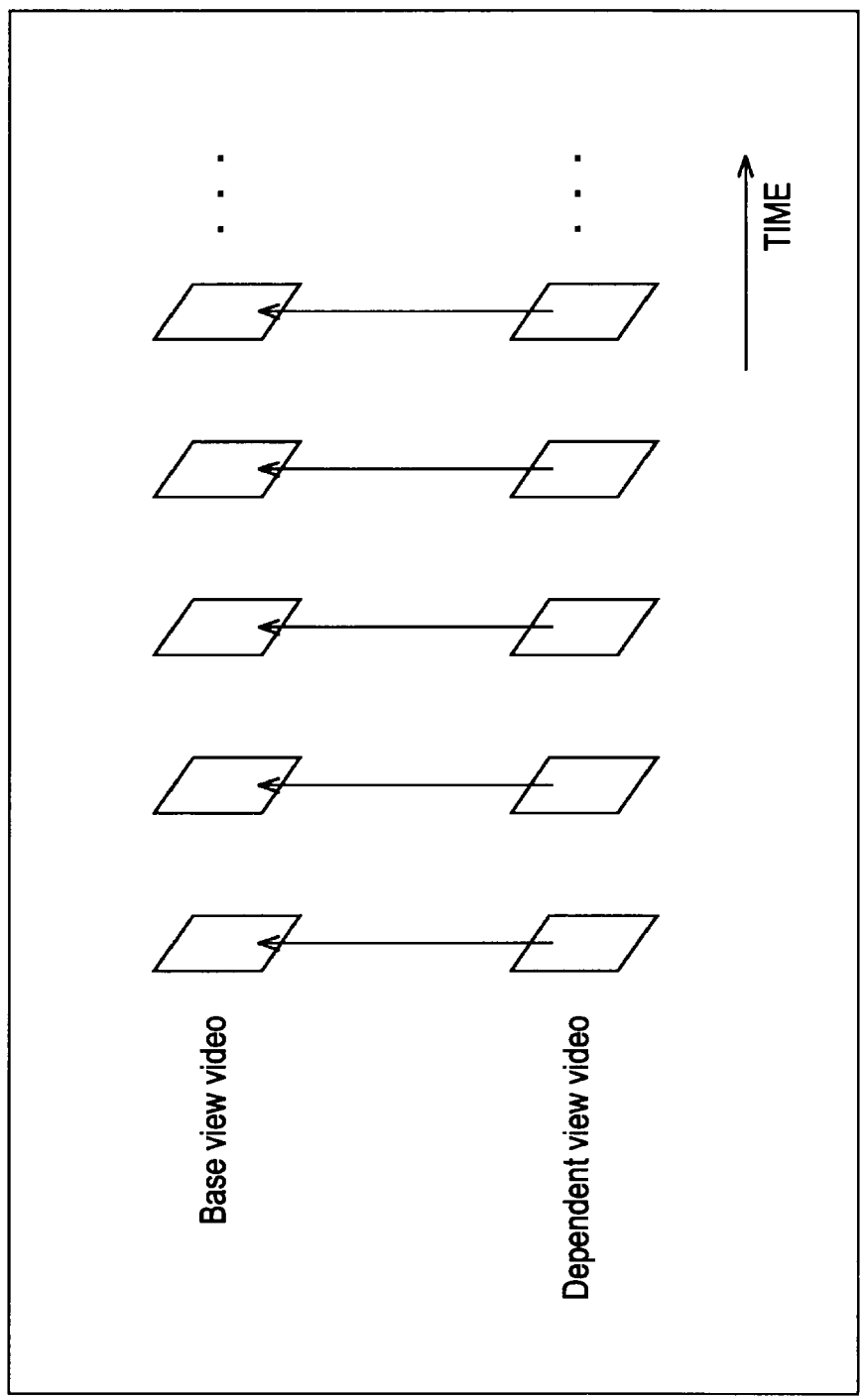
FIG. 4 is a diagram illustrating an example of reference image.

With regard to Base view video, predictive coding with another stream as a reference image is not allowed, but as illustrated in FIG. 4, with regard to Dependent view video, predictive coding with Base view video as a reference image is allowed. For example, in the event that encoding has been performed with an L image as Base view video and with an R image as Dependent view video, the data amount of the Dependent view video stream obtained as a result thereof is less than the data amount of the Base view video stream.

Note that, according to encoding with H.264/AVC, prediction in the time direction has been performed regarding Base view video. Also, with regard to Dependent view video as well, prediction in the time direction has been performed along with prediction between views. In order to decode Dependent view video, decoding of the corresponding Base view video, which has been taken as a reference destination at the time of encoding, needs to have previously been completed.

The Dependent view video encoder 24 outputs the Dependent view video stream obtained by encoding using such prediction between views to the multiplexer 25.

The multiplexer 25 multiplexes the Base view video stream supplied from the H.264/AVC encoder 21, the Dependent view video stream (data of Depth) supplied from the Depth calculating unit 23, and the Dependent view video stream supplied from the Dependent view video encoder 24, for example, as MPEG2 TS. The Base view video stream, and the Dependent view video stream may be multiplexed in a single MPEG2 TS, or may be included in a separate MPEG2 TS.

The multiplexer 25 outputs the generated TS (MPEG2 TS). The TS output from the multiplexer 25 is recorded in an optical disc 2 at the recording device along with other management data, and is provided to the playback device 1 in a manner recorded in the optical disc 2.

In the event that Dependent view video to be used along with Base view video in the type-1 display method needs to be distinguished from Dependent view video (Depth) to be used along with Base view video in the type-2 display method, the former will be referred to as D1 view video, and the latter will be referred to as D2 view video.

Also, 3D playback in the type-1 display method to be performed using Base view video and D1 view video will be referred to as B-D1 playback. 3D playback in the type-2 display method to be performed using Base view video and D2 view video will be referred to as B-D2 playback.

In the event of performing B-D1 playback according to an instruction by the user, or the like, the playback device 1 reads out and plays the Base view video stream, and the D1 view video stream from the optical disc 2.

Also, in the event of performing B-D2 playback, the playback device 1 reads out and plays the Base view video stream and the D2 view video stream from the optical disc 2.

Further, in the event of performing playback of a usual 2D image, the playback device 1 reads out and plays the Base view video stream alone from the optical disc 2.

The Base view video stream is an AVC video stream encoded by H.264/AVC, and accordingly, as long as the playback device 1 is a player compatible with the BD format, the playback device 1 can play the Based view video stream thereof to display a 2D image.

Hereafter, description will be made principally regarding a case where the Dependent view video is the D1 view video. When simply being referred to as Dependent view video, it represents D1 view video. D2 view video is also recorded in the optical disc 2 in the same way as with D1 view video, and is played.

[Configuration Example of a TS]

Figure 5:
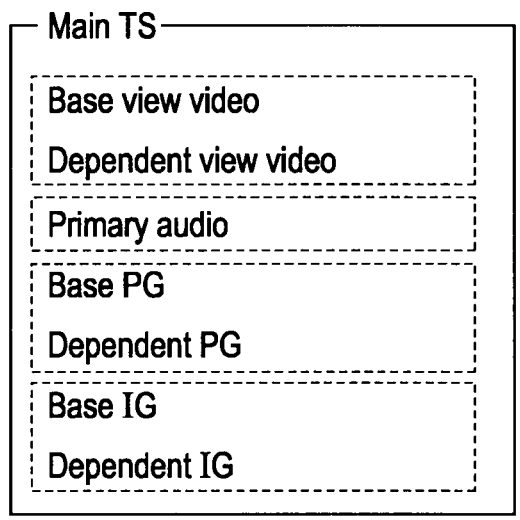
FIG. 5 is a diagram illustrating a configuration example of a TS.

FIG. 5 is a diagram illustrating a configuration example of a TS.

The streams of each of Base view video, Dependent view video, Primary audio, Base PG, Dependent PG, Base IG, and Dependent IG, are multiplexed in a Main TS in FIG. 5. As described above, the Dependent view video stream may be included in the Main TS along with the Base view video stream.

The Main TS and a Sub TS are recorded in the optical disc 2. The Main TS is a TS including at least the Base view video stream. The Sub TS is a TS including a stream other than the Base view video stream, to be used along with the Main TS.

Each of the streams of the Base view and Dependent view is prepared regarding later-described PG and IG so that display in 3D is available in the same way as with video.

The plane of Base view of PG and IG obtained by decoding each of the streams is displayed by being synthesized with the plane of Base view video obtained by decoding the Base view video stream. Similarly, the plane of Dependent view of PG and IG is displayed by being synthesized with the plane of Dependent view video obtained by decoding the Dependent view video stream.

For example, in the event that the Base view video stream is a stream of an L image, and the Dependent view video stream is a stream of an R image, with regard to PG and IG as well, the stream of the Base view thereof becomes a graphics stream of the L image. Also, a PG stream and an IG stream of Dependent view become a graphics stream of the R image.

On the other hand, in the event that the Base view video stream is a stream of an R image, and the Dependent view video stream is a stream of an L image, with regard to PG and IG as well, the stream of the Base view thereof becomes a graphics stream of the R image. Also, a PG stream and an IG stream of Dependent view become a graphics stream of the L image.

Figure 6:
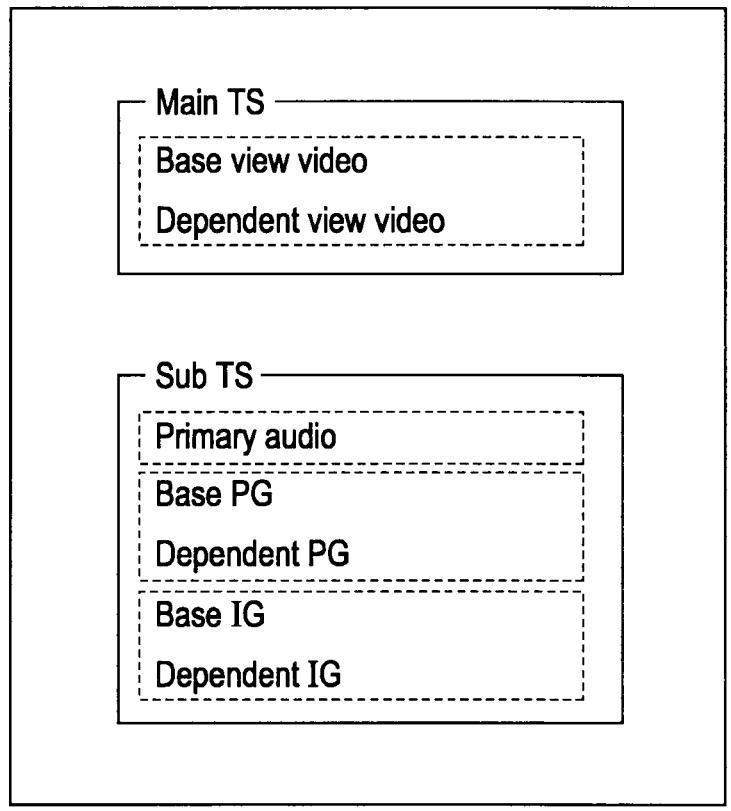
FIG. 6 is a diagram illustrating another configuration example of the TS.

FIG. 6 is a diagram illustrating another configuration example of the TS.

Each stream of Base view video and Dependent view video is multiplexed in the Main TS in FIG. 6.

On the other hand, each stream of Primary audio, Base PG, Dependent PG, Base IG, and Dependent IG is multiplexed in the Sub TS.

Thus, an arrangement may be made wherein a video stream is multiplexed in the Main TS, and the streams of PG and IG, and so forth are multiplexed in the Sub TS.

Figure 7:
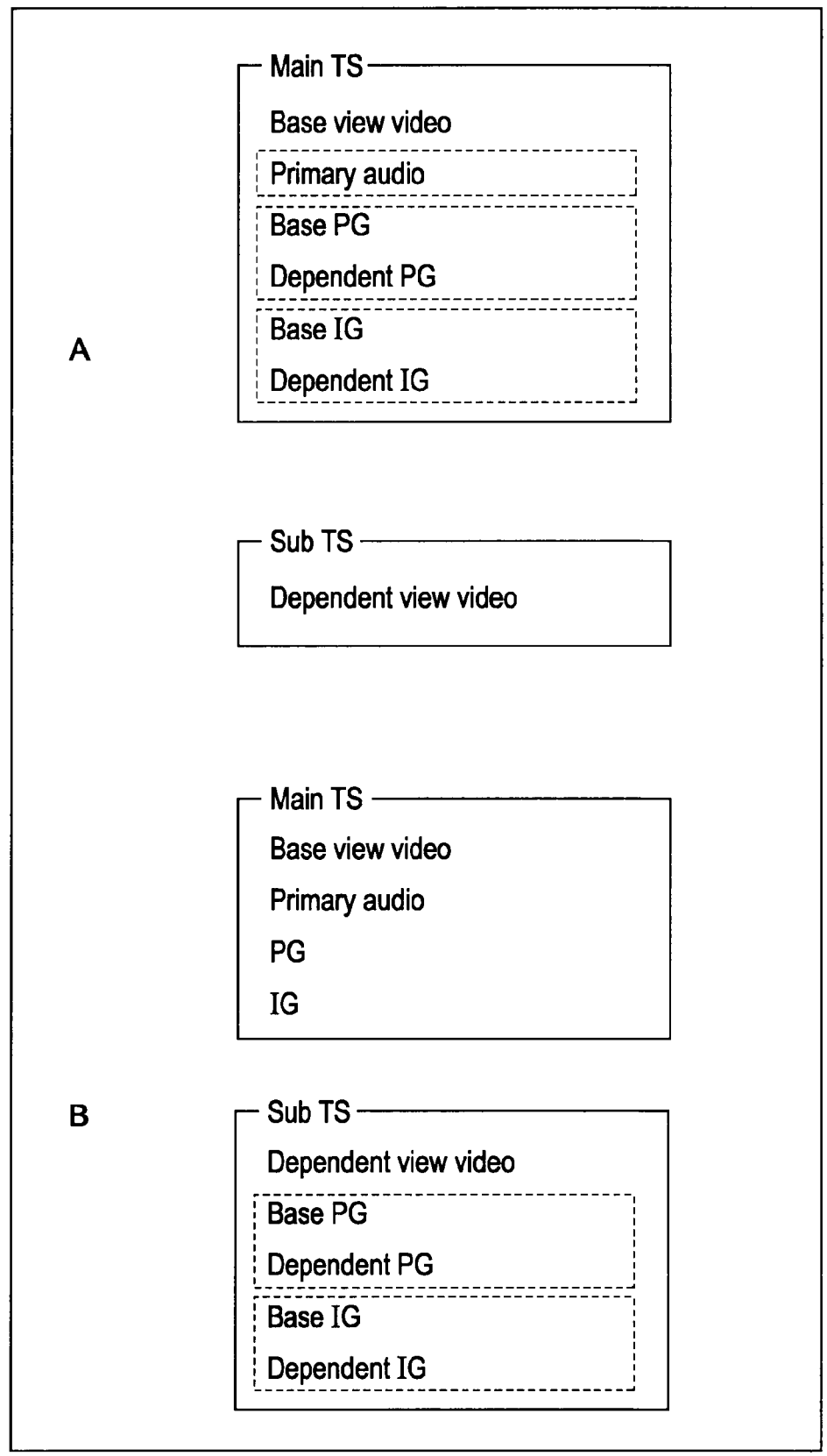
FIG. 7 is a diagram illustrating yet another configuration example of the TS.

FIG. 7 is a diagram illustrating yet another configuration example of the TS.

Each stream of Base view video, Primary audio, Base PG, Dependent PG, Base IG, and Dependent IG is multiplexed in the Main TS in A in FIG. 7.

On the other hand, the Dependent view video stream is included in the Sub TS.

Thus, the Dependent view video stream may be included in another TS different from the Base view video stream.

Each stream of Base view video, Primary audio, PG, and IG is multiplexed in the Main TS in B in FIG. 7. On the other hand, each stream of Dependent view video, Base PG, Dependent PG, Base IG, and Dependent IG is multiplexed in the Sub TS.

The PG and IG included in the Main TS are streams for 2D playback. The streams included in the Sub TS are streams for 3D playback.

Thus, a stream of PG, and a stream of IG may not be shared for 2D playback and 3D playback.

As described above, the Base view video stream and the Dependent view video stream may be included in a different MPEG2 TS. Description will be made regarding an advantage in the event that the Base view video stream and the Dependent view video stream are included in a different MPEG2 TS, and are recorded.

For example, let us consider a case where a bit rate whereby multiplexing can be performed as a single MPEG2 TS is restricted. In this case, when both of the Base view video stream and the Dependent view video stream are included in a single MPEG2 TS, the bit rate of each stream needs to be reduced to satisfy the constraint thereof. As a result thereof, the image quality deteriorates.

The bit rate does not need to be reduced due to each stream being included in different MPEG2 TSs, so the image quality can be prevented from deteriorating.

[Application Format]

Figure 8:
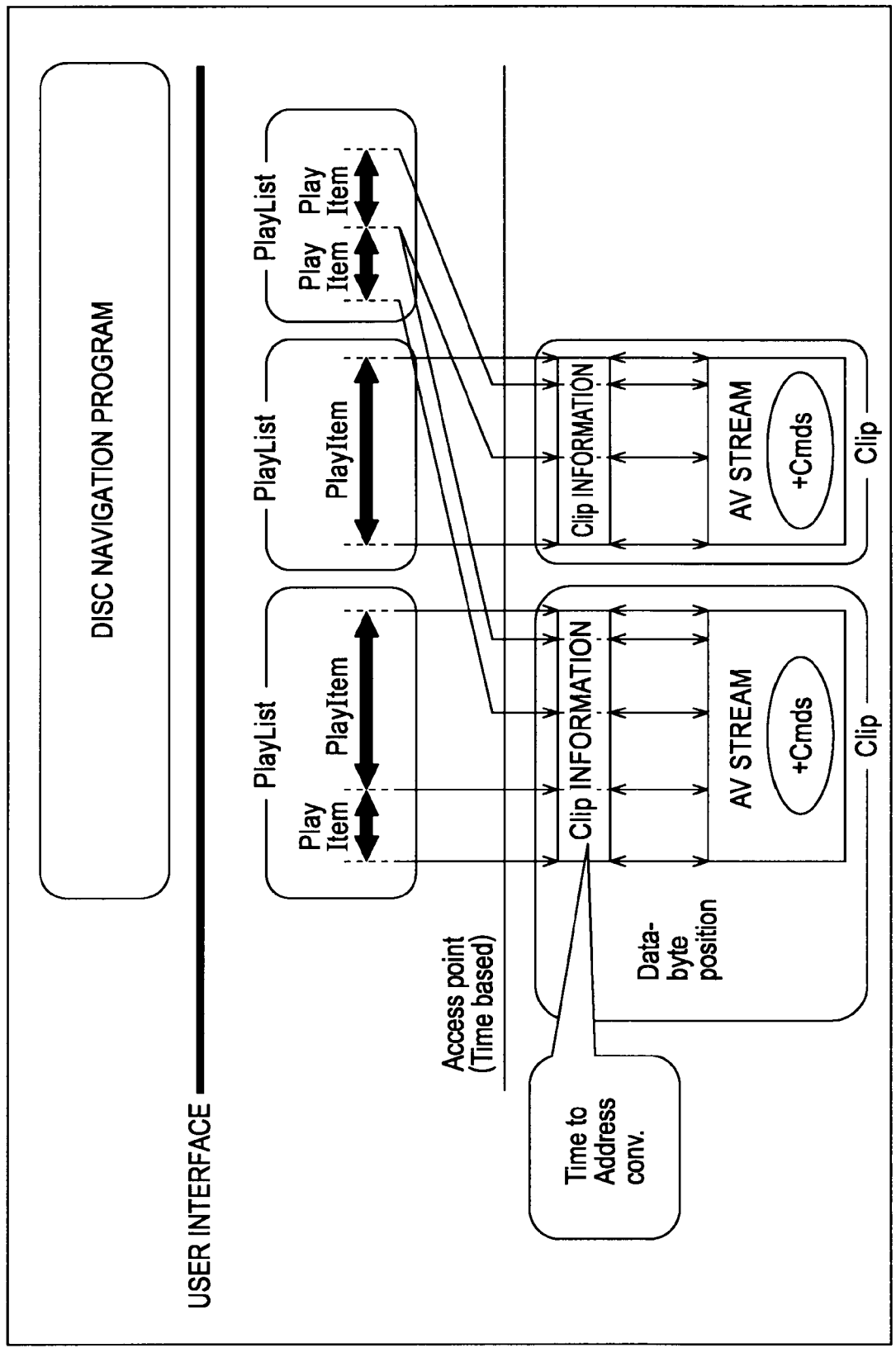
FIG. 8 is a diagram illustrating an example of AV stream management.

FIG. 8 is a diagram illustrating an example of AV stream management by the playback device 1.

The AV stream management is performed using two layers of PlayList and Clip, such as illustrated in FIG. 8. An AV stream may be recorded in a local storage of the playback device 1, not just the optical disc 2.

Here, a pair of one AV stream, and Clip Information that is information accompanied therewith is conceived as one object, and these will be referred to as Clip collectively. Hereafter, a file storing an AV stream will be referred to as an AV stream file. Also, a file storing Clip Information will also be referred to as a Clip Information file.

An AV stream is mapped on the time axis, and the access point of each Clip is specified principally by a time stamp in a PlayList. A Clip Information file is used for finding an address for starting decoding within an AV stream, and so forth.

A PlayList is a group of playback sections of an AV stream. One playback section within an AV stream will be referred to as a PlayItem. A PlayItem is represented with a pair of an In point and an Out point of a playback section on the time axis. As illustrated in FIG. 8, a PlayList is made up of a single or multiple PlayItems.

The first PlayList from the left of FIG. 8 is made up of two PlayItems, a first-half portion and a second-half portion of an AV stream included in a Clip on the left side are referenced by the two PlayItems thereof, respectively.

The second PlayList from the left is made up of one PlayItem, and according to this, the whole AV stream included in the Clip on the right side is referenced.

The third PlayList from the left is made up of two PlayItems, and according to these two PlayItems, a certain portion of the AV stream included in the Clip on the left side, and a certain portion of the AV stream included in the Clip on the right side are referenced.

For example, in the event that the PlayItem on the left side included in the first PlayList from the left has been specified by a disc navigation program as a playback object, playback of the first-half portion of the AV stream included in the Clip on the left side, which is referenced by the PlayItem thereof, is performed. Thus, PlayLists are employed as playback management information for managing playback of an AV stream.

A playback path created by an array of one or more PlayItems within a PlayList will be referred to as a Main Path.

Also, a playback path created by an array of one or more SubPlayItems within a PlayList in parallel with the Main Path will be referred to as a Sub Path.

Figure 9:
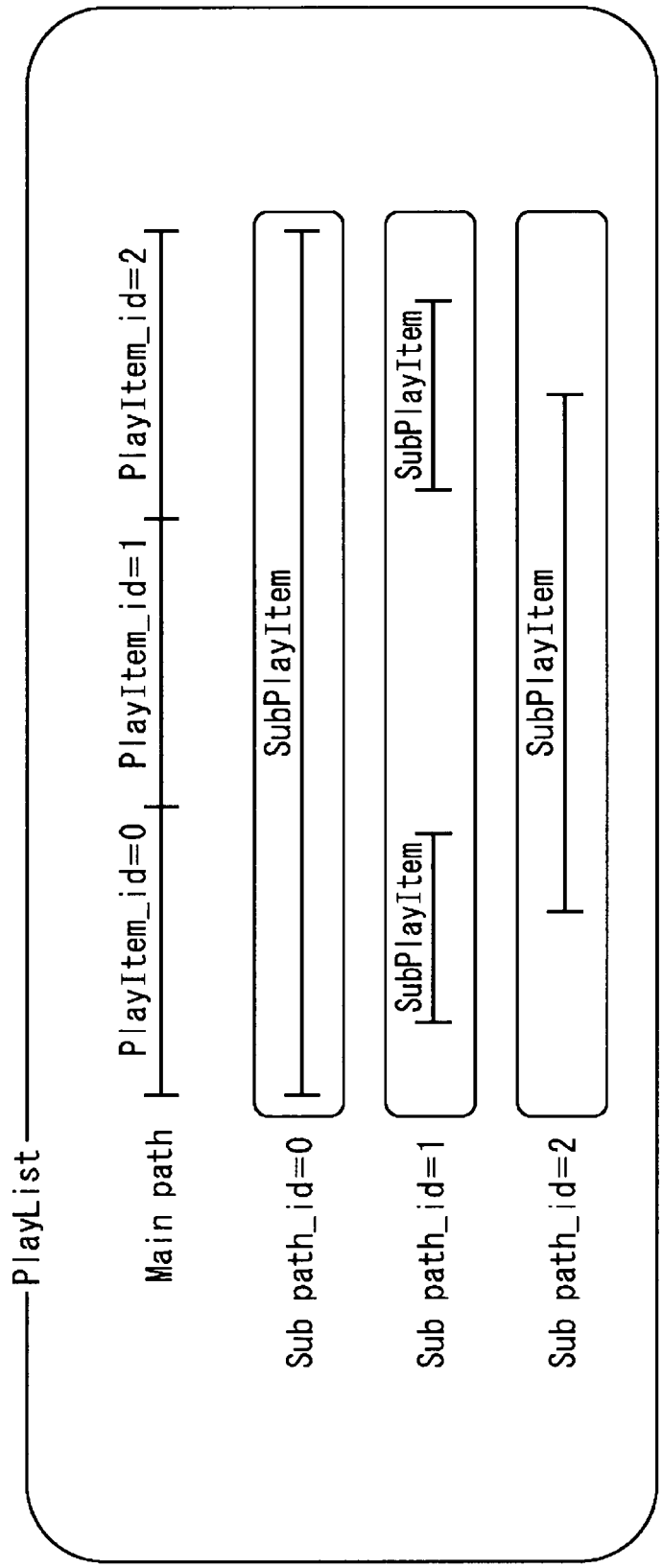
FIG. 9 is a diagram illustrating the structures of a Main Path and Sub Paths.

FIG. 9 is a diagram illustrating the structures of the Main Path and the Sub Path.

A PlayList can have one Main Path and one or more Sub Paths.

The above-mentioned Base view video stream is managed as a stream that a PlayItem making up the Main Path references. Also, the Dependent view video stream is managed as a stream that a SubPlayItem making up a Sub Path references.

The PlayList in FIG. 9 has one Main Path made up of an array of three PlayItems, and three Sub Paths.

An ID is set to each of the PlayItems making up the Main Path in order from the head. The IDs of the Subpath_id=0, Subpath_id=1, and Subpath_id=2 are also set to the Sub Paths in order from the head, respectively.

With the example in FIG. 9, one SubPlayItem is included in the Sub Path of the Subpath_id=0, and two SubPlayItems are included in the Sub Path of the Subpath_id=1. Also, one SubPlayItem is included in the Sub Path of the Subpath_id=2.

The Clip AV stream referenced by one PlayItem includes at least a video stream (main image data).

Also, the Clip AV stream may include or may not include one or more audio streams to be played at the same timing as (in sync) with a video stream included in the Clip AV stream.

The Clip AV stream may include or may not include one or more bit-mapped caption data (PG (Presentation Graphic)) streams to be played in sync with the video stream included in the Clip AV stream.

The Clip AV stream may include or may not include one or more IG (Interactive Graphic) streams to be played in sync with a video stream included in a Clip AV stream file. The IG streams are used for displaying a graphic such as a button to be operated by a user, or the like.

With the Clip AV stream referenced by one PlayItem, the video stream, zero or more audio streams to be played in sync therewith, zero or more PG streams, and zero or more IG streams are multiplexed.

Also, one SubPlayItem references a video stream, audio stream, PG stream, or the like that is a stream different from the Clip AV stream referenced by the PlayItem.

The management of an AV stream using such a PlayList, PlayItem, and SubPlayItem has been described in Japanese Unexamined Patent Application Publication No. 2008-252740, and Japanese Unexamined Patent Application Publication No. 2005-348314.

[Directory Structure]

Figure 10:
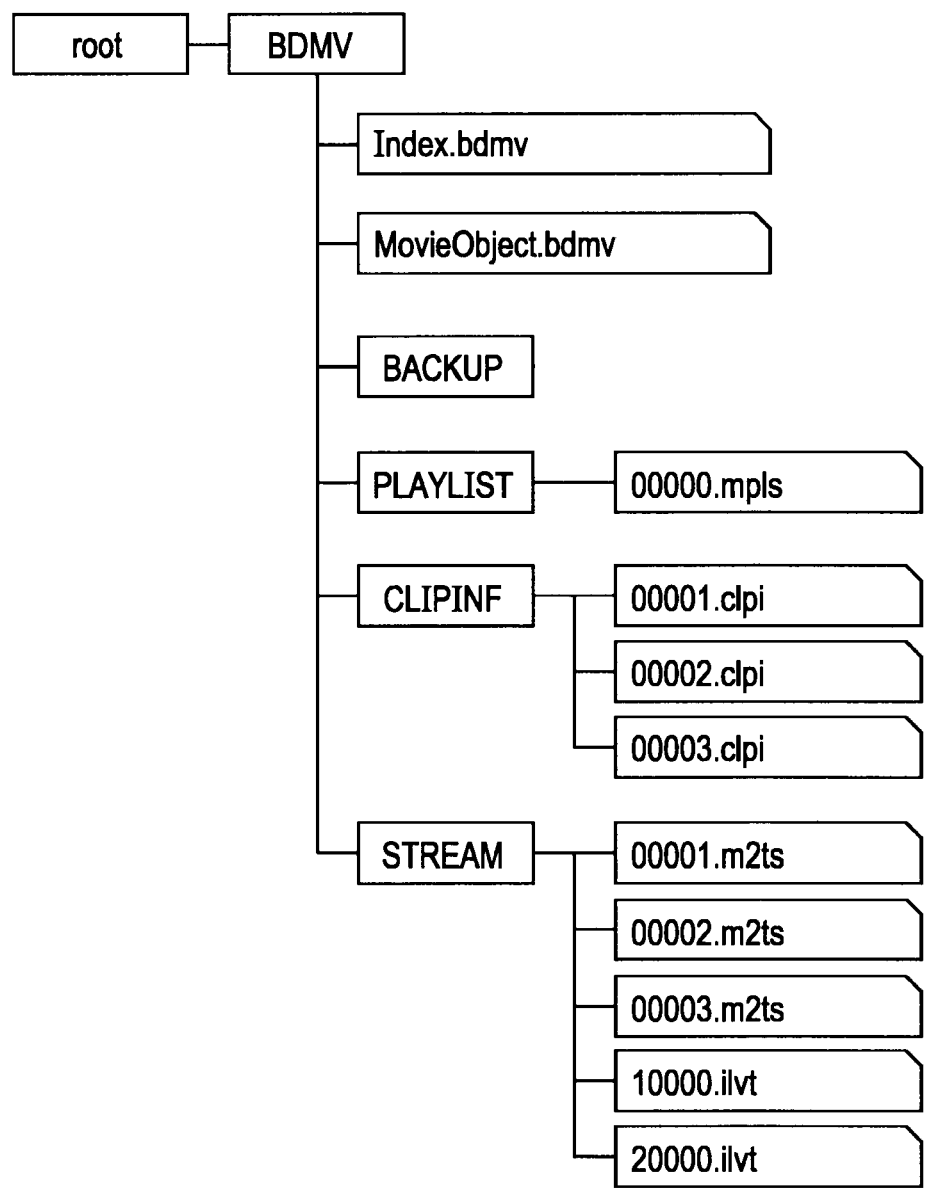
FIG. 10 is a diagram illustrating an example of the management structure of files to be recorded in an optical disc.

FIG. 10 is a diagram illustrating an example of a management structure of files to be recorded in the optical disc 2.

As illustrated in FIG. 10, files are managed by a directory structure in a hierarchical manner. One root directory is created on the optical disc 2. The underneath of the root directory becomes a range to be managed by one recording/playback system.

A BDMV directory is disposed underneath the root directory.

An Index file that is a file to which the name of "Index.bdmv" is set, and a MovieObject file that is a file to which the name of "MovieObject.bdmv" are stored immediately underneath the BDMV directory.

A BACKUP directory, a PLAYLIST directory, a CLIPINF directory, a STREAM directory, and so forth are provided underneath the BDMV directory.

A PlayList file in which a PlayList is described is stored in the PLAYLIST directory. A name in which a five-digit number and an extension ".mpls" are combined is set to each PlayList file. The file name of "00000.mpls" is set to one PlayList file illustrated in FIG. 10.

A Clip Information file is stored in the CLIPINF directory. A name in which a five-digit number and an extension ".clpi" are combined is set to each Clip Information file.

The file names of "00001.clpi", "00002.clpi", and "00003.clpi" are set to three Clip Information files in FIG. 10, respectively. Hereafter, Clip Information files will be referred to as clpi files as appropriate.

For example, the clpi file of "00001.clpi" is a file in which information relating to Clip of Base view video is described.

The clpi file of "00002.clpi" is a file in which information relating to Clip of D2 view video is described.

The clpi file of "00003.clpi" is a file in which information relating to Clip of D1 view video is described.

A stream file is stored in the STREAM directory. A name in which a five-digit number and an extension ".m2ts" are combined or a name in which a five-digit number and an extension ".ilvt" is set to each stream file. Hereafter, a file to which the extension ".m2ts" is set will be referred to as an m2ts file as appropriate. Also, a file to which the extension ".ilvt" is set will be referred to as an ilvt file.

The m2ts file of "00001.m2ts" is a file for 2D playback, and readout of the Base view video stream is performed by specifying this file.

The m2ts file of "00002.m2ts" is a D2 view video stream file, and the m2ts file of "00003.m2ts" is a D1 view video stream file.

The ilvt file of "10000.ilvt" is a file for B-D1 playback, and readout of the Base view video stream and the D1 view video stream is performed by specifying this file.

The ilvt file of "20000.ilvt" is a file for B-D2 playback, and readout of the Base view video stream and the D2 view video stream is performed by specifying this file.

In addition to the directories illustrated in FIG. 10, a directory storing an audio stream file, and so forth are provided underneath the BDMV directory.

[Syntax of Each Data]

FIG. 11 is a diagram illustrating the syntax of a PlayList file.

A PlayList file is a file to which the extension ".mpls" is set, which is stored in the PLAYLIST directory in FIG. 10.

type_indicator in FIG. 11 represents the type of a "xxxxx.mpls" file.

version_number represents the version number of "xxxxx.mpls". The version_number is made up of a four-digit number. For example, "0240" representing that this is "3D Spec version" is set to a PlayList file for 3D playback.

PlayList_start_address represents the head address of PlayList( ) with the number of relative bytes from the head byte of the PlayList file as units.

PlayListMark_start_address represents the head address of PlayListMark( ) with the number of relative bytes from the head byte of the PlayList file as units.

ExtensionData_start_address represents the head address of ExtensionData( ) with the number of relative bytes from the head byte of the PlayList file as units.

reserved_for_future_use of 160 bits is included after the ExtensionData_start_address.

Parameters relating to playback control of a PlayList such as playback restrictions and so forth are stored in AppInfoPlayList( ).

Parameters relating to the Main Path, Sub Path, and so forth are stored in PlayList( ). The content of PlayList( ) will be described later.

PlayList mark information, i.e., information relating to a mark that is a jump destination (jump point) of a user operation or a command for instructing chapter jump or the like is stored in PlayListMark( ).

Private data may be inserted in ExtensionData( ).

FIG. 12 is a diagram illustrating a specific example of the description of the PlayList file.

As illustrated in FIG. 12, a 3D_PL_type of 2 bits, and the view_type of 1 bit are described in the PlayList file. The view_type is described, for example, in the AppInfoPlayList( ) in FIG. 11.

The 3D_PL_type represents the type of a PlayList.

The view_type represents whether the Base view video stream of which the playback is managed by a PlayList is an L image (L view) stream or an R image (R view) stream.

FIG. 13 is a diagram illustrating the meaning of the value of the 3D_PL_type.

The value 00 of the 3D_PL_type represents that this is a PlayList for 2D playback.

The value 01 of the 3D_PL_type represents that this is a PlayList for B-D1 playback of 3D playback.

The value 10 of the 3D_PL_type represents that this is a PlayList for B-D2 playback of 3D playback.

For example, in the event that the value of the 3D_PL_type is 01 or 10, 3DPlayList information is registered in ExtensionData( ) of the PlayList file. For example, information relating to readout from the optical disc 2 of the Base view video stream and the Dependent view video stream is registered as the 3DPlayList information.

FIG. 14 is a diagram illustrating the meaning of the value of the view_type.

In the event of performing 3D playback, the value 0 of the view_type represents that the Base view video stream is an L view stream. In the event of performing 2D playback, the value 00 of the view_type represents that the Base view video stream is an AVC video stream.

The value 1 of the view_type represents that the Base view video stream is an R view stream.

The playback device 1 can identify whether the Base view video stream is an L view stream or an R view stream by the view_type being described in the PlayList file.

For example, in the event that a video signal is output to the display device 3 via an HDMI cable, it can be conceived that the playback device 1 is required to output the L view signal and the R view signal after each of the signals is distinguished.

The playback device 1 can distinguish and output an L view signal and an R view signal by enabling it to be identified whether the Base view video stream is an L view stream or an R view stream.

FIG. 15 is a diagram illustrating the syntax of the PlayList( ) in FIG. 11.

length is a 32-bit integer including no sign, indicating the number of bytes from immediately after this length field to the last of the PlayList( ). That is to say, length represents the number of bytes from reserved_for_future_use to the last of the PlayList.

16-bit reserved_for_future_use is prepared after the length.

number_of_PlayItems is a 16-bit field indicating the number_of_PlayItems within a PlayList. In the case of the example in FIG. 9, the number_of_PlayItems is 3. The value of a PlayItem_id is assigned from 0 in order wherein PlayItem( ) appears within the PlayList. For example, the PlayItem_id=0, 1, 2 in FIG. 9 is assigned thereto.

number_of_SubPaths is a 16-bit field indicating the number of Sub Paths within a PlayList. In the case of the example in FIG. 9, the number of Sub Paths is 3. The value of the SubPath_id is assigned from 0 in order wherein SubPath( ) appears within a PlayList. For example, Subpath_id=0, 1, 2 in FIG. 9 is assigned thereto. With the subsequent for sentence, the PlayItem( ) is referenced by the number_of_PlayItems, and the SubPath( ) is referenced by the number of Sub Paths.

FIG. 16 is a diagram illustrating the syntax of the SubPath( ) in FIG. 15.

length is a 32-bit integer including no sign, indicating the number of bytes from immediately after this length field to the last of the Sub Path( ). That is to say, the length represents the number of bytes from reserved_for_future_use to the last of the PlayList.

16-bit reserved_for_future_use is prepared after the length.

SubPath_type is a 8-bit field indicating the type of the application of a Sub Path. The SubPath_type is used, for example, in the event of indicating whether the type of a Sub Path is audio, bitmap caption, or text caption.

15-bit reserved_for_future_use is prepared after the SubPath_type.

is_repeat_SubPath is a one-bit field specifying the playback method of a Sub Path, which indicates whether playback of the Sub Path is repeatedly performed during playback of the Main Path, or playback of the Sub Path is performed only once. For example, in the event that the playback timing of the Clip referenced by the Main Path, and the playback timing of the Clip referenced by the Sub Path differ (in the event that the Main Path is taken as the path of slide show of still images, and the Sub Path is taken as the path of audio serving as BGM, etc.), this field is used.

8-bit reserved_for_future_use is prepared after the is_repeat_SubPath.

number_of_SubPlayItems is a 8-bit field indicating the number_of_SubPlayItems (number of entries) within one Sub Path. For example, the number_of_SubPlayItems of the SubPlayItem of the SubPath_id=0 in FIG. 9 is 1, and the number_of_SubPlayItems of the SubPlayItem of the SubPath_id=1 is 2. With the subsequent for sentence, SubPlayItem( ) is referenced by the number_of_SubPlayItems.

FIG. 17 is a diagram illustrating the syntax of the SubPlayItem(i) in FIG. 16.

length is a 16-bit integer including no sign, indicating the number of bytes from immediately after this length field to the last of Sub playItem( ).

SubPlayItem(i) in FIG. 17 is described in a manner divided into a case where the SubPlayItem references one Clip, and a case where the SubPlayItem references multiple Clips.

Description will be made regarding a case where the SubPlayItem references one Clip.

Clip_Information_file_name[0] represents a Clip to be referenced.

Clip_codec_identifier[0] represents a Clip codec method reserved_for_future_use is included after the Clip_codec_identifier[0].

is_multi_Clip_entries is a flag indicating presence/absence of registration of multiple Clips. In the event of the flag of the is_multi_Clip_entries being on, the syntax in the event that SubPlayItem references multiple Clips is referenced.

ref_to_STC_id[0] is information relating to a STC discontinuous point (a discontinuous point of system time basis).

SubPlayItem_IN_time represents the start position of a playback section of a Sub Path, and SubPlayItem_OUT_time represents the end position.

sync_PlayItem_id and sync_start_PTS_of_PlayItem represent point-in-time when the Sub Path starts playback on the time axis of the Main Path.

SubPlayItem_IN_time, SubPlayItem_OUT_time, sync_PlayItem_id, and sync_start_PTS_of_PlayItem are commonly used at the Clip referenced by the SubPlayItem.

Description will be made regarding a case where "If (is_multi_Clip_entries==1b", and the SubPlayItem reference multiple Clips.

num_of_Clip_entries represents the number of Clips to be referenced. The number of Clip_Information_file_name [SubClip_entry_id] specifies the number of Clips excluding Clip_Information_file_name[0].

Clip_codec_identifier[SubClip_entry_id] represents a Clip codec method.

ref_to_STC_id[SubClip_entry_id] is information relating to a STC discontinuous point (a discontinuous point of system time basis). reserved_for_future_use is included after the ref_to_STC_id[SubClip_entry_id].

FIG. 18 is a diagram illustrating the syntax of the PlayItem( ) in FIG. 15.

length is a 16-bit integer including no sign, indicating the number of bytes from immediately after this length field to the last of the PlayItem( ).

Clip_Information_file_name[0] represents the file name of the Clip Information file of the Clip referenced by the PlayItem. Note that the same 5-digit number is included in the file name of a mt2s file including a Clip, and the file name of the Clip Information file corresponding thereto.

Clip_codec_identifier[0] represents a Clip codec method. reserved_for_future_use is included after the Clip_codec_identifier[0]. is_multi_angle, and connection_condition are included after the reserved_for_future_use.

ref_to_STC_id[0] is information relating to a STC discontinuous point (a discontinuous point of system time basis).

IN_time represents the start position of a playback section of a PlayItem, and OUT_time represents the end position.

UO_mask_table( ), PlayItem random access mode, and still_mode are included after the OUT_time.

STN_table( ) includes the information of an AV stream referenced by an object PlayItem. Also, in the event that there is a Sub Path to be played in a manner correlated with the object PlayItem, the information of an AV stream referenced by the SubPlayItem making up the Sub Path thereof is also included.

FIG. 19 is a diagram illustrating the syntax of the STN_table( ) in FIG. 18.

The STN_table( ) is set as the attribute of a PlayItem.

length is a 16-bit integer including no sign, indicating the number of bytes from immediately after this length field to the last of the STN_table( ) 16-bit reserved_for_future_use is prepared after the length.

number_of_video_stream_entries represents the number of streams to which video_stream_id to be entered (registered) within the STN_table( ) is provided.

video_stream_id is information for identifying a video stream. For example, the Base view video stream is determined by this video_stream_id.

The ID of the Dependent view video stream may be defined within the STN_table( ) or may be obtained by calculation such as adding a predetermined value to the ID of the Base view video stream, or the like.

video_stream_number is a video stream number as viewed from the user, which is used for video switching.

number_of_audio_stream_entries represents the number of streams of the first audio streams to which audio_stream_id is provided, which is entered within the STN_table( ). The audio_stream_id is information for identifying an audio stream, and audio_stream_number is an audio stream number as viewed from the user, which is used for audio switching.

number_of_audio_stream2_entries represents the number of streams of the second audio streams to which audio_stream_id2 is provided, which is entered within the STN_table( ). The audio_stream_id2 is information for identifying an audio stream, and audio_stream_number is an audio stream number as viewed from the user, which is used for audio switching. With this example, audio to be played is arranged to be switched.

number_of_PG_txtST_stream_entries represents the number of streams to which PG_txtST_stream_id is provided, which is entered within the STN_table( ). Among of these, a PG stream obtained by subjecting bitmap caption to run length coding, and a text caption file (txtST) are entered. PG_txtST_stream_id is information for identifying a caption stream, and PG_txtST_stream_number is a caption stream number as viewed from the user, which is used for caption switching.

number_of_IG_stream_entries represents the number of streams to which IG_stream_id is provided, which is entered within the STN_table( ). Among of these, IG streams are entered. IG_stream_id is information for identifying an IG stream, and IG_stream_number is a graphics stream number as viewed from the user, which is used for graphics switching.

The IDs of the Main TS and Sub TS are also registered in the STN_table( ). It is described in stream_attribute( ) that the ID thereof is not an elementary stream but the ID of a TS.

[Configuration Example of the Playback Device 1]

Figure 20:
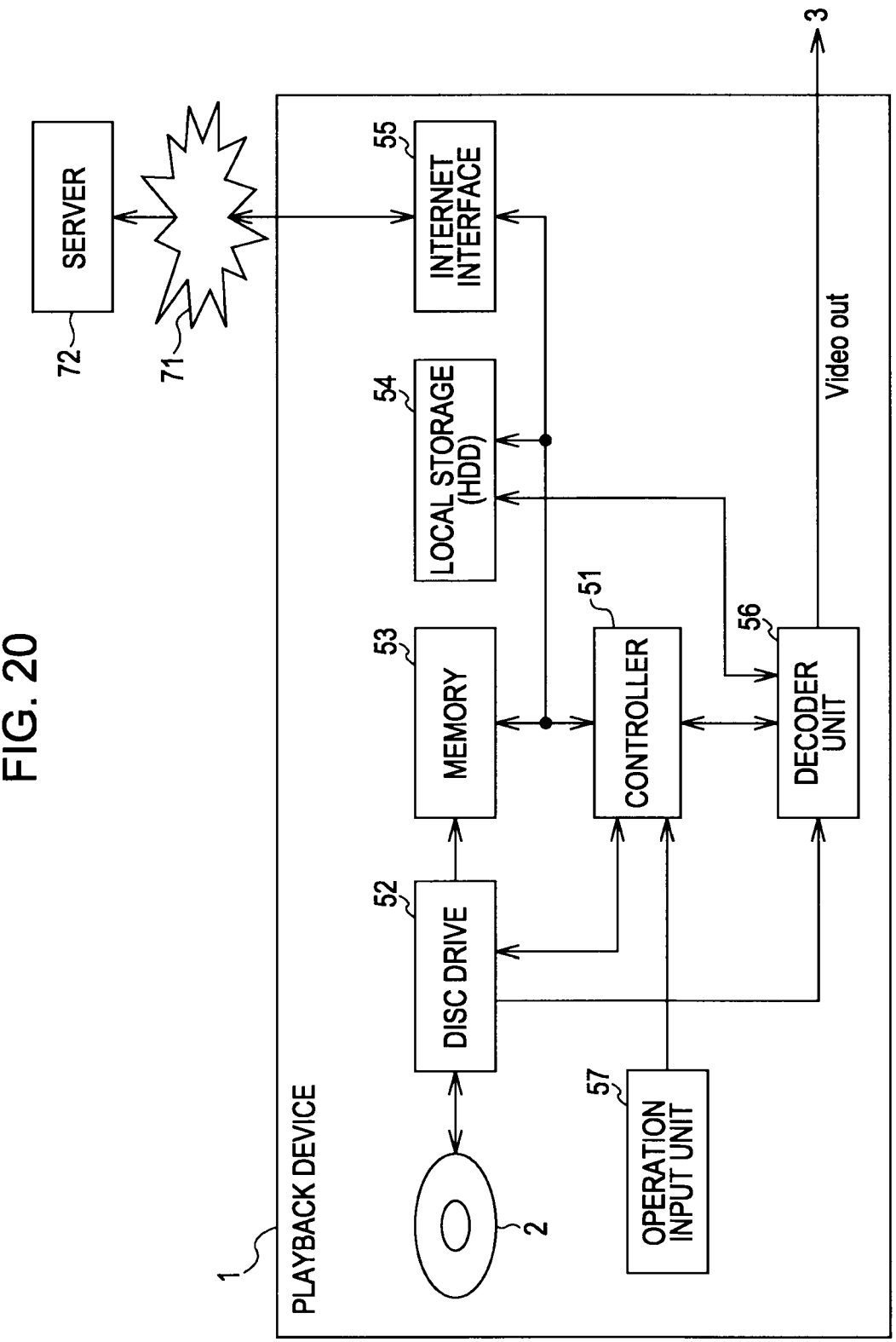
FIG. 20 is a block diagram illustrating a configuration example of a playback device.

FIG. 20 is a block diagram illustrating a configuration example of the playback device 1.

A controller 51 executes a prepared control program to control the whole operation of the playback device 1.

For example, the controller 51 controls a disk drive 52 to read out a PlayList file for 3D playback. Also, the controller 51 controls the disk drive 52 to read out the Main TS and Sub Ts based on IDs registered in STN_table and to supply these to a decoder unit 56.

The disk drive 52 reads out data from the optical disc 2 in accordance with the control by the controller 51, and outputs the readout data to the controller 51, memory 53, and decoder unit 56.

The memory 53 stores data necessary for the controller 51 executing various types of processing, as appropriate.

A local storage 54 is configured of, for example, an HDD (Hard Disk Drive). The Dependent view video stream or the like downloaded from a server 72 is recorded in the local storage 54. The stream recorded in the local storage 54 is also supplied to the decoder unit 56 as appropriate.

An internet interface 55 performs communication with the server 72 via a network 71 in accordance with the control from the controller 51, and supplies the data downloaded from the server 72 to the local storage 54.

Data for updating data recorded in the optical disc 2 is downloaded from the server 72. 3D playback of the content different from the content of the optical disc 2 can be realized by enabling the downloaded Dependent view video stream to be used along with the Base view video stream recorded in the optical disc 2. When the Dependent view video stream is downloaded, the content of a PlayList is also updated as appropriate.

The decoder unit 56 decodes the stream supplied from the disk drive 52 or local storage 54, and outputs the obtained video signal to the display device 3. An audio signal is also output to the display device 3 via a predetermined route.

The operation input unit 57 is configured of an input device such as a button, key, touch panel, jog dial, mouse, and so forth, and a receiving unit for receiving a signal such as an infrared ray transmitted from a predetermined remote commander. The operation input unit 57 detects the user's operation to supply a signal representing the content of the detected operation to the controller 51.

Figure 21:
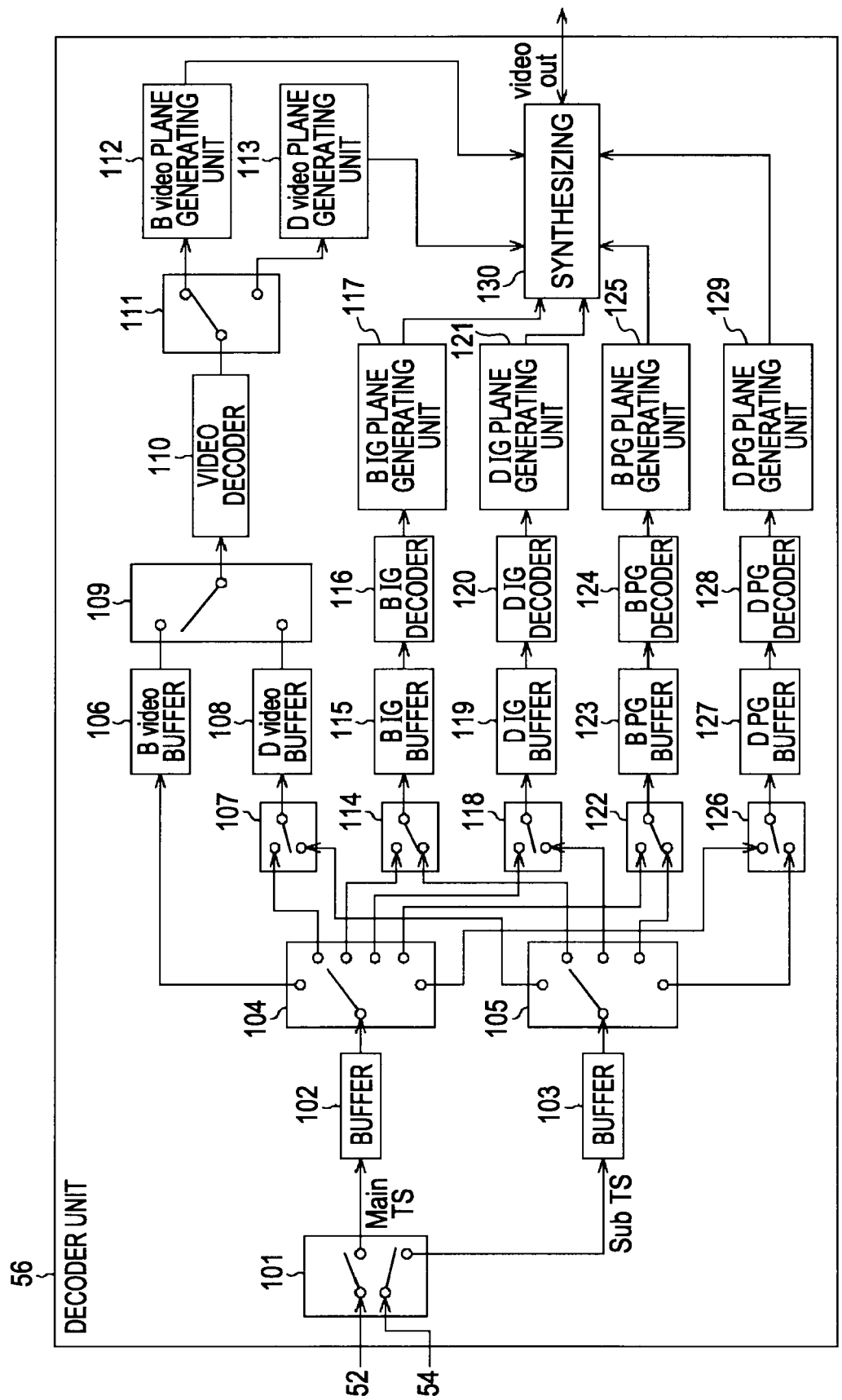
FIG. 21 is a diagram illustrating a configuration example of the decoder unit in FIG. 20.

FIG. 21 is a diagram illustrating a configuration example of the decoder unit 56.

FIG. 21 illustrates a configuration wherein processing of a video signal is performed. With the decoder unit 56, decoding processing of an audio signal is also performed. The results of the decoding processing performed with an audio signal as an object are output to the display device 3 via an unshown route.

A PID filter 101 identifies whether the TS supplied from the disk drive 52 or local storage 54 is the Main TS or Sub TS, based on the PID of a packet, and the ID of a stream, making up the TS. The PID filter 101 outputs the Main TS to a buffer 102, and outputs the Sub TS to a buffer 103.

The PID filter 104 sequentially reads out the packet of the Main TS stored in the buffer 102 to distribute this based on the PID.

For example, the PID filter 104 outputs a packet making up the Base view video stream included in the Main TS to a B video buffer 106, and outputs a packet making up the Dependent view video stream to a switch 107.

Also, the PID filter 104 outputs a packet making up the Base IG stream included in the Main TS to a switch 114, and outputs a packet making up the Dependent IG stream to a switch 118.

The PID filter 104 outputs a packet making up the Base PG stream included in the Main TS to a switch 122, and outputs a packet making up the Dependent PG stream to a switch 126.

As described with reference to FIG. 5, the stream of each of Base view video, Dependent view video, Base PG, Dependent PG, Base IG, and Dependent IG may be multiplexed in the Main TS.

A PID filter 105 sequentially reads out the packet of the Sub TS stored in the buffer 103 to distribute this based on the PID.

For example, the PID filter 105 outputs a packet making up the Dependent view video stream included in the Sub TS to the switch 107.

Also, the PID filter 105 outputs a packet making up the Base IG stream included in the Sub TS to the switch 114, and outputs a packet making up the Dependent IG stream to the switch 118.

The PID filter 105 outputs a packet making up the Base PG stream included in the Sub TS to the switch 122, and outputs a packet making up the Dependent PG stream to the switch 126.

As described with reference to FIG. 7, the Dependent view video stream may be included in the Sub TS. Also, as described with reference to FIG. 6, each of the streams of Base PG, Dependent PG, Base IG, and Dependent IG may be multiplexed in the Sub TS.

The switch 107 outputs a packet making up the Dependent view video stream supplied from the PID filter 104 or PID filter 105 to a D video buffer 108.

A switch 109 sequentially reads out a Base view video packet stored in a B video buffer 106, and a Dependent view video packet stored in the D video buffer 108 in accordance with point-in-time information that stipulates decoding timing. For example, the same point-in-time information is set to a packet which stores the data of a certain picture of the base view video, and a packet which stores the data of the picture of the corresponding Dependent view video.

The switch 109 outputs the packet read out from the B video buffer 106 or D video buffer 108 to a video decoder 110.

The video decoder 110 decodes the packet supplied from the switch 109 to output the Base view video or Dependent view video obtained by decoding to a switch 111.

The switch 111 outputs data obtained by decoding a Base view video packet to a B video plane generating unit 112, and outputs data obtained by decoding a Dependent view video packet to a D video plane generating unit 113.

The B video plane generating unit 112 generates a Base view video plane based on the data supplied from the switch 111 to output this to a synthesizing unit 130.

The D video plane generating unit 113 generates a Dependent view video plane based on the data supplied from the switch 111 to output this to the synthesizing unit 130.

The switch 114 outputs a packet making up the Base IG stream supplied from the PID filter 104 or PID filter 105 to a B IG buffer 115.

A B IG decoder 116 decodes a packet making up the Base IG stream stored in the B IG buffer 115 to output the data obtained by decoding to a B IG plane unit 117.

The B IG plane generating unit 117 generates a Base IG plane based on the data supplied from the B IG decoder 116 to output this to the synthesizing unit 130.

The switch 118 outputs a packet making up the Dependent IG stream supplied from the PID filter 104 or PID filter 105 to a D IG buffer 119.

A D IG decoder 120 decodes a packet making up the Dependent IG stream stored in the D IG buffer 119 to output the data obtained by decoding to a D IG plane generating unit 121.

The D IG plane generating unit 121 generates a Dependent IG plane based on the data supplied from the D IG decoder 120 to output this to the synthesizing unit 130.

The switch 122 outputs a packet making up the Base PG stream supplied from the PID filter 104 or PID filter 105 to a B PG buffer 123.

A B PG decoder 124 decodes a packet making up the Base PG stream stored in the B PG buffer 123 to output the data obtained by decoding to a B PG plane generating unit 125.

The B PG plane generating unit 125 generates a Base PG plane based on the data supplied from the B PG decoder 124 to output this to the synthesizing unit 130.

The switch 126 outputs a packet making up the Dependent PG stream supplied from the PID filter 104 or PID filter 105 to a D PG buffer 127.

A D PG decoder 128 decodes a packet making up the Dependent PG stream stored in the D PG buffer 127 to output the data obtained by decoding to a D PG plane generating unit 129.

The D PG plane generating unit 129 generates a Dependent PG plane based on the data supplied from the D PG decoder 128 to output this to the synthesizing unit 130.

The synthesizing unit 130 synthesizes the Base view video plane supplied from the B video plane generating unit 112, the Base IG plane supplied from the B IG plane generating unit 117, and the Base PG plane supplied from the B PG plane generating unit 125 by overlaying these in a predetermined order to generate a Base view plane.

Also, the synthesizing unit 130 synthesizes the Dependent view video plane supplied from the D video plane generating unit 113, the Dependent IG plane supplied from the D IG plane generating unit 121, and the Dependent PG plane supplied from the D PG plane generating unit 129 by overlaying these in a predetermined order to generate a Dependent view plane.

The synthesizing unit 130 outputs the data of a Base view plane and a Dependent view plane. The video data output from the synthesizing unit 130 is output to the display device 3, and 3D display is performed by the Base view plane and the Dependent view plane being alternately displayed.

[First Example of T-STD (Transport Stream-System Target Decoder)]

Now, of the configurations shown in FIG. 21, the configuration of the decoder and the surroundings thereof will be described.

Figure 22:
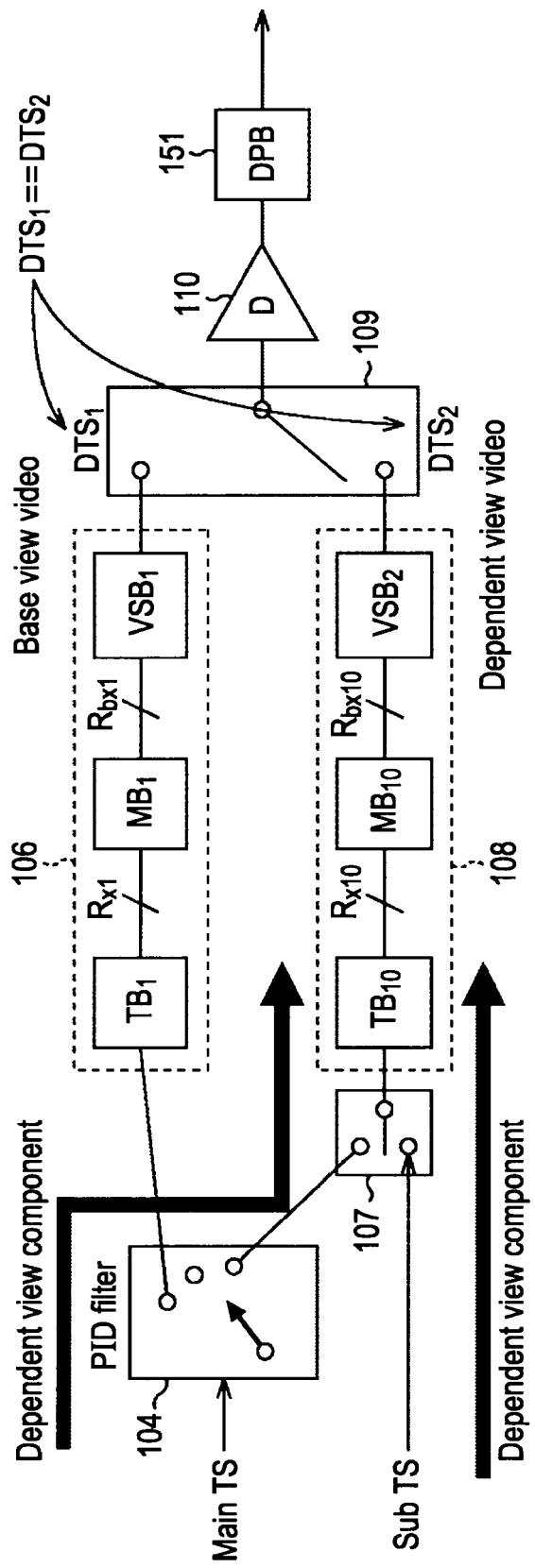
FIG. 22 is a diagram illustrating a configuration for performing video stream processing.

FIG. 22 is a diagram illustrating a configuration wherein processing of a video stream is performed.

In FIG. 22, the same configuration as the configuration illustrated in FIG. 21 is denoted with the same reference numeral. FIG. 22 illustrates the PID filter 104, B video buffer 106, switch 107, D video buffer 108, switch 109, video decoder 110, and a DPB (Decoded Picture Buffer) 151. Though not illustrated in FIG. 21, the DPB 151 in which the data of a decoded picture is stored is provided to the subsequent stage of the video decoder 110.

The PID filter 104 outputs a packet making up the Base view video stream included in the Main TS to the B video buffer 106, and outputs a packet making up the Dependent view video stream to the switch 107.

For example, PID=0 has been assigned to a packet making up the Base view video stream as the fixed value of the PID. Also, a fixed value other than 0 has been assigned to a packet making up the Dependent view video stream as the PID.

The PID filter 104 outputs a packet of which the header is described with PID=0 to the B video buffer 106, and outputs a packet of which the header is described with a PID other than 0 to the switch 107.

The packet output to the B video buffer 106 is stored in a $VSB_1$ via a TB (Transport Buffer)$_1$ and an MB (Multiplexing Buffer)$_1$. The data of the elementary stream of the Base view video is stored in the $VSB_1$.

Not only the packet output from the PID filter 104 but also a packet making up the Dependent view video stream extracted from the Sub TS at the PID filter 105 in FIG. 21 are also supplied to the switch 107.

In the event that a packet making up the Dependent view video stream has been supplied from the PID filter 104, the switch 107 outputs this to the D video buffer 108.

Also, in the event that a packet making up the Dependent view video stream has been supplied from the PID filter 105, the switch 107 outputs this to the D video buffer 108.

The packet output to the D video buffer 108 is stored in a $VSB_2$ via a $TB_2$ and an $MB_2$. The data of the elementary stream of the Dependent view video is stored in the $VSB_2$.

The switch 109 sequentially reads out the Base view video packet stored in the $VSB_1$ of the B video buffer 106, and the Dependent view video packet stored in the $VSB_2$ of the D video buffer 108, and outputs these to the video decoder 110.

For example, the switch 109 continuously outputs a Base view video packet and a Dependent view video packet at the same point-in-time to the video decoder 110 so as to output, immediately after outputting a Base view video packet at a certain point-in-time, a Dependent view video packet at the same point-in-time as the point-in-time thereof.

With a packet storing the data of a certain picture of Base view video, and a packet storing the data of a picture of the Dependent view video corresponding thereto, at the time encoding thereof, the same point-in-time information with PCR (Program Clock Reference) synchronization being ensured is set. Even in the event that a Base view video stream and a Dependent view video stream are each included in a different TS, the same point-in-time information is set to a packet storing the data of the corresponding picture.

The point-in-time information is a DTS (Decoding Time Stamp), and a PTS (Presentation Time Stamp), and is set to each PES (Packetized Elementary Stream) packet.

That is to say, the picture of Base view video, and the picture of Dependent view video, positioned at the same point-in-time when arraying the picture of each stream in encoding sequence/decoding sequence become the corresponding pictures. The same DTS is set to a PES packet storing the data of a certain Base view video picture, and a PES packet storing the data of the Dependent view video picture corresponding to the picture thereof in decoding sequence.

Also, a Base view video picture and a Dependent view picture positioned at the same point-in-time when arraying the picture of each of the streams in display sequence also become the corresponding pictures. The same PTS is set to a PES packet storing the data of a certain Base view video picture, and a PES packet storing the data of the Dependent view video picture corresponding to that picture in display sequence.

In the event that the GOP structure of a Base view video stream, and the GOP structure of a Dependent view video stream are the same structure, pictures corresponding in decoding sequence also become pictures corresponding in display sequence, which will be described later.

In the event that transfer of a packet is performed serially, the $DTS_1$ of a packet read out from the $VSB_1$ of the B video buffer 106 at a particular timing, and the $DTS_2$ of a packet read out from the $VSB_2$ f the D video buffer 108 at timing immediately thereafter, represent the same point-in-time, as illustrated in FIG. 22.

The switch 109 outputs a Base view video packet read out from the $VSB_1$ of the B video buffer 106, or a Dependent view video packet read out from the $VSB_2$ of the D video buffer 108 to the video decoder 110.

The video decoder 110 sequentially decodes the packet supplied from the switch 109 to store the data of a Base view video picture, or the data of a Dependent view video picture obtained by decoding in the DPB 151.

The data of a decoded picture stored in the DPB 151 is read out by the switch 111 at predetermined timing. Also, the data of the decoded picture stored in the DPB 151 is used for prediction of another picture by the video decoder 110.

In the event that transfer of data is performed serially, the PTS of the data of a Base view video picture output at certain timing, and the PTS of the data of a Dependent view video picture output at timing immediately after represent the same point-in-time.

A Base view video stream and a Dependent view video stream may be multiplexed in a single TS such as described with reference to FIG. 5 and so forth, or may be each included in a different TS as described with reference to FIG. 7.

Even in the case that a Base view video stream and a Dependent view video stream are multiplexed in a single TS, or may be each included in a different TS, the playback device 1 can handle such a case by implementing the decoder model in FIG. 22.

Figure 23:
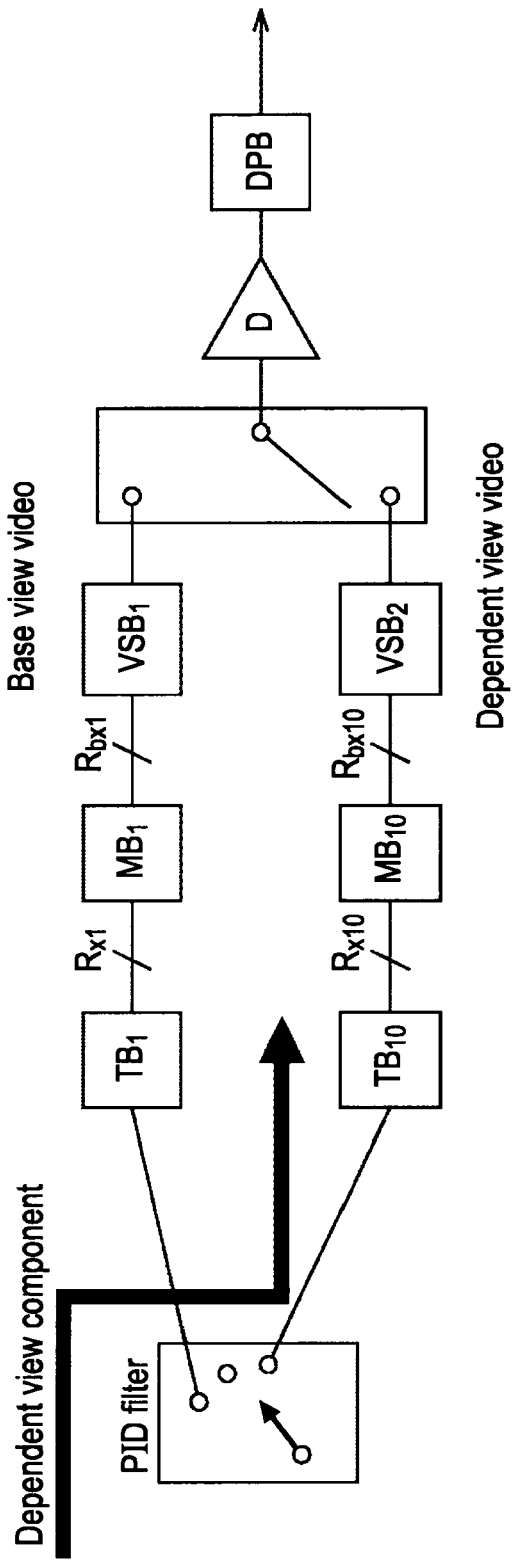
FIG. 23 is a diagram illustrating a configuration for performing video stream processing.

For example, as illustrated in FIG. 23, in the event that only a situation in which a single TS is supplied is assumed, the playback device 1 cannot handle a case where a Base view video stream and a Dependent view video stream are each included in a different TS, or the like.

Also, according to the decoder model in FIG. 22, even in the event that a Base view video stream and a Dependent view video stream are each included in a different TS, both have the same DTS, and accordingly, a packet can be supplied to the video decoder 110 at correct timing.

A decoder for Base view video, and a decoder for Dependent view video may be each provided in parallel. In this case, a packet at the same point-in-time is supplied to each of the decoder for Base view video and the decoder for Dependent view video at the same timing.

[Second Example]

Figure 24:
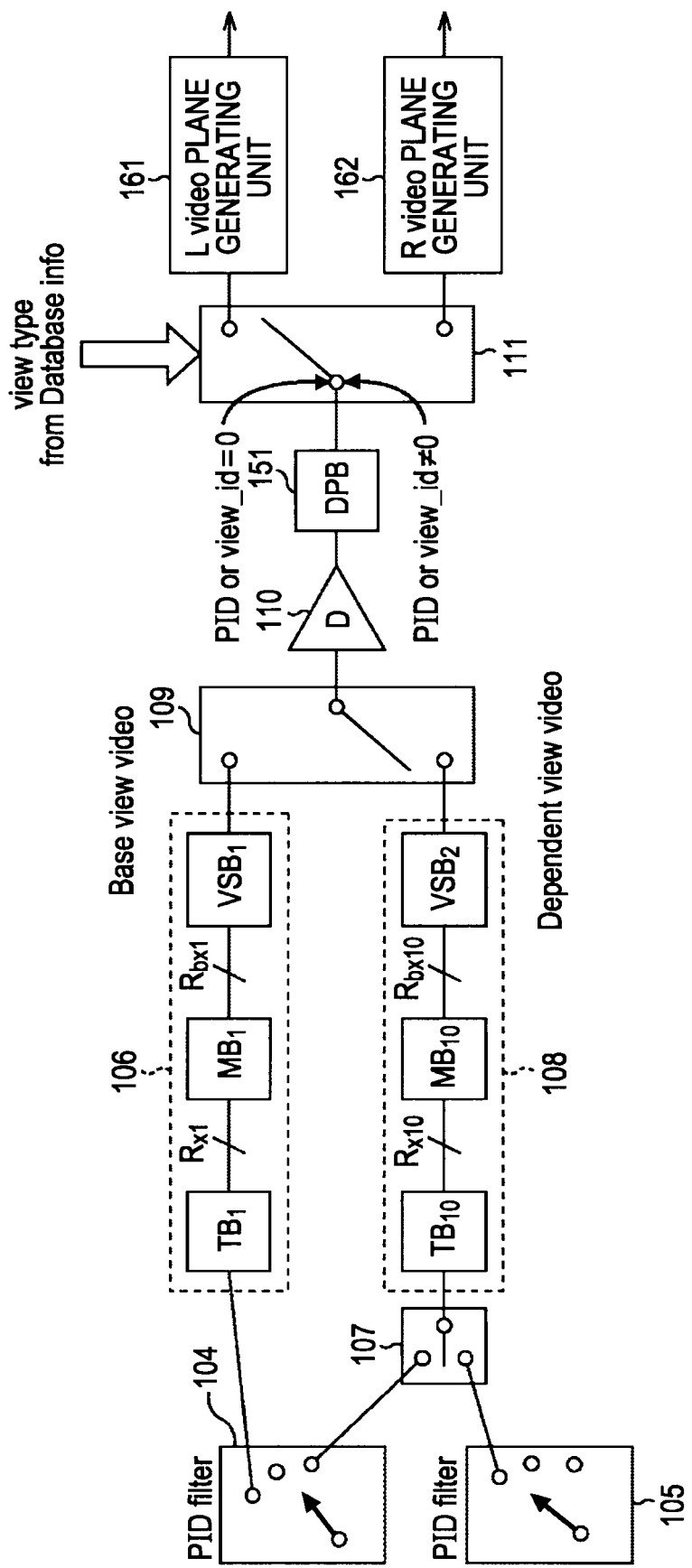
FIG. 24 is a diagram illustrating another configuration for performing video stream processing.

FIG. 24 is a diagram illustrating another configuration for performing processing of a video stream.

FIG. 24 illustrates, in addition to the configuration in FIG. 22, the switch 111, an L video plane generating unit 161, and an R video plane generating unit 162. Also, the PID filter 105 is illustrated on the previous stage of the switch 107. Redundant description will be omitted as appropriate.

The L video plane generating unit 161 generates an L view video plane, and is provided instead of the B video plane generating unit 112 in FIG. 21.

The R video plane generating unit 162 generates an R view video plane, and is provided instead of the D video plane generating unit 113 in FIG. 21.

With this example, the switch 111 needs to identify and output L view video data and R view video data.

That is to say, the switch 111 needs to identify whether the data obtained by decoding a Base view video packet is any video data of L view or R view.

Also, the switch 111 needs to identify whether the data obtained by decoding a Dependent view video packet is any video data of L view or R view.

The view_type described with reference to FIG. 12 and FIG. 14 is employed for identification of L view and R view. For example, the controller 51 outputs the view_type described in a PlayList file to the switch 111.

In the event that the value of the view_type is 0, the switch 111 outputs, of the data stored in the DPB 151, the data obtained by decoding the Base view video packet identified by PID=0 to the L video plane generating unit 161. As described above, the value 0 of the view_type represents that the Base view video stream is an L view stream.

In this case, the switch 111 outputs the data obtained by decoding the Dependent view video packet identified by a PID other than 0 to the R video plane generating unit 162.

On the other hand, in the event that the value of the view_type is 1, the switch 111 outputs, of the data stored in the DPB 151, the data obtained by decoding the Base view video packet identified by PID=0 to the R video plane generating unit 162. The value 1 of the view_type represents that the Base view video stream is an R view stream.

In this case, the switch 111 outputs the data obtained by decoding the Dependent view video packet identified by a PID other than 0 to the L video plane generating unit 161.

The L video plane generating unit 161 generates an L view video plane based on the data supplied from the switch 111, and outputs this to the synthesizing unit 130.

The R video plane generating unit 162 generates an R view video plane based on the data supplied from the switch 111, and outputs this to the synthesizing unit 130.

There is no information (field) representing whether the stream is L view or R view within the elementary streams of Base view video and Dependent view video encoded by the H.264 AVC/MVC profile standard.

Accordingly, the recording device can identify whether each of the Base view video stream and the Dependent view video stream is L view or R view by setting the view_type to a PlayList file.

The playback device 1 identifies whether each of the Base view video stream and the Dependent view video stream is either L view or R view, and can switch an output destination according to the identification results.

In the event that L view and R view are also prepared regarding each of the IG and PG planes, the L view and R view of a video stream can be distinguished, whereby the playback device 1 can readily perform synthesis of L view planes, and R view planes.

As described above, in the event of outputting a video signal via the HDMI cable, it is requested that each of an L view signal and an R view signal is distinguished and is then output, but the playback device 1 can handle the request thereof.

Identification of the data obtained by decoding the Base view video packet stored in the DPB 151, and the data obtained by decoding the Dependent view video packet may be performed based on view_id instead of the PID.

At the time of encoding by the H.264 AVC/MVC profile standard, the view_id is set to an Access Unit making up the stream of the encoding results. It can be identified according to the view_id which view component unit each Access Unit is.

Figure 25:
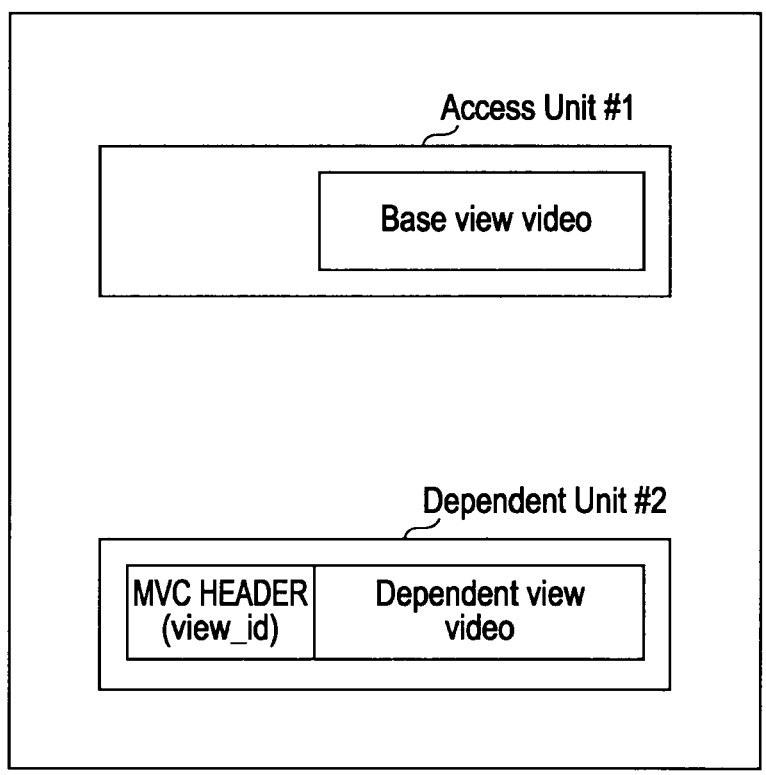
FIG. 25 is a diagram illustrating an example of an Access Unit.

FIG. 25 is a diagram illustrating an example of an Access Unit.

Access Unit #1 in FIG. 25 is a unit including the data of Base view video. Dependent Unit #2 is a unit including the data of Dependent view video. An Access Unit (Dependent Unit in the case of Dependent view) is, for example, a unit collecting the data of one picture so as to access in increments of pictures.

The data of each picture of Base view video and Dependent view video is stored in such a unit by performing encoding conforming to the H.264 AVC/MVE profile standard. At the time of encoding conforming to the H.264 AVC/MVC profile standard, as illustrated within the Dependent Unit #2, an MVC header is added to each of the view components. The view_id is included in the MVC header.

In the case of the example in FIG. 25, with regard to the Dependent Unit #2, it can be identified from the view_id that a view component to be stored in the unit thereof is Dependent view video.

On the other hand, as illustrated in FIG. 25, no MVC header is added to Base view video that is a view component stored in the Access Unit #1.

As described above, the Base view video stream is data to be also used for 2D playback. Accordingly, in order to ensure compatibility therewith, no MVC header is added to Base view video at the time of encoding. Alternatively, the MVC header once added is removed. Encoding by the recording device will be described later.

With the playback device 1, a view component to which no MVC header is added is defined (set) such that the view_id thereof is 0, and the view component is recognized to be Base view video. A value other than 0 is set to Dependent view video as the view_id at the time of encoding.

Thus, the playback device 1 can identify Base view video based on the view_id recognized to be 0, and can identify Dependent view video based on the view_id other than 0, which is actually set.

With the switch 111 in FIG. 24, identification of the data obtained by decoding a Base view video packet, and the data obtained by decoding a Dependent view video packet may be performed based on such a view_id.

[Third Example]

Figure 26:
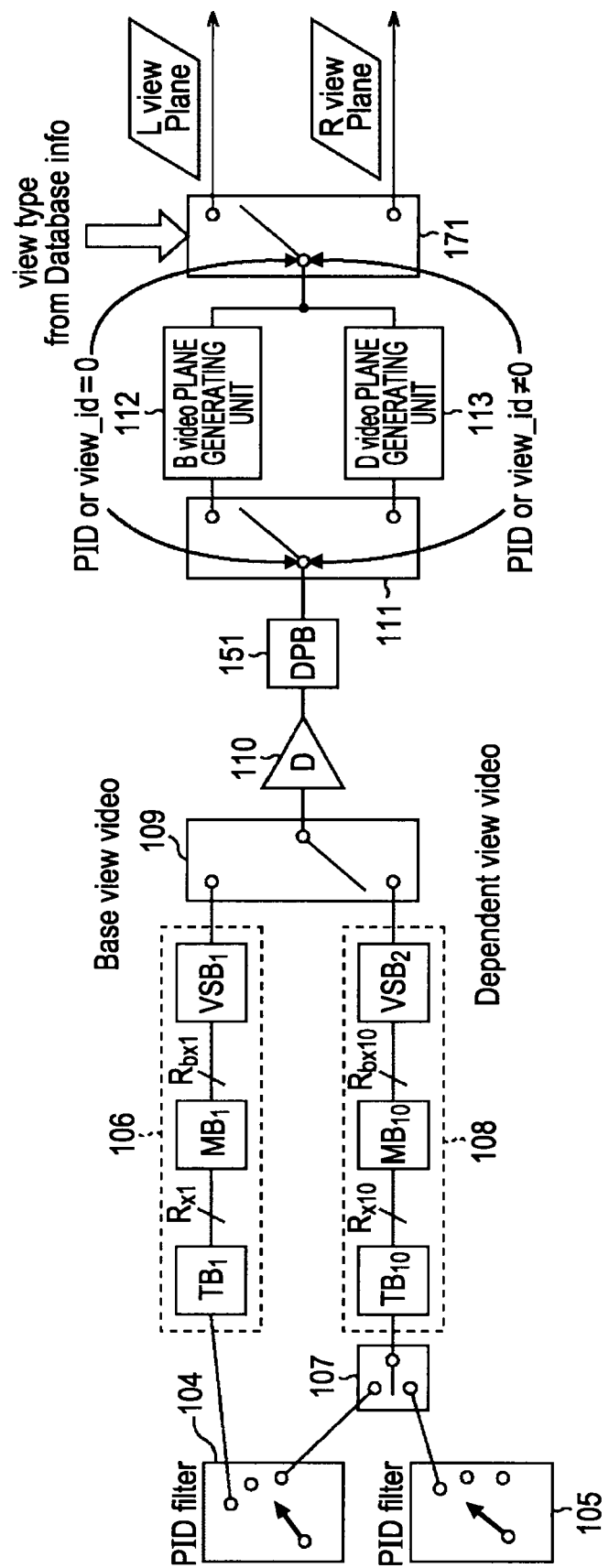
FIG. 26 is a diagram illustrating yet another configuration for performing video stream processing.

FIG. 26 is a diagram illustrating yet another configuration wherein processing of a video stream is performed.

With the example in FIG. 26, the B video plane generating unit 112 is provided instead of the L video plane generating unit 161 in FIG. 24, and the D video plane generating unit 113 is provided instead of the R video plane generating unit 162.

A switch 171 is provided on the subsequent stage of the B video plane generating unit 112 and the D video plane generating unit 113. With the configuration illustrated in FIG. 26 as well, a data output destination is arranged to be switched based on the view_type.

The switch 111 outputs, of the data stored in the DPB 151, the data obtained by decoding a Base view video packet to the B video plane generating unit 112. Also, the switch 111 outputs the data obtained by decoding a Dependent view video packet to the D video plane generating unit 113.

The data obtained by decoding a Base view video packet, and the data obtained by decoding a Dependent view video packet are identified based on the PID or view_id such as described above.

The B video plane generating unit 112 generates a Base view video plane based on the data supplied from the switch 111, and outputs this.

The D video plane generating unit 113 generates a Dependent view video plane based on the data supplied from the switch 111, and outputs this.

The view_type described in a PlayList file is supplied from the controller 51 to the switch 171.

In the event that the value of the view_type is 0, the switch 171 outputs the Base view video plane supplied from the B video plane generating unit 112 to the synthesizing unit 130 as an L view video plane. The value 0 of the view_type represents that the Base view video stream is an L view stream.

Also, in this case, the switch 171 outputs the Dependent view video plane supplied from the D video plane generating unit 113 to the synthesizing unit 130 as an R view video plane.

On the other hand, in the event that the value of the view_type is 1, the switch 171 outputs the Dependent view video plane supplied from the D video plane generating unit 113 to the synthesizing unit 130 as an L view video plane. The value 1 of the view_type represents that the Base view video stream is an R view stream.

Also, in this case, the switch 171 outputs the Base view video plane supplied from the B video plane generating unit 112 to the synthesizing unit 130 as an R view video plane.

According to the configuration in FIG. 26 as well, the playback device 1 identifies L view and R view, and can switch an output destination according to the identification results.

[First Example of a Plane Synthesizing Model]

Figure 27:
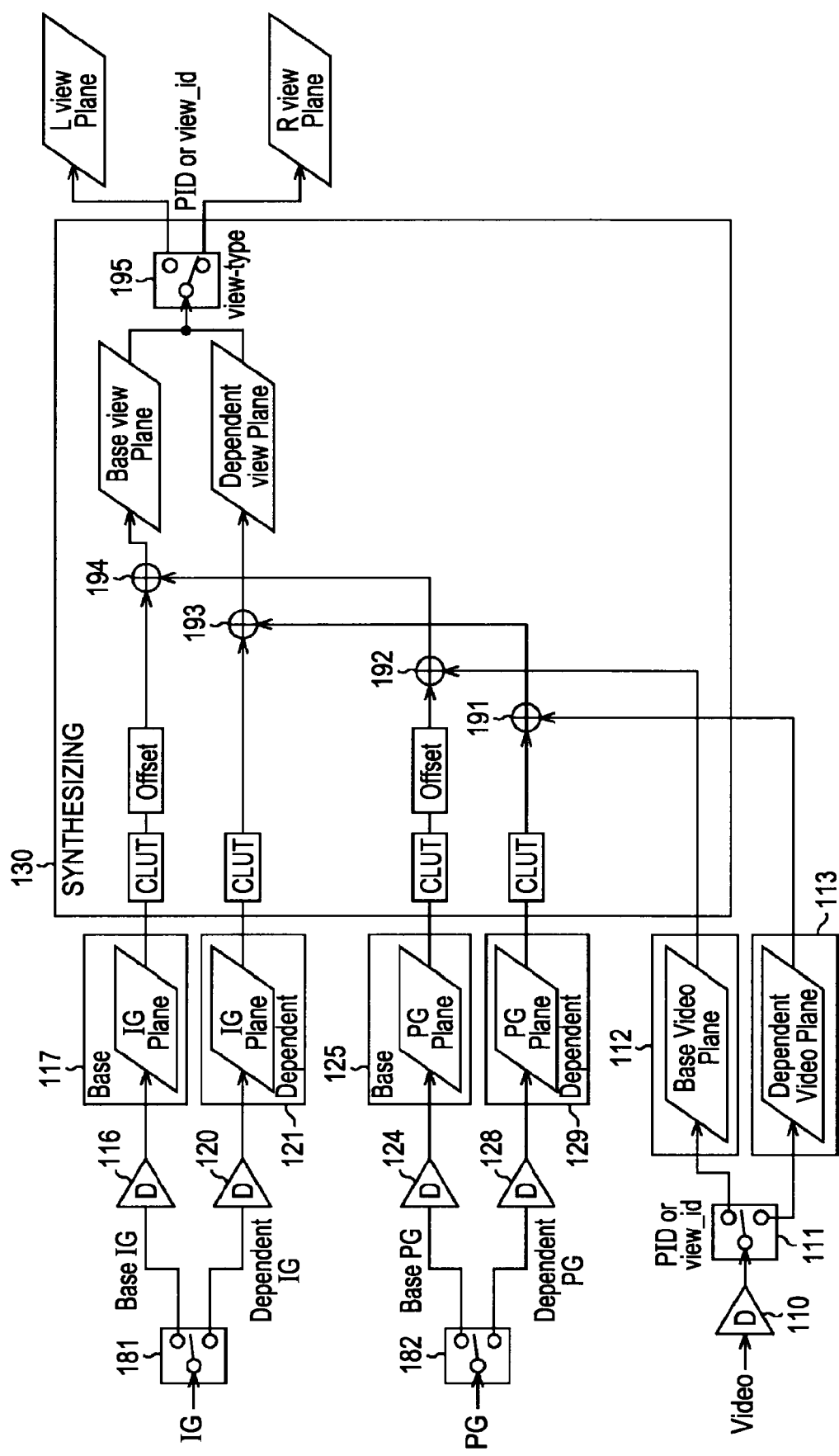
FIG. 27 is a diagram illustrating the configuration of a synthesizing unit and the previous stage thereof.

FIG. 27 is a diagram illustrating, of the configuration illustrated in FIG. 21, the configuration of the synthesizing unit 130 and the subsequent stage thereof.

In FIG. 27 as well, the same configuration as the configuration illustrated in FIG. 21 is denoted with the same reference numeral.

Packets making up an IG stream included in the Main TS or Sub TS is input to a switch 181. The packets making up an IG stream to be input to the switch 181 include a Base view packet, and a Dependent view packet.

Packets making up a PG stream included in the Main TS or Sub TS is input to a switch 182. The packets making up a PG stream to be input to the switch 182 include a Base view packet, and a Dependent view packet.

As described with reference to FIG. 5 and so forth, with regard IG and PG as well, a Base view stream and a Dependent view stream for performing 3D display are prepared.

The IG of Base view is displayed in a manner synthesized with Base view video, and the IG of Dependent view is displayed in a manner synthesized with Dependent view video, whereby the user views not only video but also a button, icon, and so forth as 3D.

The PG of Base view is displayed in a manner synthesized with Base view video, and the PG of Dependent view is displayed in a manner synthesized with Dependent view video, whereby the user views not only video but also caption text, and so forth as 3D.

The switch 181 outputs packets making up a Base IG stream to the B IG decoder 116, and outputs packets making up a Dependent IG stream to the D IG decoder 120. The switch 181 includes the functions of the switch 114 and the switch 118 in FIG. 21. In FIG. 27, drawing of each buffer is omitted.

The B IG decoder 116 decodes the packets making up the Base IG stream supplied from the switch 181 to output the data obtained by decoding to the B IG plane generating unit 117.

The B IG plane generating unit 117 generates a Base IG plane based on the data supplied from the B IG decoder 116 to output this to the synthesizing unit 130.

The D IG decoder 120 decodes the packets making up the Dependent IG stream supplied from the switch 181 to output the data obtained by decoding to the D IG plane generating unit 121. The Base IG stream and the Dependent IG stream may be arranged to be decoded by one decoder.

The D IG plane generating unit 121 generates a Dependent IG plane based on the data supplied from the D IG decoder 120 to output this to the synthesizing unit 130.

A switch 182 outputs packets making up a Base PG stream to the B PG decoder 124, and outputs packets making up a Dependent PG stream to the D PG decoder 128. The switch 182 includes the functions of the switch 122 and the switch 126 in FIG. 21.

The B PG decoder 124 decodes the packets making up the Base PG stream supplied from the switch 182 to output the data obtained by decoding to the B PG plane generating unit 125.

The B PG plane generating unit 125 generates a Base PG plane based on the data supplied from the B PG decoder 124 to output this to the synthesizing unit 130.

The D PG decoder 128 decodes the packets making up the Dependent PG stream supplied from the switch 182 to output the data obtained by decoding to the D PG plane generating unit 129. The Base PG stream and the Dependent PG stream may be arranged to be decoded by one decoder.

The D PG plane generating unit 129 generates a Dependent PG plane based on the data supplied from the D PG decoder 128 to output this to the synthesizing unit 130.

The video decoder 110 sequentially decodes the packets supplied from the switch 109 (FIG. 22 and so forth) to output the data of Base view video, and the data of Dependent view video obtained by decoding to the switch 111.

The switch 111 outputs the data obtained by decoding the packets of Base view video to the B video plane generating unit 112, and outputs the data obtained by decoding the packets of Dependent view video to the D video plane generating unit 113.

The B video plane generating unit 112 generates a Base view video plane based on the data supplied from the switch 111, and outputs this.

The D video plane generating unit 113 generates a Dependent view video plane based on the data supplied from the switch 111, and outputs this.

The synthesizing unit 130 is configured of adding units 191 through 194, and a switch 195.

The adding unit 191 synthesizes the Dependent PG plane supplied from the D PG plane generating unit 129 on the Dependent view video plane supplied from the D video plane generating unit 113 in an overlaid manner, and outputs the synthesis results to the adding unit 193. The Dependent PG plane supplied from the D PG plane generating unit 129 to the adding unit 191 is subjected to color information conversion processing (CLUT (Color Look Up Table) processing).

The adding unit 192 synthesizes the Base PG plane supplied from the B PG plane generating unit 125 on the Base view video plane supplied from the B video plane generating unit 112 in an overlaid manner, and outputs the synthesis results to the adding unit 194. The Base PG plane supplied from the B PG plane generating unit 125 to the adding unit 192 is subjected to color information conversion processing or correction processing using an offset value.

The adding unit 193 synthesizes the Dependent IG plane supplied from the D IG plane generating unit 121 on the synthesis result by the adding unit 191 in an overlaid manner, and outputs the synthesis results as a Dependent view plane. The Dependent IG plane supplied from the D IG plane generating unit 121 to the adding unit 193 is subjected to color information conversion processing.

The adding unit 194 synthesizes the Base IG plane supplied from the B IG plane generating unit 117 on the synthesis result by the adding unit 192 in an overlaid manner, and outputs the synthesis results as a Base view plane. The Base IG plane supplied from the D IG plane generating unit 121 to the adding unit 194 is subjected to color information conversion processing or correction processing using an offset value.

An image to be displayed based on the Base view plane and the Dependent view plane thus generated becomes an image such that a button and an icon are viewed in front, a caption text is viewed underneath thereof (depth direction), and video is viewed underneath thereof.

In the event that the value of the view_type is 0, the switch 195 outputs the Base view plane as an L view plane, and outputs the Dependent view plane as an R view plane. The view_type is supplied from the controller 51 to the switch 195.

Also, in the event that the value of the view_type is 1, the switch 195 outputs the Base view plane as an R view plane, and outputs the Dependent view plane as an L view plane. Which plane is the Base view plane or Dependent view plane of the supplied planes is identified based on the PID and the view_id.

Thus, with the playback device 1, synthesis of Base view planes, Dependent view planes, and each plane of video, IG, and PG is performed.

At a stage wherein synthesis of all the planes of video, IG, and PG has been completed, whether the synthesis results of the Base view planes is L view or R view is determined based on the view_type, and the R view plane and L view plane are each output.

Also, at the stage wherein synthesis of all the planes of video, IG, and PG has been completed, whether the synthesis results of the Dependent view planes is L view or R view is determined based on the view_type, and the R view plane and L view plane are each output.

[Second Example]

Figure 28:
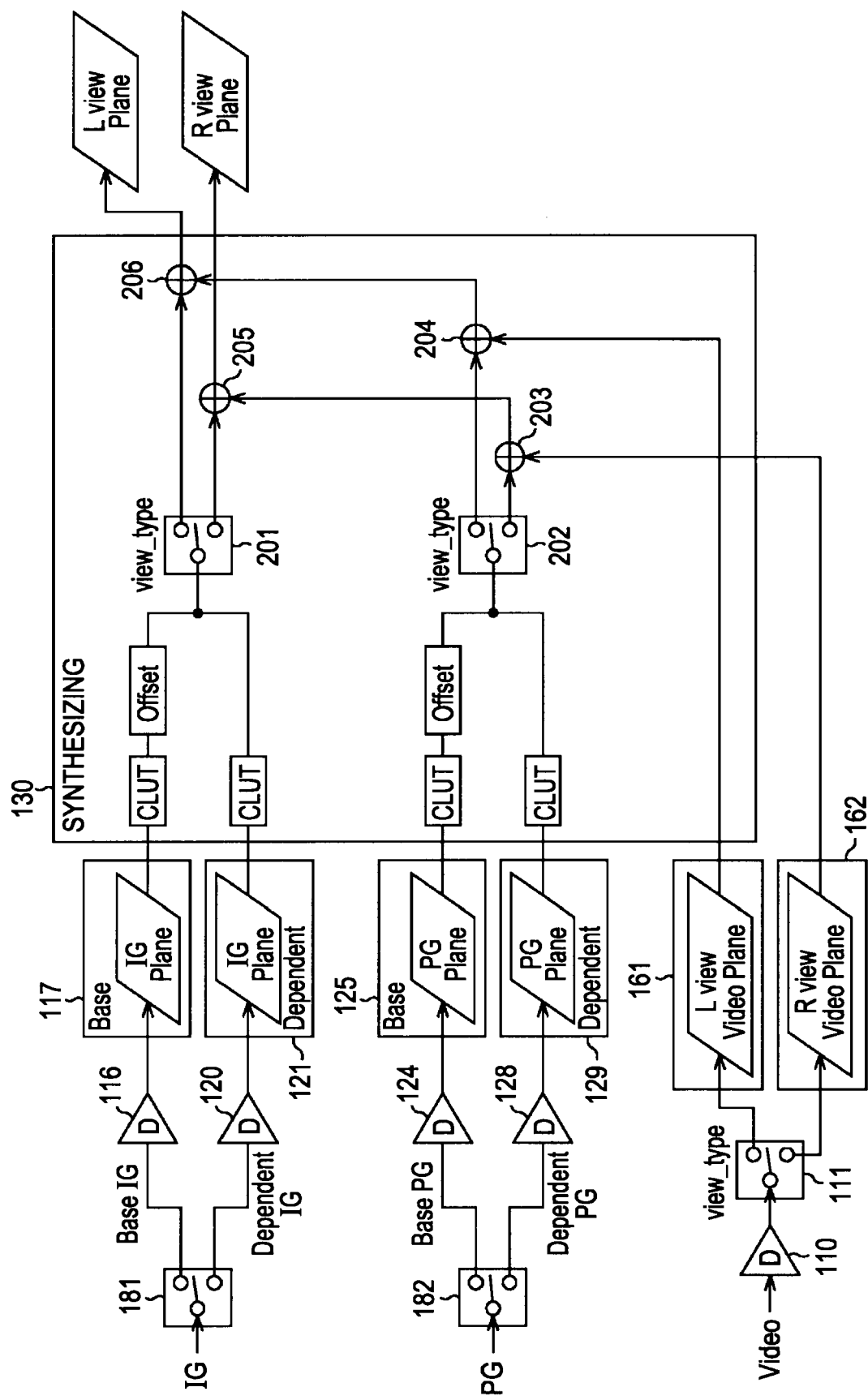
FIG. 28 is another diagram illustrating the configuration of a synthesizing unit and the previous stage thereof.

FIG. 28 is a diagram illustrating the configuration of the synthesizing unit 130 and the previous stage thereof.

Of the configuration illustrated in FIG. 28, the same configuration as the configuration illustrated in FIG. 27 is denoted with the same reference numeral. In FIG. 28, the configuration of the synthesizing unit 130 differs from the configuration in FIG. 27. Also, the operation of the switch 111 differs from the operation of the switch 111 in FIG. 27. An L video plane generating unit 161 is provided instead of the B video plane generating unit 112, and an R video plane generating unit 162 is provided instead of the D video plane generating unit 113. Redundant description will be omitted.

The same value of the view_type is supplied from the controller 51 to the switch 111, and the switch 201 and switch 202 of the synthesizing unit 130.

The switch 111 switches the output destinations of the data obtained by decoding the packets of Base view video, and the data obtained by decoding the packets of Dependent view video based on the view_type in the same way as the switch 111 in FIG. 24.

For example, in the event that the value of the view_type is 0, the switch 111 outputs the data obtained by decoding the packets of Base view video to the L video plane generating unit 161. In this case, the switch 111 outputs the data obtained by decoding the packets of Dependent view video to the R video plane generating unit 162.

On the other hand, in the event that the value of the view_type is 1, the switch 111 outputs the data obtained by decoding the packets of Base view video to the R video plane generating unit 162. In this case, the switch 111 outputs the data obtained by decoding the packets of Dependent view video to the L video plane generating unit 161.

The L video plane generating unit 161 generates an L view video plane based on the data supplied from the switch 111 to output this to the synthesizing unit 130.

The R video plane generating unit 162 generates an R view video plane based on the data supplied from the switch 111 to output this to the synthesizing unit 130.

The synthesizing unit 130 is configured of the switch 201, switch 202, adding units 203 through 206.

The switch 201 switches the output destinations of the Base IG plane supplied from the B IG plane generating unit 117, and the Dependent IG plane supplied from the D IG plane generating unit 121 based on the view_type.

For example, in the event that the value of the view_type is 0, the switch 201 outputs the Base IG plane supplied from the B IG plane generating unit 117 to the adding unit 206 as an L view plane. In this case, the switch 201 outputs the Dependent IG plane supplied from the D IG plane generating unit 121 to the adding unit 205 as an R view plane.

On the other hand, in the event that the value of the view_type is 1, the switch 201 outputs the Dependent IG plane supplied from the D IG plane generating unit 121 to the adding unit 206 as an L view plane. In this case, the switch 201 outputs the Base IG plane supplied from the B IG plane generating unit 117 to the adding unit 205 as an R view plane.

The switch 202 switches the output destinations of the Base PG plane supplied from the B PG plane generating unit 125, and the Dependent PG plane supplied from the D PG plane generating unit 129 based on the view_type.

For example, in the event that the value of the view_type is 0, the switch 202 outputs the Base PG plane supplied from the B PG plane generating unit 125 to the adding unit 204 as an L view plane. In this case, the switch 202 outputs the Dependent PG plane supplied from the D PG plane generating unit 129 to the adding unit 203 as an R view plane.

On the other hand, in the event that the value of the view_type is 1, the switch 202 outputs the Dependent PG plane supplied from the D PG plane generating unit 129 to the adding unit 204 as an L view plane. In this case, the switch 202 outputs the Base PG plane supplied from the B PG plane generating unit 125 to the adding unit 203 as an R view plane.

The adding unit 203 synthesizes the PG plane of the R view supplied from the switch 202 on the R view video plane supplied from the R video plane generating unit 162 in an overlaid manner, and outputs the synthesis results to the adding unit 205.

The adding unit 204 synthesizes the PG plane of the L view supplied from the switch 202 on the L view video plane supplied from the L video plane generating unit 161 in an overlaid manner, and outputs the synthesis results to the adding unit 206.

The adding unit 205 synthesizes the IG plane of the R view supplied from the switch 201 on the plane of the synthesis results by the adding unit 203 in an overlaid manner, and outputs the synthesis results as an R view plane.

The adding unit 206 synthesizes the IG plane of the L view supplied from the switch 201 on the plane of the synthesis results by the adding unit 204 in an overlaid manner, and outputs the synthesis results as an L view plane.

In this way, with the playback device 1, determination is made before synthesis with another plane which plane is L view or R view regarding the Base view plane and Dependent view plane of each of the video, IG, and PG.

After this determination is performed, synthesis of each plane of the video, IG, and PG is performed so as to synthesize L view planes, and R view planes.

[Configuration Example of the Recording Device]

Figure 29:
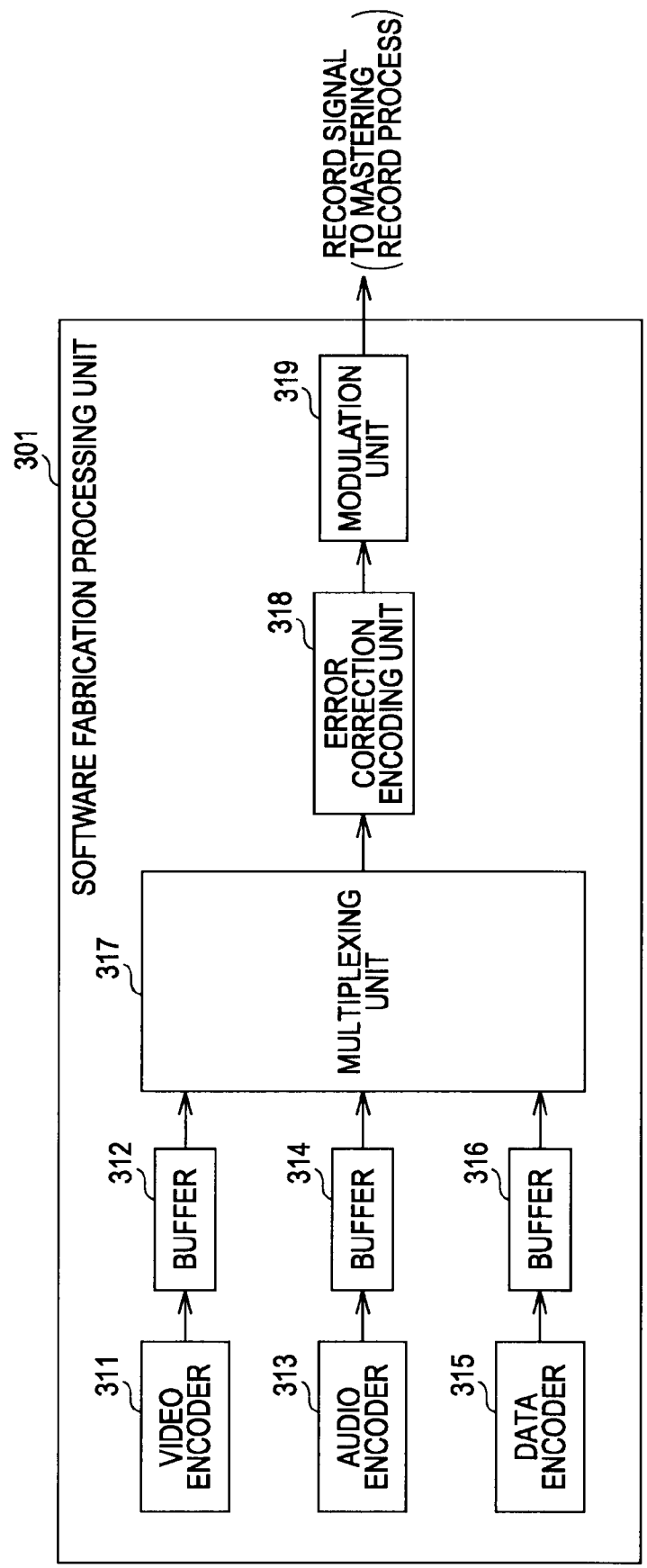
FIG. 29 is a block diagram illustrating a configuration example of a software fabrication processing unit.

FIG. 29 is a block diagram illustrating a configuration example of a software fabrication processing unit 301.

A video encoder 311 has the same configuration as with the MVC encoder 11 in FIG. 3. The video encoder 311 generates a Base view video stream and a Dependent view video stream by encoding a plurality of video data in accordance with the H.264 AVC/MVC profile standard, and outputs these to a buffer 312.

For example, the video encoder 311 sets the DTS and PTS with the same PCR as a reference at the time of encoding. That is to say, the video encoder 311 sets the same DTS to a PES packet for storing the data of a certain Base view video picture, and a PES packet for storing the data of a Dependent view video picture corresponding to the picture thereof in decoding sequence.

Also, the video encoder 311 sets the same PTS to a PES packet for storing the data of a certain Base view video picture, and a PES packet for storing the data of a Dependent view video picture corresponding to the picture thereof in display sequence.

The video encoder 311 sets, as described later, the same information to each of a Base view video picture and a Base view video picture which correspond in decoding sequence as additional information that is secondarily information relating to decoding.

Further, the video encoder 311 sets, as described later, the same value to each of a Base view video picture and a Base view video picture which correspond in display sequence as the value of a POC representing the output sequence of pictures.

Also, the video encoder 311 performs, as described later, encoding so as to match the GOP structure of a Base view video stream and the GOP structure of a Dependent view video stream.

An audio encoder 313 encodes an input audio stream, and outputs the obtained data to a buffer 314. An audio stream to be recorded in a disc is input to the audio encoder 313 along with a Base view video stream and a Dependent view video stream.

A data encoder 315 encodes the above-mentioned various types of data other than video and audio, such as a PlayList file or the like, and outputs the data obtained by encoding to a buffer 316.

The data encoder 315 sets the view_type representing whether the Base view video stream is an L view stream or an R view stream to a PlayList file according to encoding by the video encoder 311. Information representing whether the Depending view video stream is an L view steam or an R view steam may be set instead of the type of the Base view video stream.

Also, the data encoder 315 sets a later-described EP_map to each of a Clip Information file of a Base view video stream, and a Clip Information file of a Dependent view video stream. The picture of a Base view video stream, and the picture of a Dependent view video stream, set to the EP_map serving as a decoding start position, become corresponding pictures.

A multiplexing unit 317 multiplexes the video data and audio data stored in each of the buffers, and data other than streams along with a synchronizing signal, and outputs this to an error correction encoding unit 318.

The error correction encoding unit 318 adds code for error correction to the data multiplexed by the multiplexing unit 317.

A modulation unit 319 subjects the data supplied from the error correction encoding unit 318 to modulation, and outputs this. The output of the modulation unit 319 becomes software to be recorded in the optical disc 2 which can be played at the playback device 1.

The software fabrication processing unit 301 having such a configuration is provided to the recording device.

Figure 30:
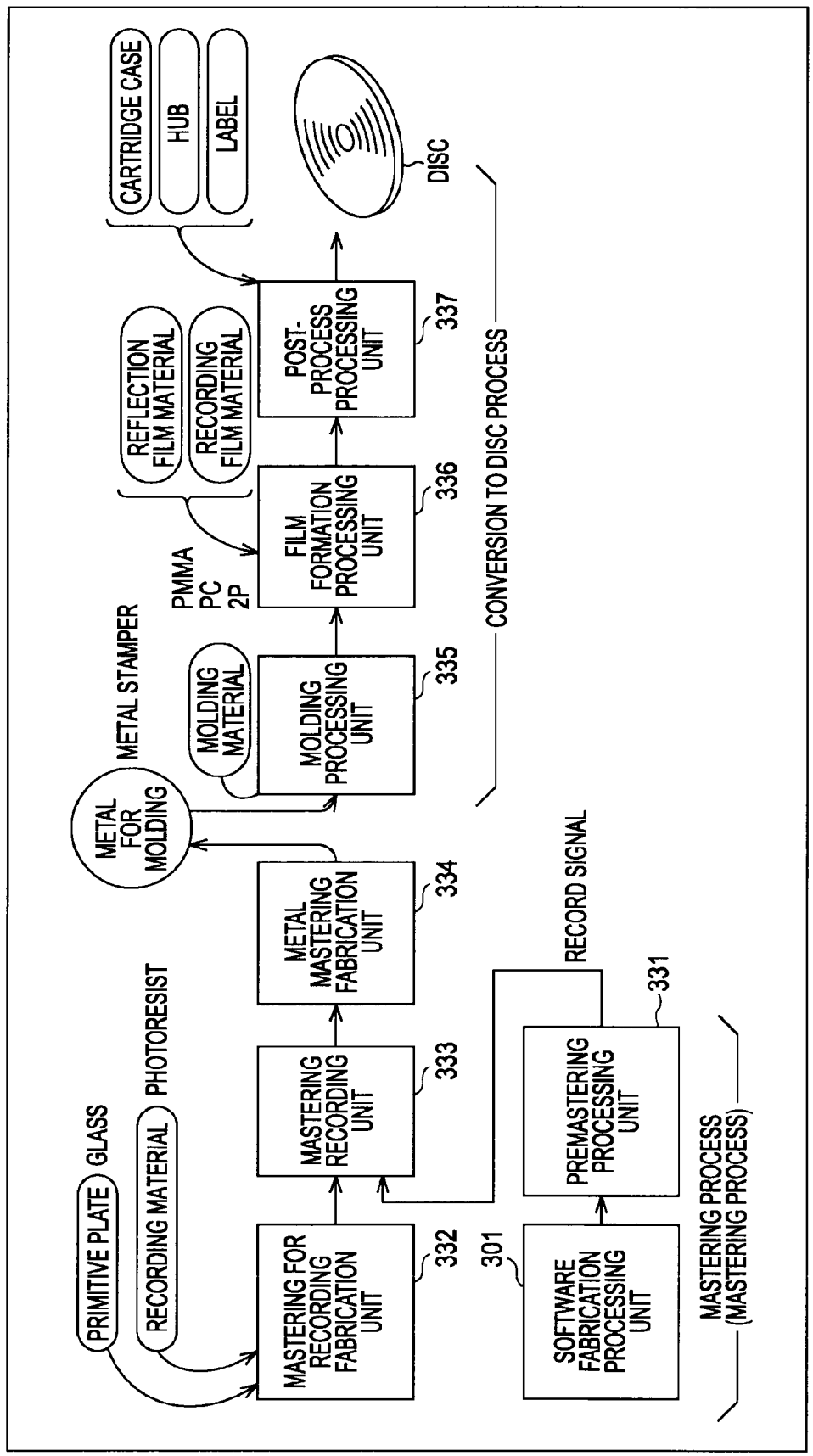
FIG. 30 is a diagram illustrating an example of each configuration including the software fabrication processing unit.

FIG. 30 is a diagram illustrating a configuration example including the software fabrication processing unit 301.

A portion of the configuration illustrated in FIG. 30 may be provided to the inside of the recording device.

The record signal generated by the software fabrication processing unit 301 is subjected to mastering processing at a premastering processing unit 331, and a format signal to be recorded in the optical disc 2 is generated. The generated signal is supplied to a mastering recording unit 333.

With a mastering for recording fabrication unit 332, a mastering made up of glass or the like is prepared, on which a recording material made up of photo resist is applied. Thus, a mastering for recording is fabricated.

With a mastering recording unit 333, a laser beam is modulated in response to a record signal supplied from the premastering processing unit 331, and is irradiated on the photo resist on the mastering. Thus, the photo resist on the mastering is exposed in response to the record signal. Subsequently, this mastering is developed, and emergence of a pit is performed on the mastering.

With a metal mastering fabrication unit 334, the mastering is subjected to processing such as electroforming or the like, and thus, a metal mastering to which the pits on the glass mastering are transferred is fabricated. Further, a metal stamper is fabricated from this metal mastering, and this is taken as a molding die.

With a molding processing unit 335, a material such as PMMA (acrylic), PC (polycarbonate), or the like is injected into the molding die, thereby fixing the molding die. Alternatively, after 2P (ultraviolet curing resin) or the like is applied on the metal stamper, an ultraviolet ray is irradiated thereupon, thereby hardening the molding die. Thus, pits on the metal stamper can be transferred onto a replica made of resin.

With a film formation processing unit 336, a reflection film is formed on the replica by vapor deposition or sputtering. Alternatively, a reflection film is formed on the replica by spin coating.

With a post-process processing unit 337, this disc is subjected to diameter process, thereby being subjected to necessary measures such that two discs are pasted together. Further, after a label is pasted thereupon or a hub is attached thereto, the disc is inserted into a cartridge. Thus, the optical disc 2 in which data that can be played by the playback device 1 is recorded is completed.

Second Embodiment

Operation 1 of H.264 AVC/MVC Profile Video Stream

With the BD-ROM standard that is the standard of the optical disc 2, as described above, encoding of 3D video is realized by employing H.264 AVC/MVC Profile.

Also, with the BD-ROM standard, the Base view video stream is taken as an L view video stream, and the Dependent view video stream is taken as an R view video stream.

The Base view video is encoded as a H.264 AVC/High Profile video stream, whereby the optical disc 2 which is a 3D-compatible disc can be played even at the past player, or a player compatible with 2D playback alone. That is to say, lower-compatibility can be secured.

Specifically, the Base view video stream alone can be decoded (played) even at a decoder nonconforming to the H.264 AVC/MVC profile standard. That is to say, the Base view video stream becomes a stream which can necessarily be played even at an existing 2D BD player.

Also, the Base view video stream is commonly used with 2D playback and 3D playback, whereby reduction of load at the time of authoring can be realized. With regard to AV streams, the authoring side can fabricate a 3D-compatible disc by preparing the Dependent view video stream in addition to conventional work.

Figure 31:
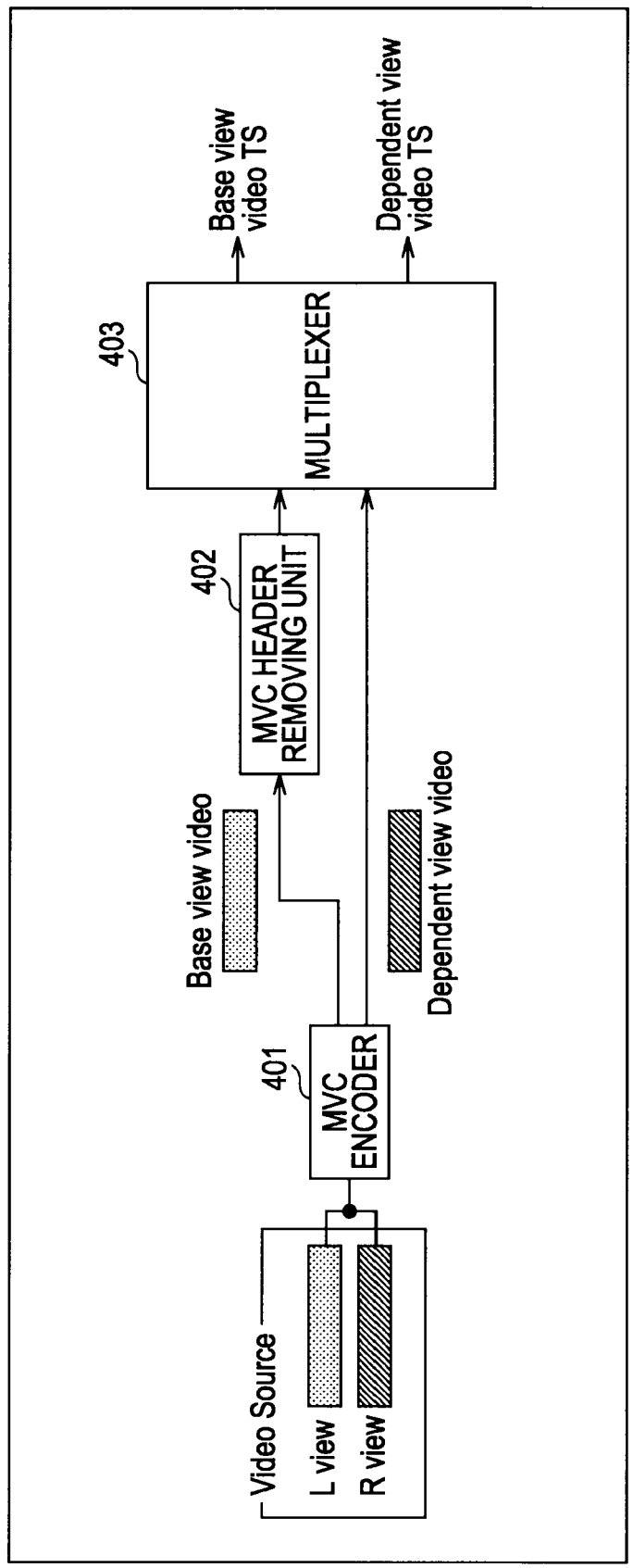
FIG. 31 is a diagram illustrating a configuration example of a 3D video TS generating unit to be provided to a recording device.

FIG. 31 is a diagram illustrating a configuration example of a 3D video TS generating unit to be provided to the recording device.

The 3D video TS generating unit in FIG. 31 is configured of an MVC encoder 401, an MVC header removing unit 402, and a multiplexer 403. The data of L view video #1, and the data of R view video #2, which are shot as described with reference to FIG. 2, are input to the MVC encoder 401.

The MVC encoder 401 encodes, in the same way as with the MVC encoder 11 in FIG. 3, the data of the L view video #1 by H.264/AVC to output the AVC video data obtained by encoding as the Base view video stream. Also, the MVC encoder 401 generates the Dependent view video stream based on the data of the L view video #1 and the data of the R view video #2, and outputs this.

The Base view video stream output from the MVC encoder 401 is made up of Access Units in which the data of each picture of the Base view video is stored. Also, the Dependent view video stream output from the MVC encoder 401 is made up of Dependent Units in which the data of each picture of the Dependent view video is stored.

Each Access Unit making up the Base view video stream, and each Dependent Unit making up the Dependent view video stream include an MVC header in which the view_id for identifying a stored view component is described.

A fixed value equal to or greater than 1 is employed as the value of the view_id to be described in the MVC header of the Dependent view video. This is true for the examples in FIG. 32 and FIG. 33.

That is to say, the MVC encoder 401, which differs from the MVC encoder 11 in FIG. 3, is an encoder for generating each stream of the Base view video and Dependent view video in a form to which an MVC header is added, and outputting this. With the MVC encoder 11 in FIG. 3, an MVC header is added to the Dependent view video alone encoded by the H.264 AVC/MVC profile standard.

The Base view video stream output from the MVC encoder 401 is supplied to the MVC header removing unit 402, and the Dependent view video stream is supplied to the multiplexer 403.

The MVC header removing unit 402 removes an MVC header included in each Access Unit making up the Base view video stream. The MVC header removing unit 402 outputs the Base view video stream made up of an Access Unit of which the MVC header has been removed to the multiplexer 403.

The multiplexer 403 generates a TS including the Base view video stream supplied from the MVC header removing unit 402, and the Dependent view video stream supplied from the MVC encoder 401, and outputs this. With the example in FIG. 31, a TS including the Base view video stream, and a TS including the Dependent view video stream are each output, but these streams may be output by being multiplexed in the same TS as described above.

Thus, an MVC encoder can be conceived wherein depending on mounting methods, L view video and R view video are taken as input, and each stream of the Base view video and the Dependent view video to which an MVC header is added is output.

Note that the whole configuration illustrated in FIG. 31 may be included in the MVC encoder as illustrated in FIG. 3. This is true for the configurations illustrated in FIG. 32 and FIG. 33.

Figure 32:
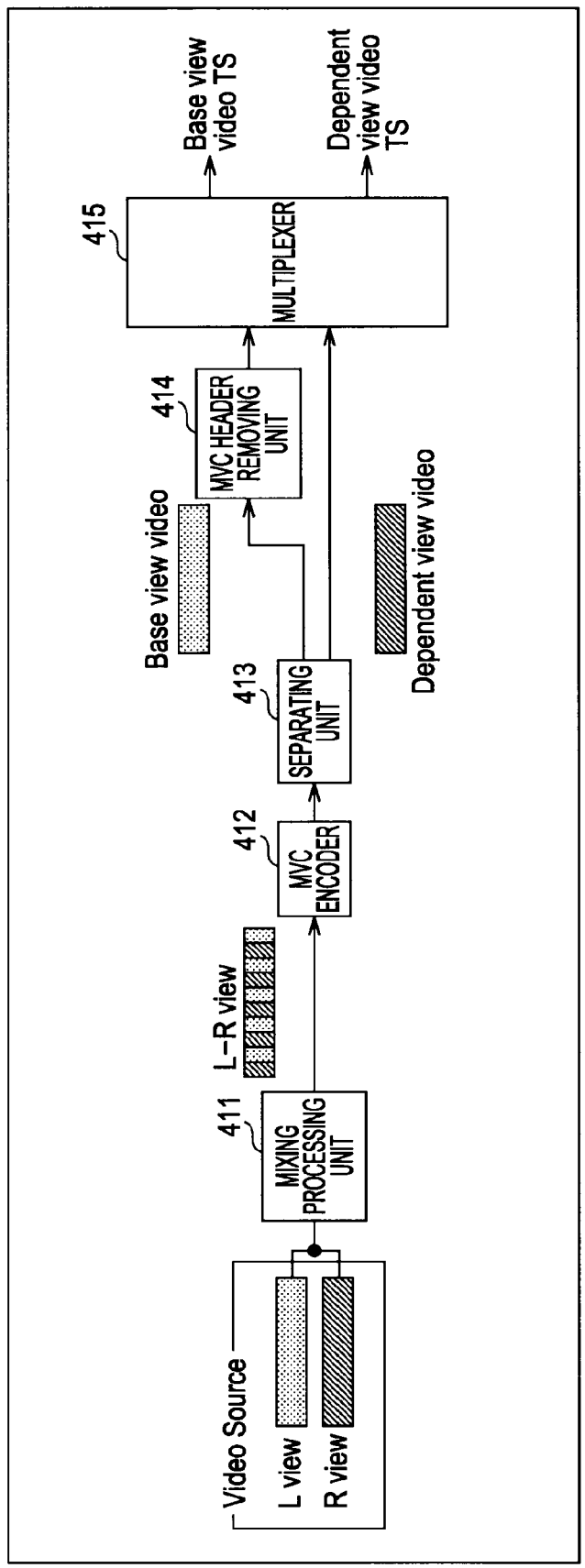
FIG. 32 is a diagram illustrating another configuration example of the 3D video TS generating unit to be provided to the recording device.

FIG. 32 is a diagram illustrating another configuration example of the 3D video TS generating unit to be provided to the recording device.

The 3D video TS generating unit in FIG. 32 is configured of a mixing processing unit 411, an MVC encoder 412, a separating unit 413, an MVC header removing unit 414, and a multiplexer 415. The data of the L view video #1, and the data of the R view video #2 are input to the mixing processing unit 411.

The mixing processing unit 411 arrays each picture of L view, and each picture of R view in encoding sequence. Each picture of the Dependent view video is encoded with reference to the corresponding picture of the Base view video, and accordingly, the results arrayed in encoding sequence are the pictures of L view and the pictures of R view being alternately arrayed.

The mixing processing unit 411 outputs the pictures of L view and the pictures of R view arrayed in encoding sequence to the MVC encoder 412.

The MVC encoder 412 encodes each picture supplied from the mixing processing unit 411 in accordance with the H.264 AVC/MVC profile standard, and outputs the stream obtained by encoding to the separating unit 413. The base view stream and the Dependent view video stream are multiplexed in the stream output from the MVC encoder 412.

The Base view video stream included in the stream output from the MVC encoder 412 is made up of Access Units in which the data of each picture of the Base view video is stored. Also, the Dependent view video stream included in the stream output from the MVC encoder 412 is made up of Dependent Units in which the data of each picture of the Dependent view video is stored.

An MVC header in which the view_id for identifying a stored view component is described is included in each Access Unit making up the Base view video stream, and each Dependent Unit making up the Dependent view video stream.

The separating unit 413 separates the Base view video stream and the Dependent view video stream multiplexed in the stream supplied from the MVC encoder 412, and outputs these. The Base view video stream output from the separating unit 413 is supplied to the MVC header removing unit 414, and the Dependent view video stream is supplied to the multiplexer 415.

The MVC header removing unit 414 removes an MVE header included in each Access Unit making up the Base view video stream supplied from the separating unit 413. The MVC header removing unit 414 outputs the Base view video stream made up of an Access Unit of which the MVC header has been removed to the multiplexer 415.

The multiplexer 415 generates a TS including the Base view video stream supplied from the MVC header removing unit 414, and the Dependent view video stream supplied from the separating unit 413, and outputs this.

Figure 33:
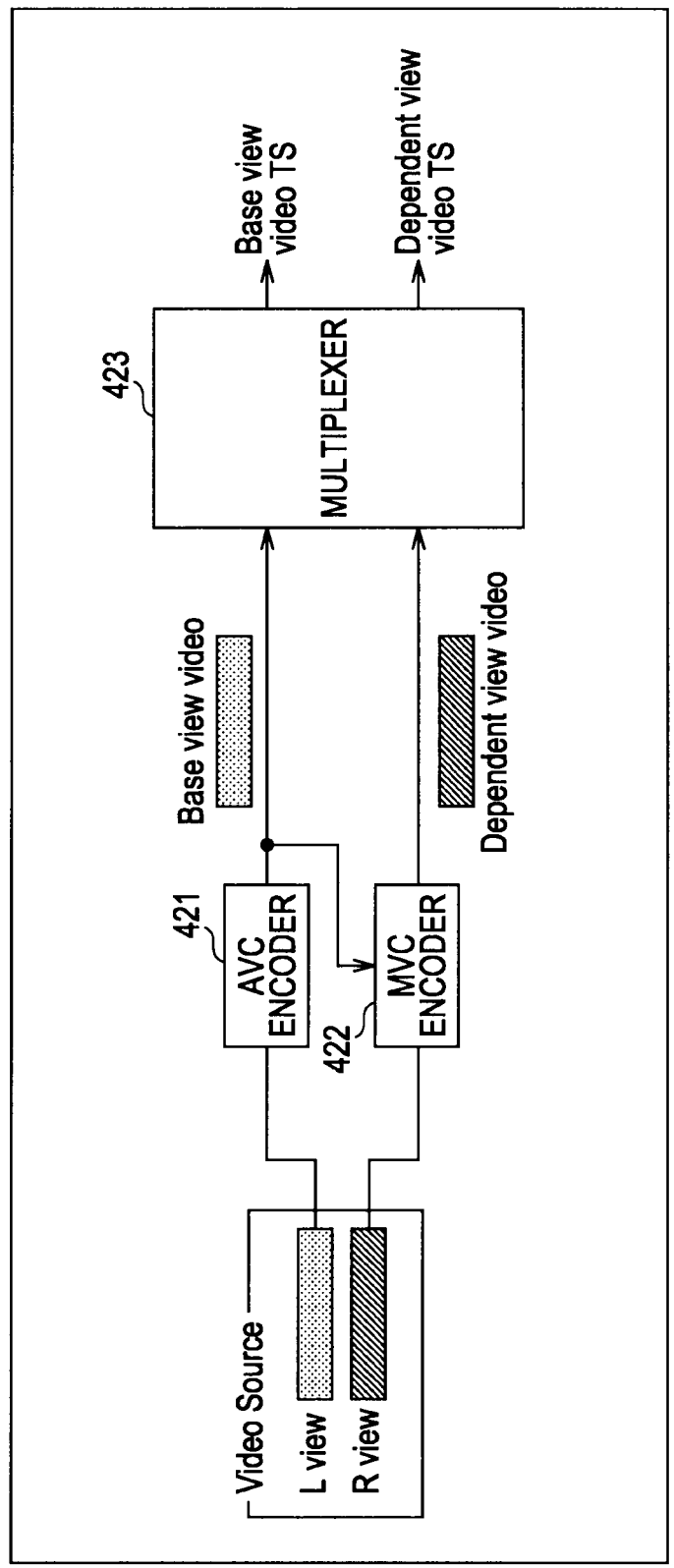
FIG. 33 is a diagram illustrating yet another configuration example of the 3D video TS generating unit to be provided to the recording device.

FIG. 33 is a diagram illustrating yet another configuration example of the 3D video TS generating unit to be provided to the recording device.

The 3D video TS generating unit in FIG. 33 is configured of an AVC encoder 421, an MVC encoder 422, and a multiplexer 423. The data of the L view video #1 is input to the AVC encoder 421, and the data of the R view video #2 is input to the MVC encoder 422.

The AVC encoder 421 encodes the data of the L view video #1 in accordance with H.264/AVC, and outputs the AVC video stream obtained by encoding to the MVC encoder 422 and the multiplexer 423 as the Base view video stream. Each Access Unit making up the Base view video stream output from the AVC encoder 421 includes no MVC header.

The MVC encoder 422 decodes the Base view video stream (AVC video stream) supplied from the AVC encoder 421 to generate the data of the L view video #1.

Also, the MVC encoder 422 generates a Dependent view video stream based on the data of the L view video #1 obtained by decoding, and the data of the R view video #2 externally input, and outputs this to the multiplexer 423. Each Dependent Unit making up the Dependent view video stream output from the MVC encoder 422 includes an MVC header.

The multiplexer 423 generates a TS including the Base view video stream supplied from the AVC encoder 421, and the Dependent view video stream supplied from the MVC encoder 422, and outputs this.

The AVC encoder 421 in FIG. 33 has the function of the H.264/AVC encoder 21 in FIG. 3, and the MVC encoder 422 has the functions of the H.264/AVC encoder 22 and the Dependent view video encoder 24 in FIG. 3. Also, the multiplexer 423 has the function of the multiplexer 25 in FIG. 3.

The 3D video TS generating unit having such a configuration is provided within the recording device, whereby encoding of the MVC header as to an Access Unit storing the data of the Base view video can be prohibited. Also, an MVC header of which the view_id equal to or greater than 1 is set may be included in a Dependent Unit storing the data of the Dependant view video.

Figure 34:
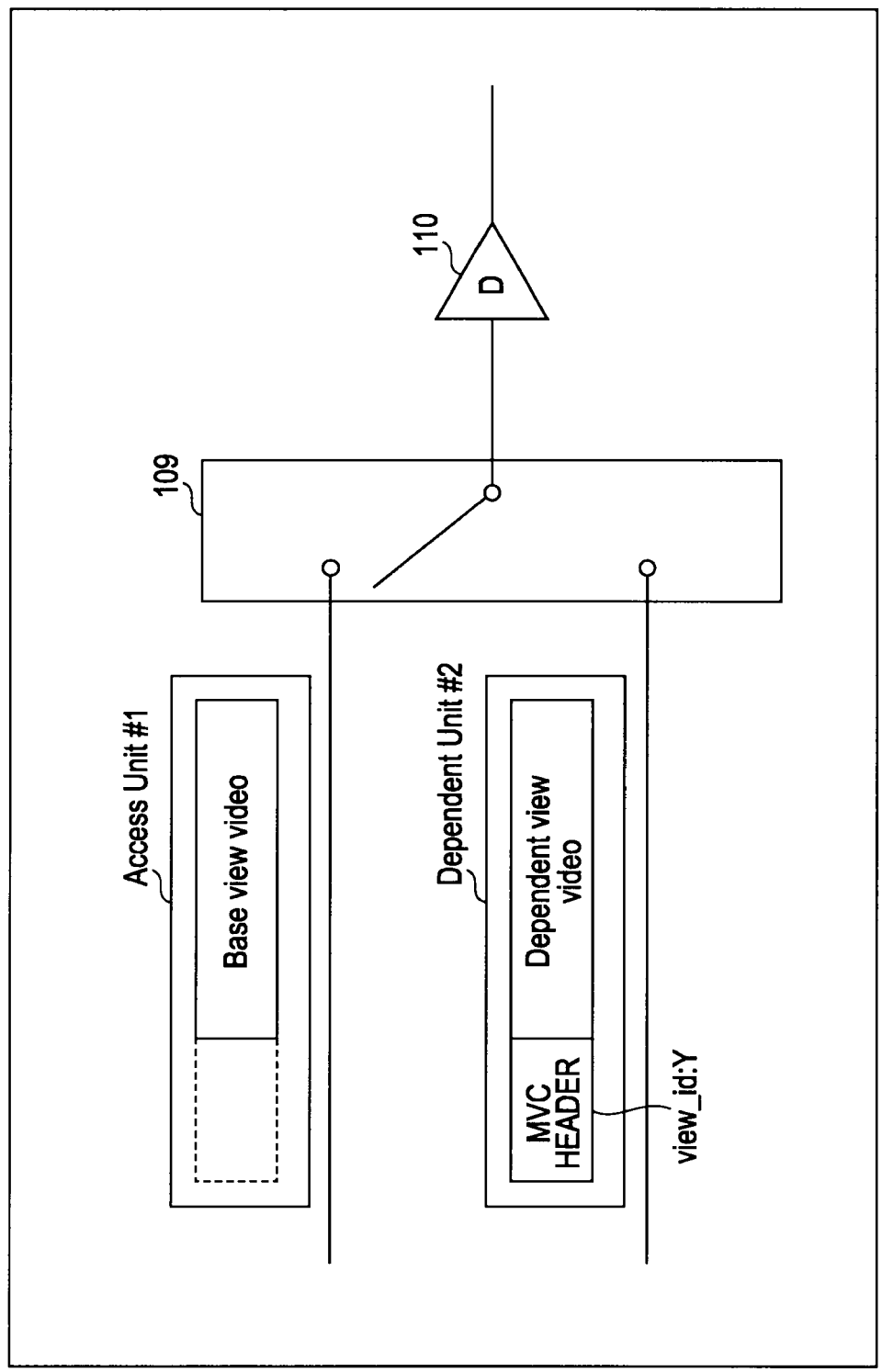
FIG. 34 is a diagram illustrating the configuration of the playback device side for decoding an Access Unit.

FIG. 34 is a diagram illustrating the configuration of the playback device 1 side for decoding an Access Unit.

FIG. 34 illustrates the switch 109 and the video decoder 110 described with reference to FIG. 22 and so forth. An Access Unit #1 including the data of Base view video, and a Dependent Unit #2 including the data of Dependent view video are read out from the buffer, and are supplied to the switch 109.

Encoding is performed with reference to the Base view video, and accordingly, in order to correctly decode the Dependent view video, first, the corresponding Base view video needs to have been decoded.

With the H.264/MVC profile standard, the decoding side is arranged to calculate the decoding sequence of each unit using the view_id included in an MVC header. Also, the minimum value is always arranged to be set to the Base view video as the value of the view_id at the time of encoding. The decoder is arranged to be able to decode the Base view video and the Dependent view video in correct sequence by starting decoding from a unit including an MVC header to which the minimum view_id is set.

Incidentally, encoding of an MVC header is prohibited as to an Access Unit storing the Base view video, to be supplied to the video decoder 110 of the playback device 1.

Therefore, with the playback device 1, a view component stored in an Access Unit having no MVC header is defined so as to recognize the view_id thereof to be 0.

Thus, the playback device 1 can identify the Base view video based on the view_id recognized to be 0, and can identify the Dependent view video based on the view_id actually set other than 0.

The switch 109 in FIG. 34 first outputs the Access Unit #1 recognized that the minimum value 0 is set as the view_id to the video decoder 110 to perform decoding.

Also, after decoding of the Access Unit #1 is completed, the switch 109 outputs the Dependent Unit #2 that is a unit to which Y that is a fixed value greater than 0 is set as the view_id to the video decoder 110 to perform decoding. The picture of the Dependent view video stored in the Dependent Unit #2 is a picture corresponding to the picture of the Base view video stored in Access Unit #1.

In this way, encoding of an MVC header as to an Access Unit storing the Base view video is prohibited, whereby the Base view video stream recorded in the optical disc 2 can be handled as a playable stream even at a conventional player.

As a condition of the Base view video stream of the BD-ROM 3D standard expanded from the BD-ROM standard, even in the event that a condition is determined wherein the Base view video stream is a playable stream even at a conventional player, the condition thereof can be satisfied.

Figure 35:
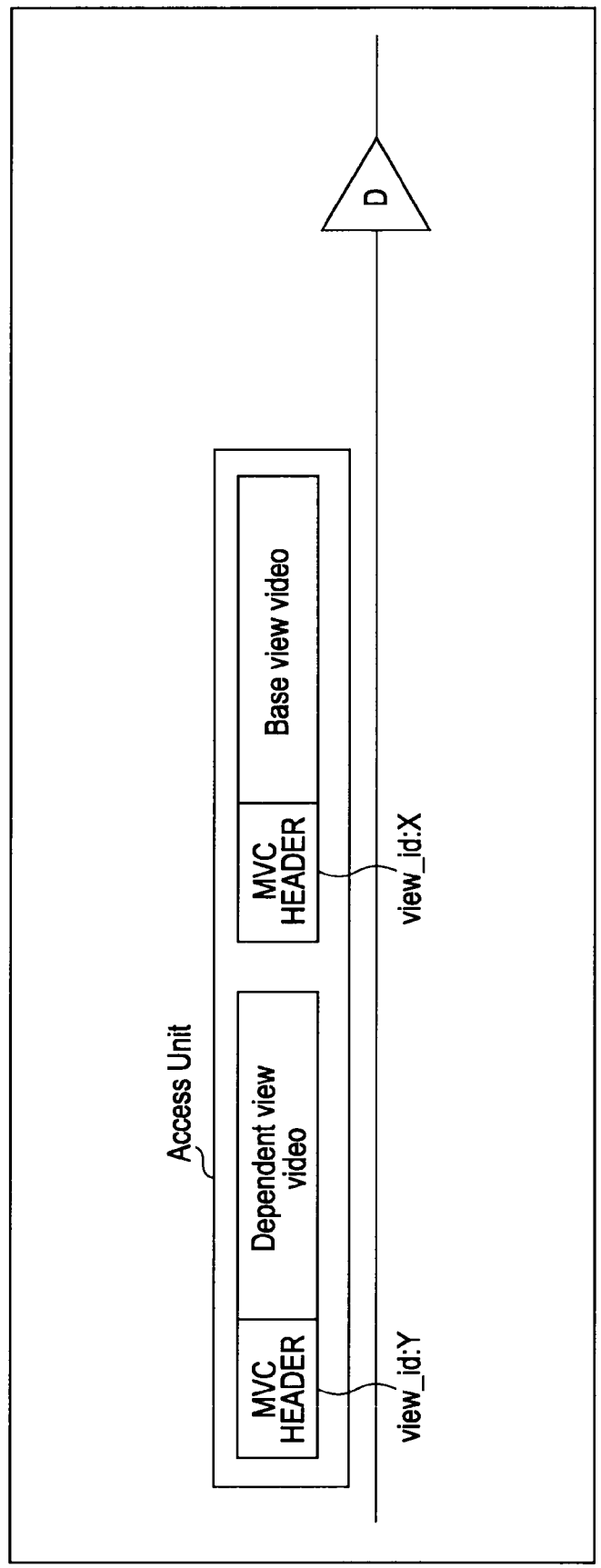
FIG. 35 is a diagram illustrating decoding processing.

For example, as illustrated in FIG. 35, in the event that an MVC header is added to each of the Base view video and the Dependent view video beforehand, and decoding is performed previously from the Base view video, the Base view video thereof is not played at a conventional player. The MVC header is undefined data as to an H.264/AVC decoder which is mounted on a conventional player. In the event that such undefined data is input, this cannot be ignored depending on decoders, and the processing may fail.

Note that, in FIG. 35, the view_id of the Base view video is X, and the view_id of the Dependent view video is Y greater than X.

Also, even in the event that encoding of an MVC header has been prohibited, the playback device 1 can be caused to first perform decoding of the Base view video, and subsequently to perform decoding of the corresponding Dependent view video by defining the view_id of the Base view video so as to be regarded as 0. That is to say, decoding can be performed in correct sequence.

[Operation 2]

About GOP Structure

With the H.264/AVC standard, the GOP (Group Of Pictures) structure according to the MPEG-2 video standard is not defined.

Therefore, with the BD-ROM standard for handling a H.264/AVC video stream, the GOP structure of an H.264/AVC video stream is defined, and various types of functions using a GOP structure such as random access are realized.

The Base view video stream and the Dependent view video stream that are video streams obtained by encoding conforming to the H.264 AVC/MVC profile standard have no definition regarding the GOP structure, in the same way as with the H.264/AVC video stream.

The Base view video stream is an H.264/AVC video stream. Accordingly, the GOP structure of the Base view video stream has the same structure as the GOP structure of the H.264/AVC video stream defined in the BD-ROM standard.

The GOP structure of the Dependent view video stream is also defined as the same structure as the GOP structure of the Base view video stream, i.e., the GOP structure of the H.264/AVC video stream defined in the BD-ROM standard.

The GOP structure of the H.264/AVC video stream defined in the BD-ROM standard has the following features.

1. Features Regarding the Stream Structure (1) Open GOP/Closed GOP structure

Figure 36:
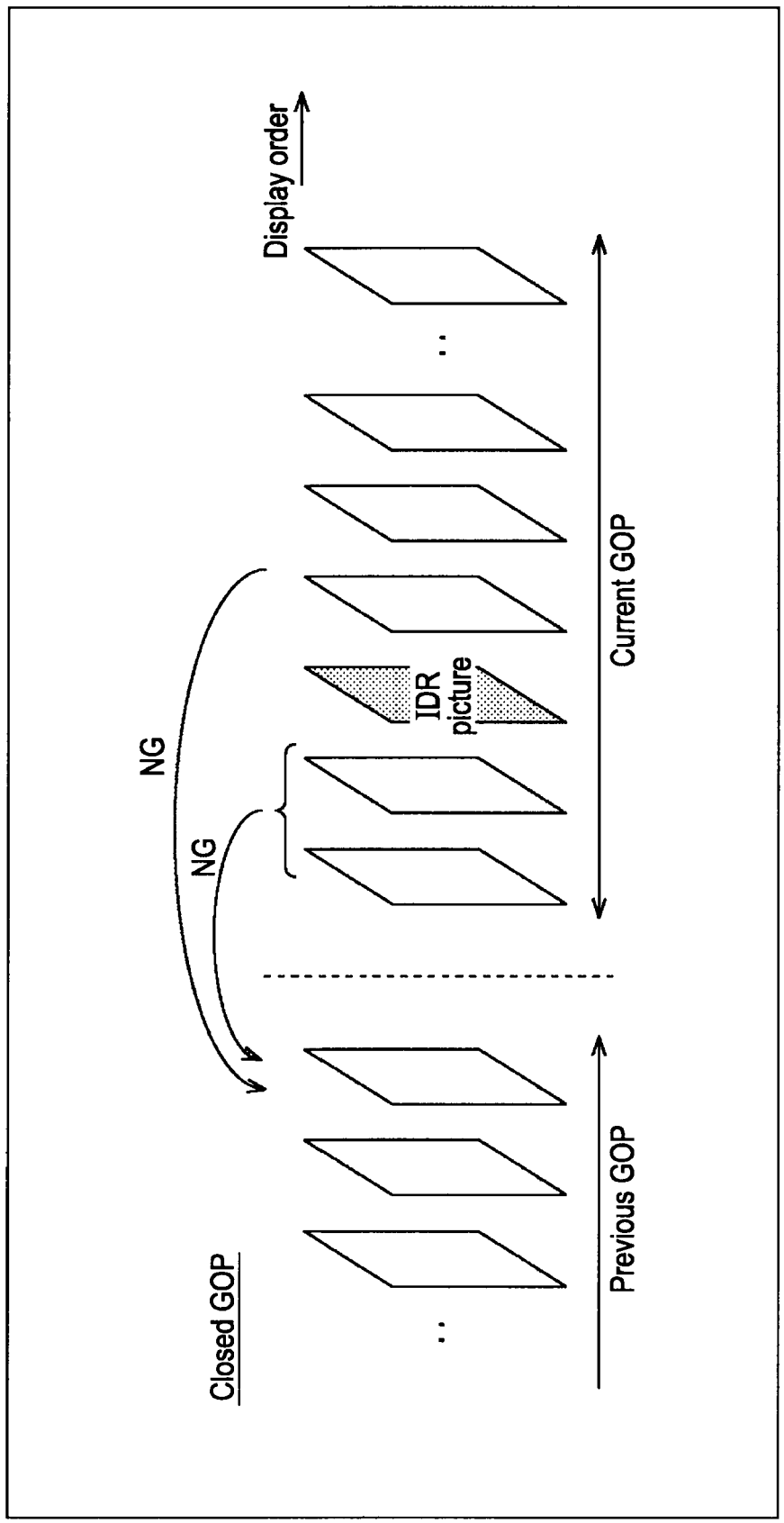
FIG. 36 is a diagram illustrating a Close GOP structure.

FIG. 36 is a diagram illustrating a Closed GOP structure.

Each picture in FIG. 36 is a picture making up the H.264/AVC video stream. The Closed GOP includes an IDR (Instantaneous Decoding Refresh) picture.

The IDR picture is an I picture, and is first decoded in a GOP including an IDR picture. At the time of decoding the IDR picture, all of the information relating to decoding such as the state of a reference picture buffer (DPB 151 in FIG. 22), frame numbers managed so far, POC (Picture Order Count) and so forth is reset.

As illustrated in FIG. 36, with the current GOP that is a Closed GOP, of the pictures of the current GOP thereof, pictures having display sequence earlier than (older than) the IDR picture are prevented from referencing the pictures of the last GOP.

Also, of the pictures of the current GOP, pictures having display sequence later than (younger than) the IDR picture are prevented from referencing the pictures of the last GOP exceeding the IDR picture. With the H.264/AVC, a P picture after an I picture in display sequence is allowed to reference a picture before the I picture thereof.

Figure 37:
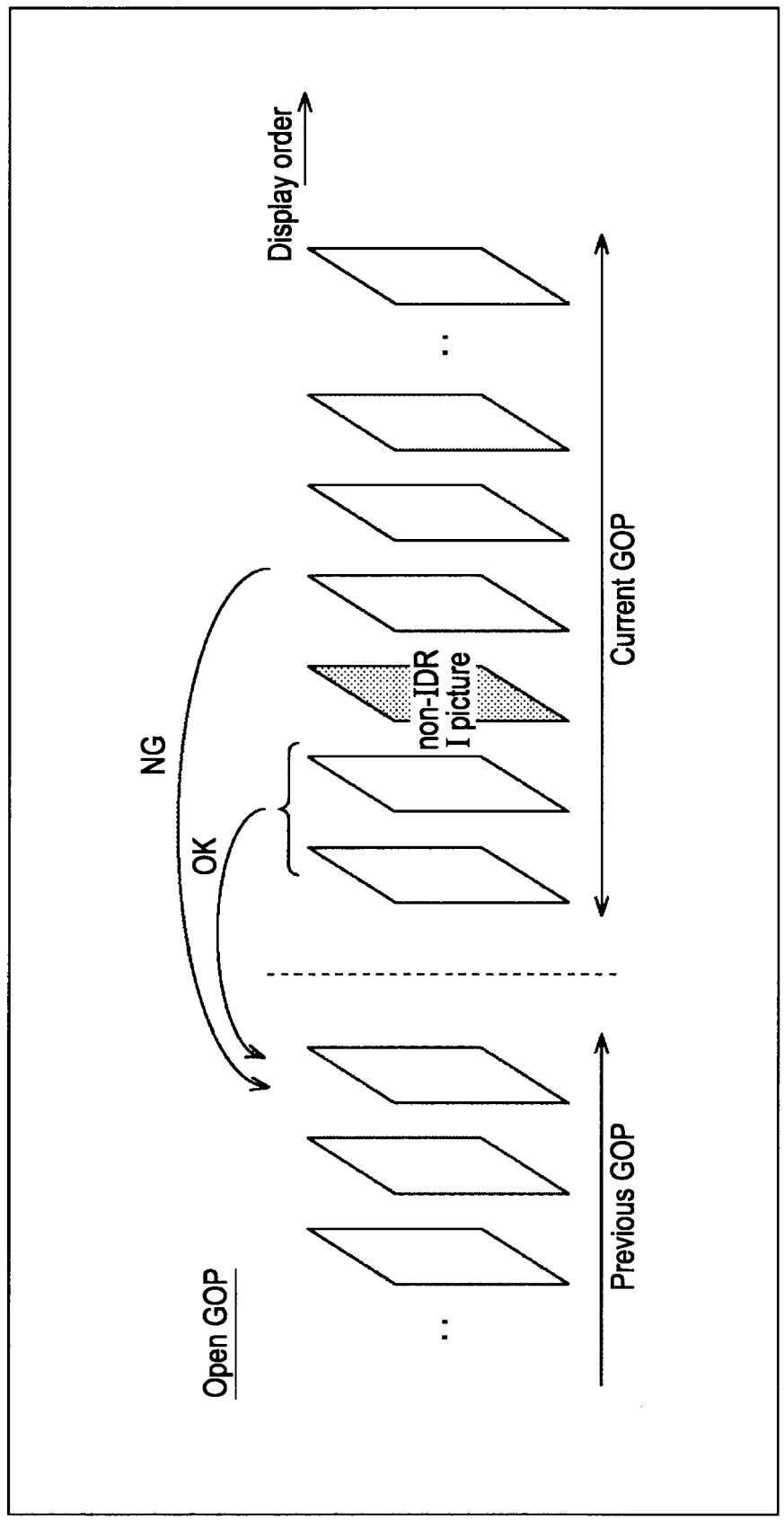
FIG. 37 is a diagram illustrating an Open GOP structure.

FIG. 37 is a diagram illustrating an Open GOP structure.

Such as illustrate in FIG. 37, with the current GOP that is an Open GOP, of the pictures of the current GOP thereof, a picture having display sequence earlier than (older than) an non-IDR I picture (I picture other than the IDR picture) is allowed to reference the pictures of the last GOP.

Also, of the pictures of the current GOP, a picture later than a non-IDR I picture in the display sequence is forbidden from referencing pictures of the last GOP beyond the non-IDR I picture.

(2) SPS and PPS are necessarily encoded with the top Access Unit of a GOP.

An SPS (Sequence Parameter Set) is the header information of a sequence, including information relating to encoding of the whole sequence. At the time of decoding of a certain sequence, an SPS including the identification information of the sequence, and so forth is first necessary. A PPS (Picture Parameter Set) is the header information of a picture, including information relating to encoding of the whole picture.

(3) The maximum 30 PPSs can be encoded with the top Access Unit of a GOP. In the event that multiple PPSs are encoded with the top Access Unit, the id (pic_parameter_set_id) of each PPS should not be the same.

(4) Up to the maximum one PPS can be encoded with an Access Unit other than the top of a GOP.

2. Features Regarding a Reference Structure (1) I, P, and B pictures are required to be pictures configured of I, P, B slice alone, respectively.

(2) A B picture immediately before a reference picture (I or P picture) in display sequence is required to be necessarily encoded immediately after the reference picture thereof in encoding sequence.

(3) The encoding sequence and display sequence of a reference picture (I or P picture) are required to be maintained (the same).

(4) It is prohibited to reference a B picture from a P picture.

(5) In the event that a non-reference B picture (B1) is earlier than a non-reference picture (B2) in encoding sequence, the B1 is also required to be earlier than the B2 in display sequence.

A non-reference B picture is a B picture not referenced by another picture later in display sequence.

(6) A reference B picture can reference the last or next reference picture (I or P picture) in display sequence.

(7) A non-reference B picture can reference the last or next reference picture (I or P picture) in display sequence, or a reference B picture.

(8) The number of continuous B pictures is required to be 3 at the maximum.

3. Features Regarding the Maximum Number of Frames or Fields within a GOP

The maximum number of frames or fields within a GOP is stipulated according to the frame rate of video, as illustrated in FIG. 38.

As illustrated in FIG. 38, for example, in the event that interlace display is performed with a frame rate of 29.97 frames per second, the maximum number of fields that can be displayed with the pictures of 1 GOP is 60. Also, in the event that progressive display is performed with a frame rate of 59.94 frames per second, the maximum number of frames that can be displayed with the pictures of 1 GOP is 60.

A GOP structure having the features mentioned above is also defined as the GOP structure of the Dependent view video stream.

Also, it is stipulated as a constraint that the structure of a certain GOP of the Base view video stream is matched with the structure of the GOP of the corresponding Dependent view video stream.

Figure 39:
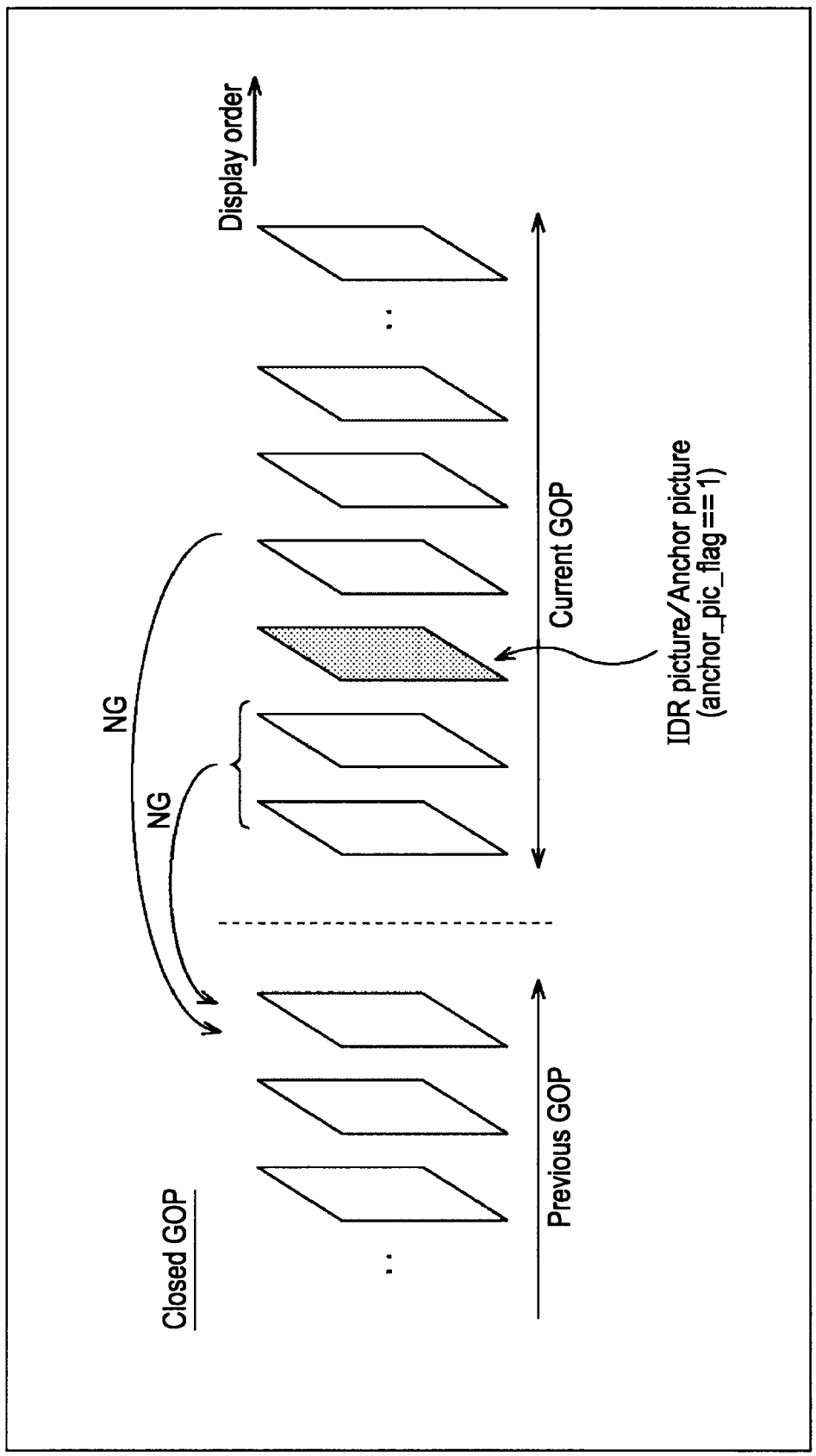
FIG. 39 is a diagram illustrating a Close GOP structure.

FIG. 39 illustrates the Closed GOP structure of the Base view video stream or Dependent view video stream defined as described above.

As illustrated in FIG. 39, with the current GOP that is a Closed GOP, of the pictures of the current GOP thereof, it is prohibited for a picture having display sequence anterior to (older than) an IDR picture or anchor picture to reference the pictures of the last GOP. The anchor picture will be described later.

Also, of the pictures of the current GOP, it is prohibited for a picture having display sequence later than (younger than) an IDR picture or anchor picture to reference the pictures of the last GOP exceeding the IDR picture or anchor picture.

Figure 40:
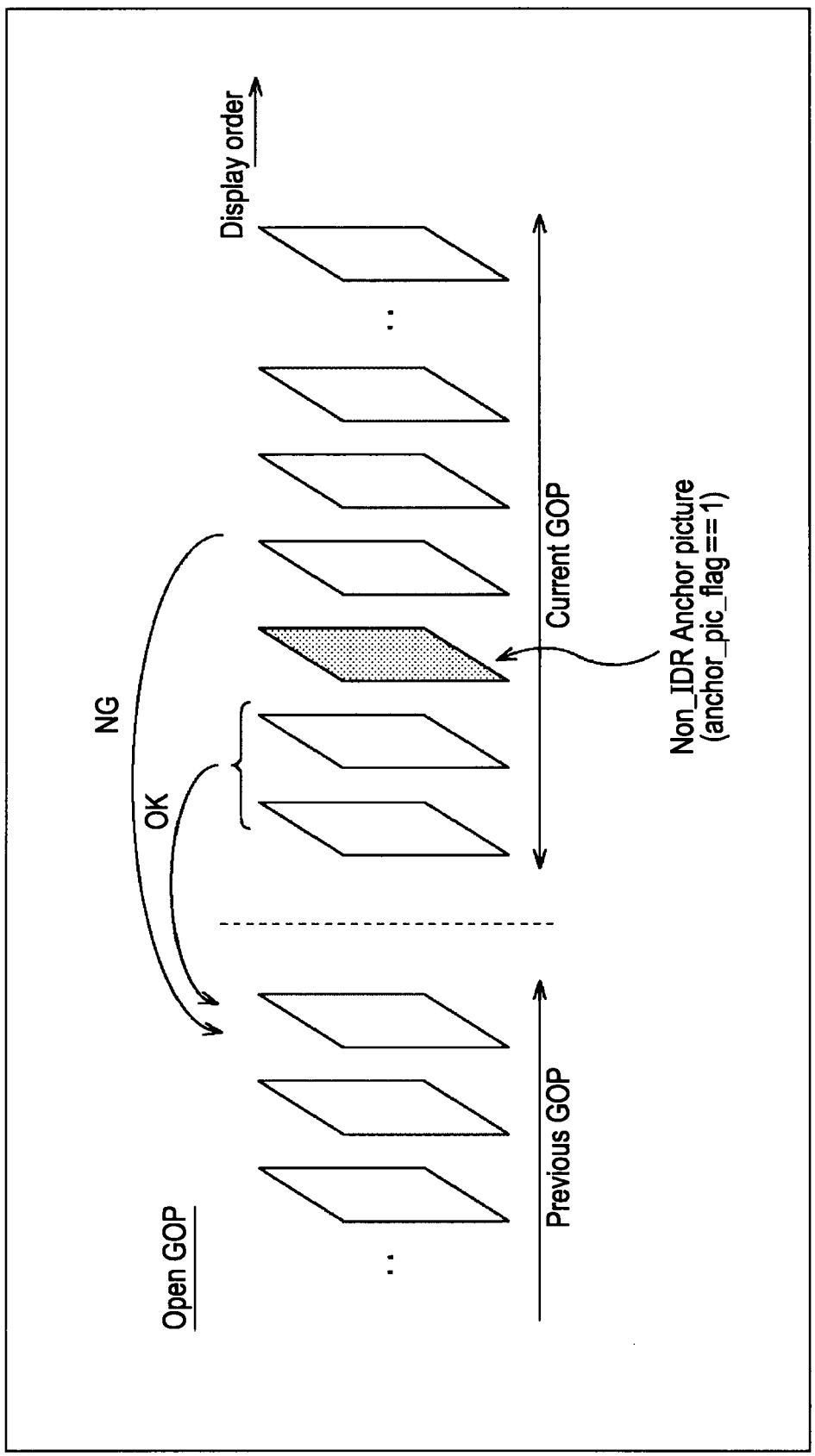
FIG. 40 is a diagram illustrating an Open GOP structure.

FIG. 40 is a diagram illustrating the Open GOP structure of the Base view video stream or Dependent view video stream.

As illustrated in FIG. 40, with the current GOP that is an Open GOP, of the pictures of the current GOP thereof, a picture having display sequence anterior to a non-IDR anchor picture (anchor picture that is not an IDR picture) is allowed to reference the pictures of the last GOP.

Also, of the pictures of the current GOP, it is prohibited for a picture having display sequence later than a non-IDR anchor picture to reference the pictures of the last GOP exceeding the non-IDR anchor picture.

A GOP structure is defined as described above, whereby a certain GOP of the Base view video stream, and the GOP of the corresponding Dependent view video stream are matched in the features of stream structure such as an Open GOP or Closed GOP, for example.

Also, the features of a picture reference structure are matched such that the picture of the Dependent view video corresponding to a non-reference B picture of the Base view video necessarily becomes a non-reference B picture.

Further, the number of frames, and the number of fields are also matched between a certain GOP of the Base view video stream, and the GOP of the corresponding Dependent view video stream.

In this way, the GOP structure of the Dependent view video stream is defined as the same structure as the GOP structure of the Base view video stream, whereby the corresponding GOPs between streams can have the same features.

Also, even in the event that decoding is performed from the middle of a stream, this can be performed without problems. Decoding from the middle of a stream is performed, for example, at the time of trick play or random access.

In the event that the structures of corresponding GOPs between streams differ, such as the number of frames differing, there is a concern with occurrence of a situation wherein one of the streams can normally be played, but the other stream cannot be played, but this can be prevented.

In the event that decoding is started from the middle of a stream assuming that the structures of the corresponding GOPs between streams differ, there is a concern with occurrence of a situation wherein the Base view video picture necessary for decoding of the Dependent view video has not been decoded. In this case, as a result thereof, the Dependent view video picture cannot be decoded, and 3D display cannot be performed. Also, the image of the Base view video may not be output depending on mounting methods, but such an inconvenience can be prevented.

[EP_Map]

The start position of decoding at the time of random access or trick play can be set to an EP_map by taking advantage of the GOP structures of the Base view video stream and the Dependent view video stream. The EP_map is included in a Clip Information file.

The following two constraints are stipulated as the constraints of a picture that can be set to the EP_map as a decoding start position.

1. The positions of anchor pictures continuously disposed in a SubsetSPS, or the position of IDR pictures continuously disposed in the SubsetSPS is taken as the position that can be set to the Dependent view video stream.

The anchor pictures are pictures stipulated by the H.264 AVC/MVC profile standard, and are the pictures of the Dependent view video stream encoded by performing reference between views instead of reference in the time direction.

2. In the event that a certain picture of the Dependent view video stream is set to the EP_map as a decoding start position, the picture of the corresponding Base view video stream is also set to the EP_map as a decoding start position.

Figure 41:
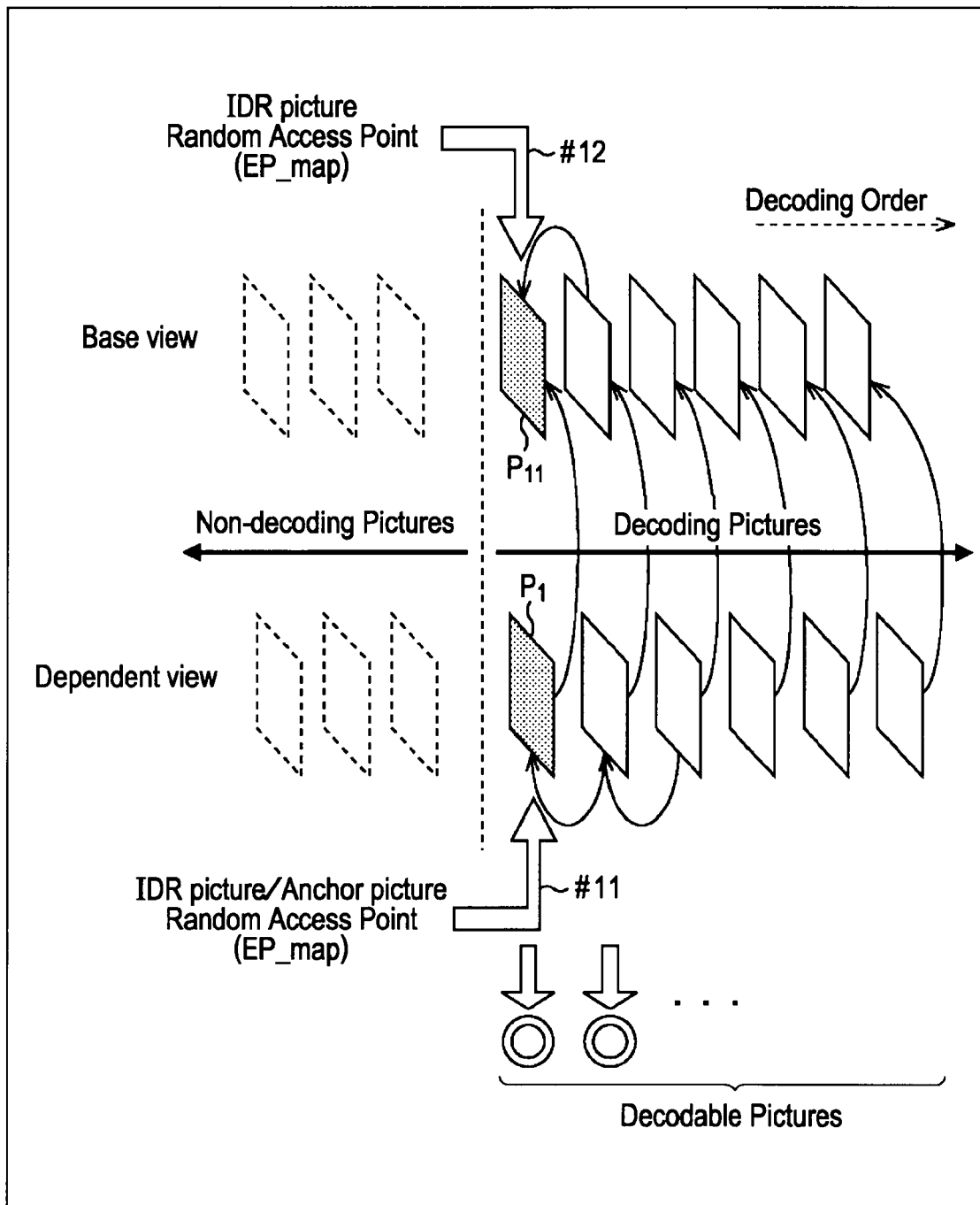
FIG. 41 is a diagram illustrating an example of a decoding start position set to an EP_map.

FIG. 41 is a diagram illustrating an example of a decoding start position set to the EP_map satisfying the above two constraints.

In FIG. 41, pictures making up the Base view video stream, and pictures making up the Dependent view video streams are illustrated in decoding sequence.

A picture $P_1$ indicated with a color of the pictures of the Dependent view video stream is an anchor picture or IDR picture. An Access Unit including the data of the picture $P_1$ includes a SubsetSPS.

With the example in FIG. 41, as illustrated with a white arrow #11, the picture $P_1$ is set to the EP_map of the Dependent view video stream as a decoding start position.

A picture $P_{11}$ that is a picture of the Base view video stream corresponding to the picture $P_1$ is an IDR picture. As illustrated in a white arrow #12, the picture $P_{11}$ that is an IDR picture is also set to the EP_map of the Base view video stream as a decoding start position.

In the event of starting decoding from the picture $P_1$ and the picture $P_{11}$ in response to random access or trick play being instructed, first, decoding of the picture $P_{11}$ is performed. The picture $P_{11}$ is an IDR picture, and accordingly, the picture $P_{11}$ can be decoded without reference to another picture.

At the time of decoding of the picture $P_{11}$ being completed, next, the picture $P_1$ is decoded. The decoded picture $P_{11}$ is referenced at the time of decoding of the picture $P_1$. The picture $P_1$ is an IDR picture or anchor picture, and accordingly, decoding of the picture $P_1$ can be performed if decoding of the picture $P_{11}$ is completed.

Subsequently, decoding is performed in a manner such as the picture following the picture $P_1$ of the Base view video, the picture following the picture $P_{11}$ of the Dependent view video, and so on.

The structures of the corresponding GOPs are the same, and also decoding is started from the corresponding positions, and accordingly, the picture set to the EP_map, and the subsequent pictures can be decoded without problems regarding the Base view video and the Dependent view video. Thus, random access can be realized.

Pictures arrayed on more left side than a dotted line indicated in the vertical direction in FIG. 41 become pictures not subjected to decoding.

Figure 42:
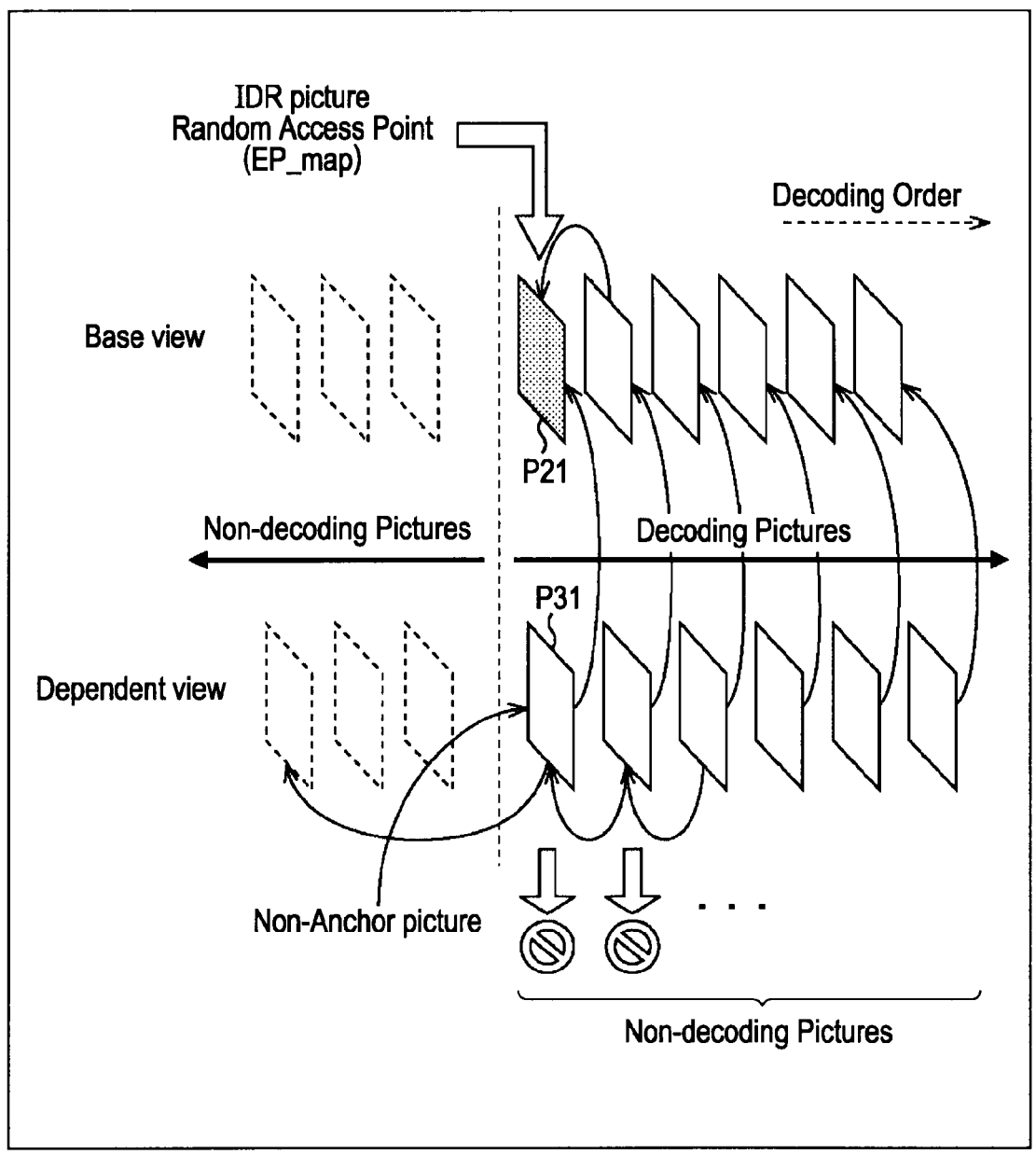
FIG. 42 is a diagram illustrating a problem caused in the event that the GOP structure of Dependent view video is not defined.

FIG. 42 is a diagram illustrating a problem to be caused in the event that the GOP structure of the Dependent view video is not defined.

With the example in FIG. 42, a picture $P_{21}$ that is an IDR picture of the Base view video indicated with a color is set to the EP_map as a decoding start position.

Let us consider a case where a picture $P_{31}$ that is a picture of the Dependent view video corresponding to the picture $P_{21}$ is not an anchor picture, in the event that decoding is started from the picture $P_{21}$ of the Base view video. In the event that no GOP structure is defined, it is not assured that the picture of the Dependent view video corresponding to the IDR picture of the Base view video is an IDR picture or anchor picture.

In this case, even at the time of decoding of the picture $P_{21}$ of the Base view video ending, the picture $P_{31}$ cannot be decoded. Reference in the time direction is also necessary for decoding of the picture $P_K$, but a picture on more left side than the dotted line indicated in the vertical direction is not decoded.

The picture $P_{31}$ cannot be decoded, and consequently, other pictures of the Dependent view video that reference the picture $P_{31}$ cannot be decoded.

Such a situation can be prevented by defining the GOP structure of the Dependent view video stream.

With regard to not only the Base view video but also the Dependent view video, a decoding start position is set to the EP_map, whereby the playback device 1 can readily determine the decoding start position.

In the event that a certain picture alone of the Base view video has been set to the EP_map as a decoding start position, the playback device 1 needs to determine the picture of the Dependent view video corresponding to the picture of the decoding start position by calculation, and the processing becomes complicated.

Even if the corresponding pictures of the Base view video and the Dependent view video have the same DTS/PTS, in the event that the bit rates of the videos differ, up to the byte arrays in a TS are not matched, and accordingly, in this case, the processing becomes complicated.

Figure 43:
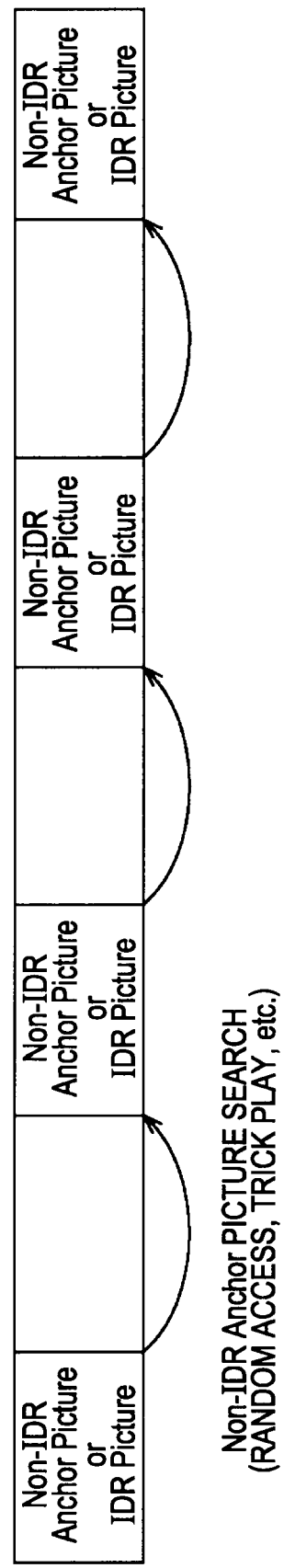
FIG. 43 is a diagram illustrating the conception of picture search.

FIG. 43 is a diagram illustrating the conception of picture search necessary for performing random access or trick play with an MVC stream made up of the Base view video stream and the Dependent view video stream as an object.

As illustrated in FIG. 43, at the time of performing random access or trick play, a non-IDR anchor picture or IDR picture is searched, and the decoding start position is determined.

Now, the EP_map will be described. Description will be made regarding a case where the decoding start position of the Base view video is set to the EP_map, but the decoding start position of the Dependent view video is also set to the EP_map of the Dependent view video in the same way.

Figure 44:
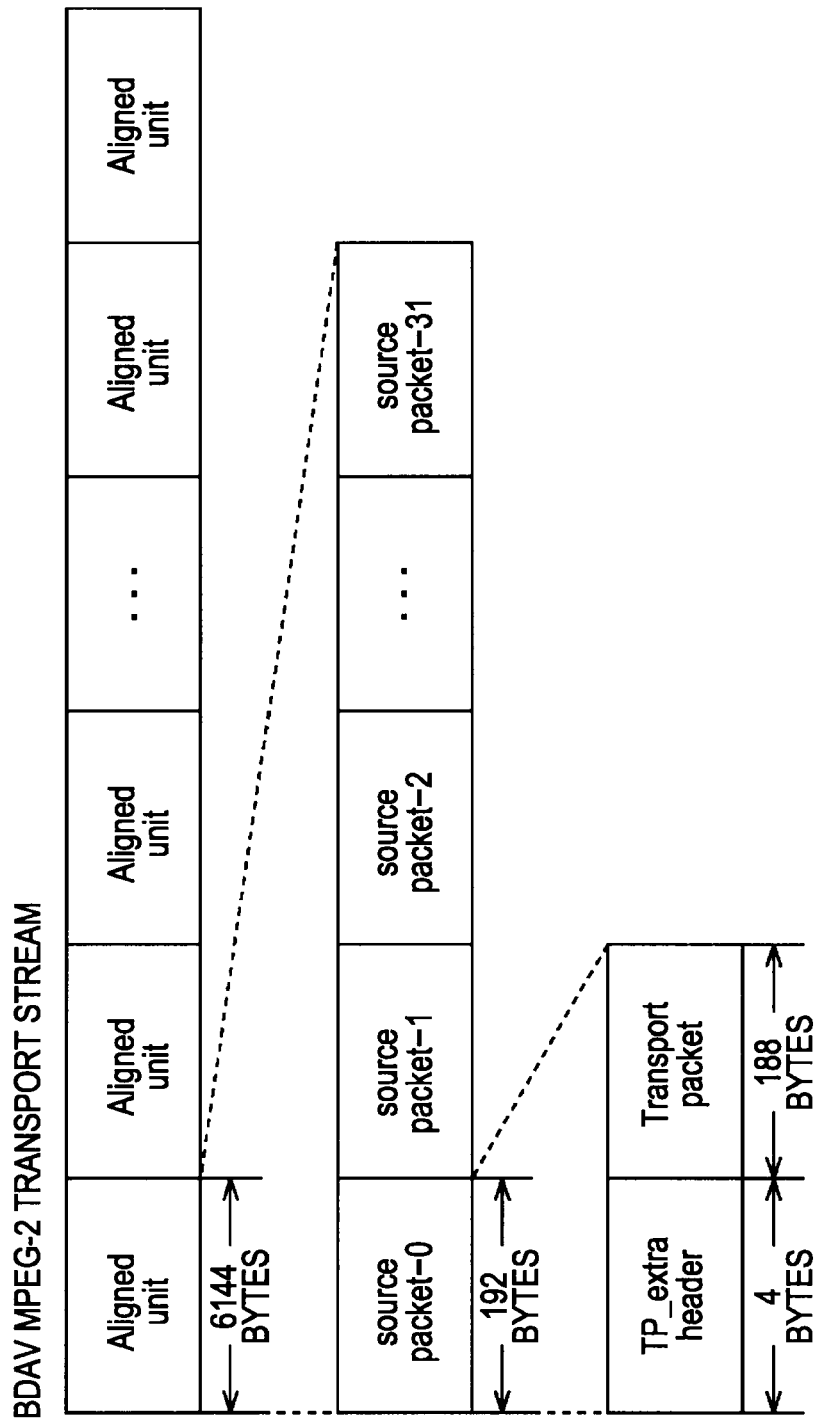
FIG. 44 is a diagram illustrating the structure of an AV stream recorded on an optical disc.

FIG. 44 is a diagram illustrating the structure of an AV stream recorded on the optical disc 2.

A TS including the Base view video stream is configured of an integer number of aligned units (Aligned Units) having a size of 6144 bytes.

The Aligned Units are made up of 32 source packets (Source Packets). The source packets have 192 bytes. One source packet is made up of a 4-byte transport packet extra header (TP_extra header), and 188-byte transport packet (Transport Packet).

The data of the Base view video is packetized in a MPEG2 PES packet. A PES packet is formed by a PES packet header being added to the data portion of the PES packet. The PES packet includes a stream ID for determining the type of an elementary stream to be transmitted by the PES packet.

The PES packet is further packetized in a transport packet. That is to say, the PES packet is divided in the size of the payload of a transport packet, a transport packet header is added to the payload, and a transport packet is formed. The transport packet header includes a PID that is the identification information of data to be stored in the payload.

Note that a source packet number, which is incremented by one for each source packet with the head of a Clip AV stream as 0 for example, is provided to a source packet. Also, an aligned unit starts from the first byte of a source packet.

The EP_map is employed for searching a data address to start readout of data within a Clip AV stream file when the time stamp of the access point of a Clip is given. The EP_map is a list of entry points extracted from an elementary stream and a transport stream.

The EP_map has address information for searching an entry point to start decoding within an AV stream. One EP data within the EP_map is configured of a pair of a PTS, an address within the AV stream of an Access Unit corresponding to the PTS. With AVC/H.264, one picture worth of data is stored in one Access Unit.

Figure 45:
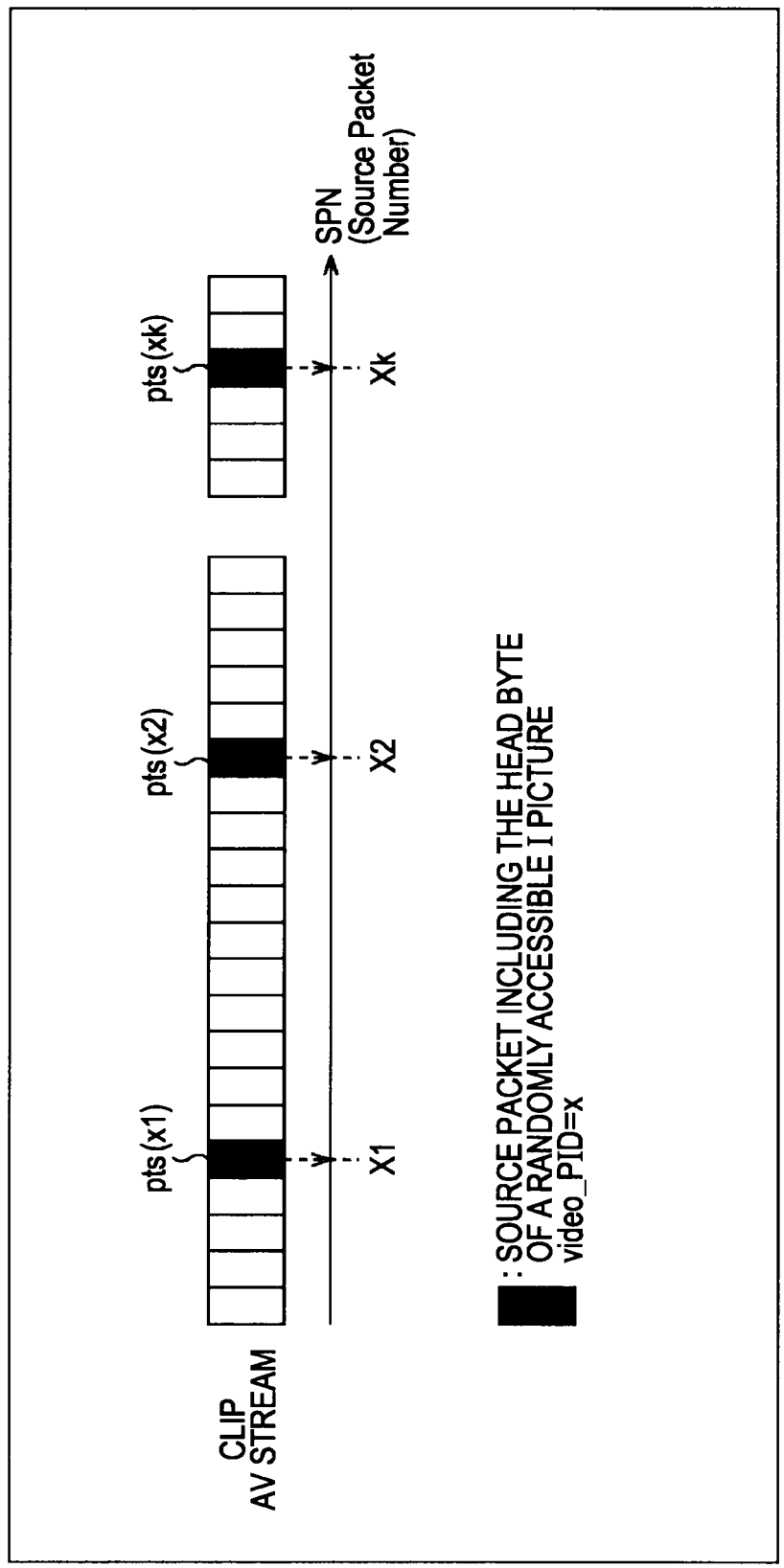
FIG. 45 is a diagram illustrating an example of a Clip AV stream.

FIG. 45 is a diagram illustrating an example of a Clip AV stream.

The Clip AV stream in FIG. 45 is a video stream (Base view video stream) made up of a source packet to be identified by PID=x. The video stream is distinguished by a PID included in the header of a transport packet within a source packet for each source packet.

In FIG. 45, of the source packets of the video stream, a source packet including the head byte of an IDR picture is appended with a color. A square without a color indicates a source packet including data not serving as a random access point, or a source packet including the data of another stream.

For example, a source packet having a source packet number X1 including the head byte of a random-accessible IDR picture of the video stream distinguished by PID=x is disposed in a position of PTS=pts(x1) on the time axis of the Clip AV stream.

Similarly, the next source packet including the head byte of a random-accessible IDR picture is taken as a source packet having a source packet number X2, and is disposed in a position of PTS=pts(x2).

Figure 46:
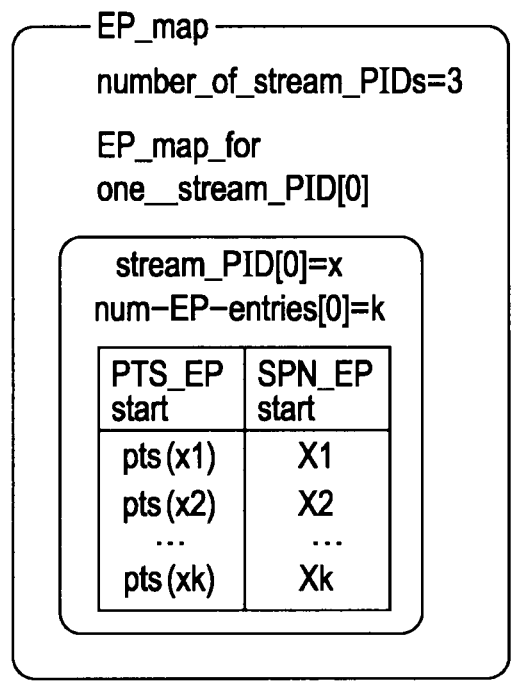
FIG. 46 is a diagram conceptually illustrating the EP_map corresponding to the Clip AV stream in FIG. 45.

FIG. 46 is a diagram conceptually illustrating an example of the EP_map corresponding to the Clip AV stream in FIG. 45.

As illustrated in FIG. 46, the EP_map is configured of a stream_PID, PTS_EP_start, and SPN_EP_start.

The stream_PID represents the PID of a transport packet for transmitting a video stream.

The PTS_EP_start represents the PTS of an Access Unit starting from a random-accessible IDR picture.

The SPN_EP_start represents the address of a source packet including the first byte of an Access Unit to be referenced by the value of the PTS_EP_start.

The PID of a video stream is stored in the stream_PID, and EP_map_for_one_stream_PID( ) that is table information representing a correlation between the PTS_EP_start and the SPN_EP_start is generated.

For example, PTS=pts(x1) and the source packet number X1, PTS=pts(x2) and the source packet number X2, . . . , and PTS=pts(xk) and the source packet number Xk are each described in EP_map_for_one_stream_PID[0] of a video stream of PID=x in a correlated manner.

Such a table is also generated regarding each of the video streams multiplexed in the same Clip AV stream. The EP_map including the generated table is stored in the Clip Information file corresponding to this Clip AV stream.

Figure 47:
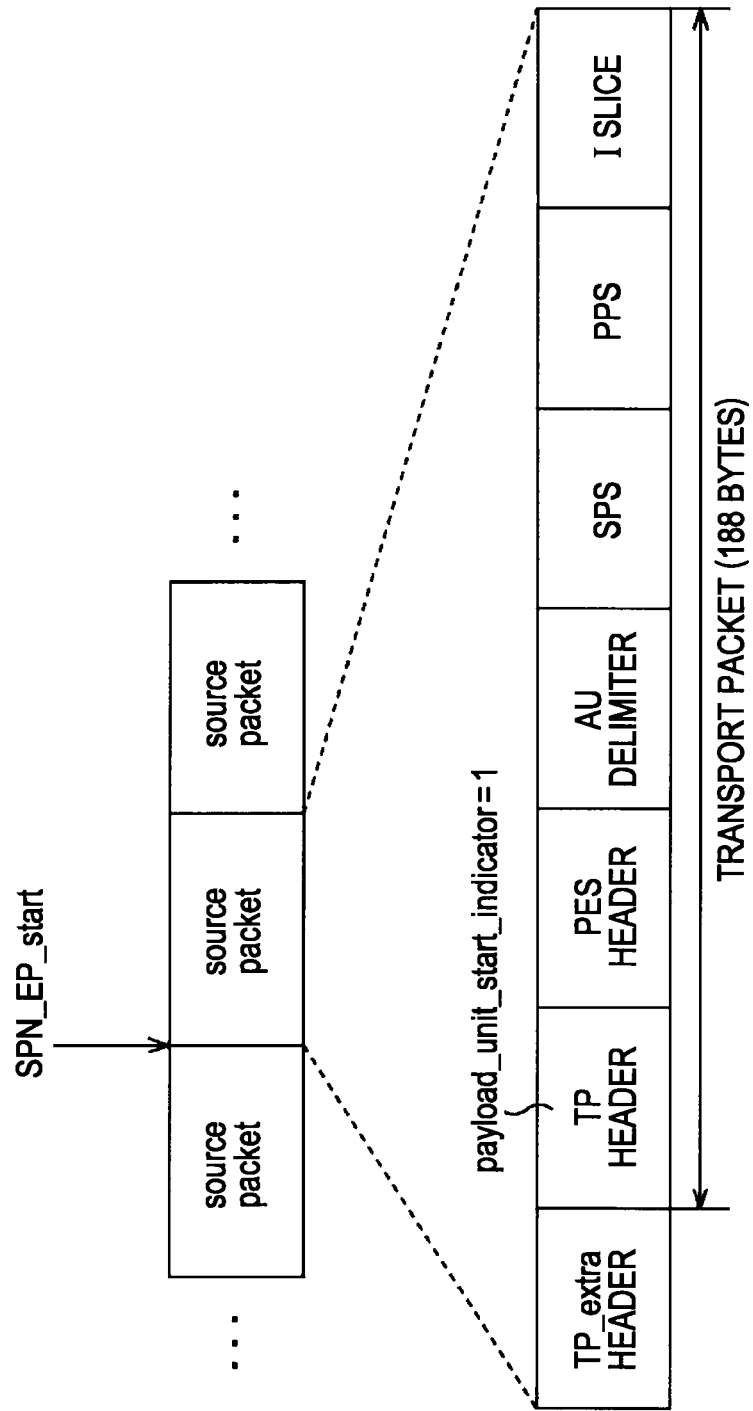
FIG. 47 is a diagram illustrating an example of the data structure of a source packet indicated by an SPN_EP_start.

FIG. 47 is a diagram illustrating an example of the data structure of the source packet specified by the SPN_EP_start.

As described above, a source packet is configured of a form in which a 4-byte header is added to a 188-byte transport packet. The transport packet portion is made up of a header portion (TP header) and a payload portion. The SPN_EP_start represents the source packet number of a source packet including the first byte of an Access Unit starting from an IDR picture.

With AVC/H.264, an Access Unit, i.e., picture is started from an AU delimiter (Access Unit Delimiter). After the AU delimiter, an SPS and a PPS are continued. Thereafter, the head portion or the whole of the data of slice of an IDR picture is stored.

The value 1 of payload_unit_start_indicator of the TP header of a transport packet represents that a new PES packet starts from the payload of this transport packet. An Access Unit starts from this source packet.

Such an EP_map is prepared regarding each of the Base view video stream and the Dependent view video stream.

Figure 48:
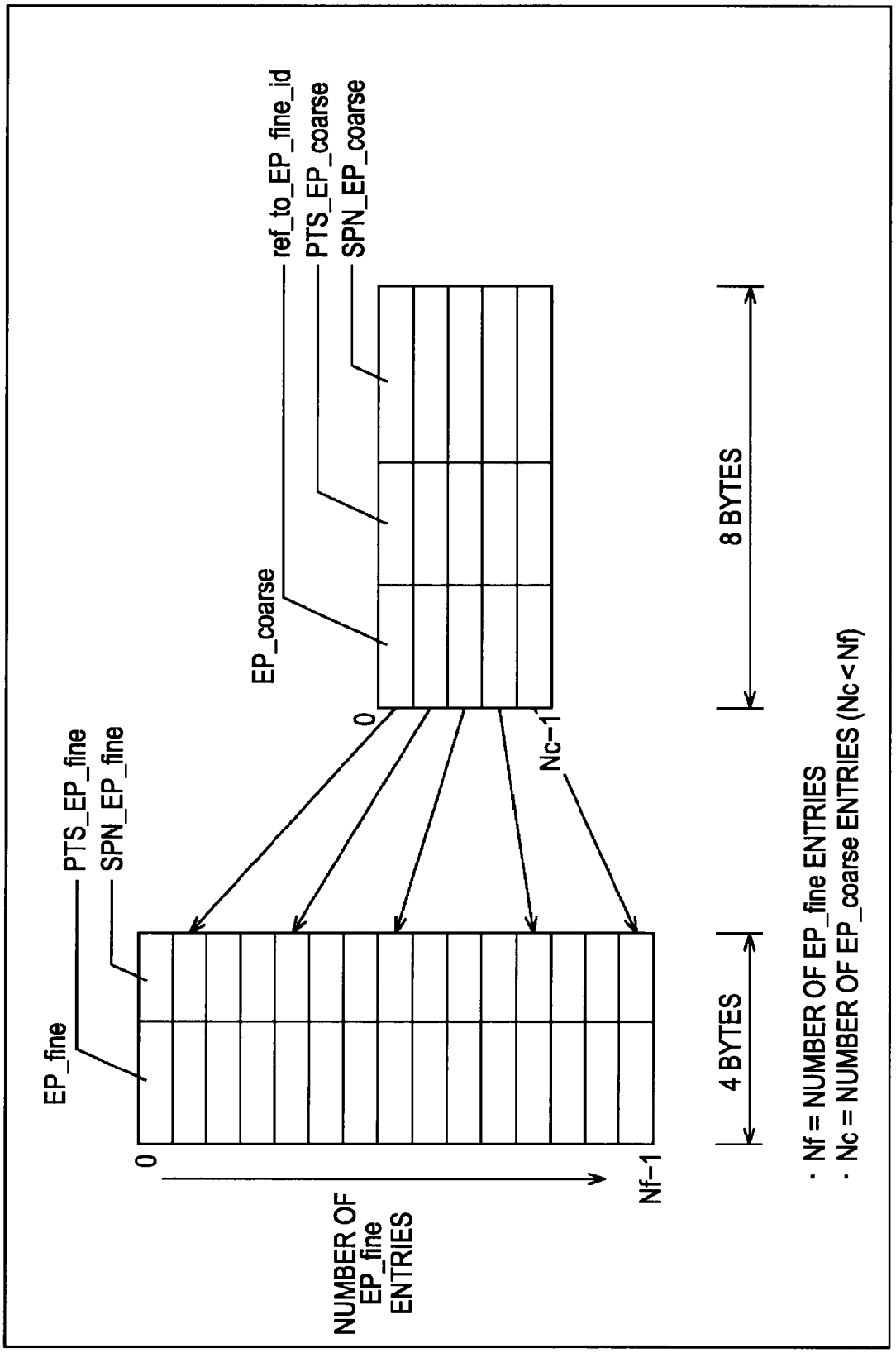
FIG. 48 is a diagram illustrating a sub table included in the EP_map.

FIG. 48 is a diagram illustrating a sub table included in the EP_map.

As illustrated in FIG. 48, the EP_map is divided into an EP_coarse and an EP_fine that are sub tables. The sub table EP_coarse is a table for performing search in rough increments, and the sub table EP_fine is a table for performing search in more accurate increments.

As illustrated in FIG. 48, the sub table EP_fine is a table in which an entry PTS_EP_fine and an entry SPN_EP_fine are correlated. An entry number is provided to each of the entries within a sub table in ascending order with the uppermost column as "0" for example. With the sub table EP_fine, the data width combined from the entry PTS_EP_fine and the entry SPN_EP_fine is four bytes.

The sub table EP_coarse is a table in which an entry ref_to_EP_fine_id, an entry PTS_EP_coarse, and an entry SPN_EP_coarse, are correlated. The data width combined from an entry ref_to_EP_fine_id, the entry PTS_EP_coarse, and entry SPN_EP_coarse is eight bytes.

The entry of the sub table EP_fine is made up of bit information on the LSB (Least Significant Bit) side of each of the entry PTS_EP_start and the entry SPN_EP_start. Also, the entry of the sub table EP_coarse is made up of bit information on the MSB (Most Significant Bit) side of each of the entry PTS_EP_start and the entry SPN_EP_start, and an entry number within the table of the sub table EP_fine corresponding to thereto. This entry number is the number of an entry within the sub table EP_fine having bit information on the LSB side extracted from the same data PTS_EP_start.

Figure 49:
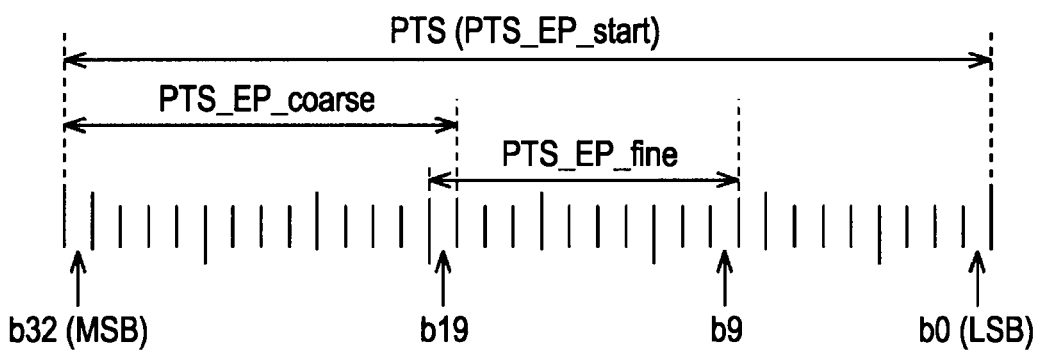
FIG. 49 is a diagram illustrating an example of the formats of an entry PTS_EP_coarse and an entry PTS_EP_fine.

FIG. 49 is a diagram illustrating an example of the formats of the entry PTS_EP_coarse and the entry PTS_EP_fine.

The data length of the entry PTS_EP_start is a 33-bit value. If we say that the MSB bit is the 32nd bit, and the LSB bit is the 0th bit, 14 bits from the 32nd bit to the 19th bit of the entry PTS_EP_start are used for the entry PTS_EP_coarse. According to the entry PTS_EP_coarse, search can be performed with resolution of 5.8 seconds and with a range up to 26.5 hours.

Also, 11 bits from the 19th bit to the 9th bit of the entry PTS_EP_start are used for the entry PTS_EP_fine. According to the entry PTS_EP_fine, search can be performed with resolution of 5.7 milliseconds and with a range up to 11.5 seconds. Note that the 19th bit is commonly used for the entry PTS_EP_coarse and the entry PTS_EP_fine. Also, from the 0th bit to the 8th bit on the LSB side are not used.

Figure 50:
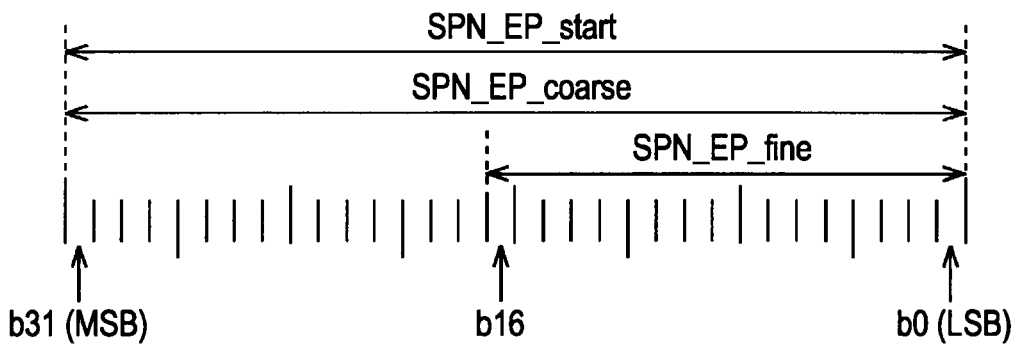
FIG. 50 is a diagram illustrating an example of the formats of an entry SPN_EP_coarse and an entry SPN_EP_fine.

FIG. 50 is a diagram illustrating an example of the formats of the entry SPN_EP_coarse and the entry SPN_EP_fine.

The data length of the entry SPN_EP_start is a 32-bit value. If we say that the MSB bit is the 31st bit, and the LSB bit is the 0th bit, all of the bits from the 31st bit to the 0th bit of the entry SPN_EP_start are used for the entry SPN_EP_coarse.

Also, 17 bits from the 16th bit to the 0th bit of the entry SPN_EP_start are used for the entry SPN_EP_fine.

Description will be made later regarding hot to determine a readout start address at the time of random access to be performed using the EP_coarse and EP_fine. The EP_map is also described, for example, in Japanese Unexamined Patent Application Publication No. 2005-348314.

[Operation 3]

At the time of decoding, as the value of POC (Picture Order Count) of the pictures of the Dependent view video stream, the same value as the value of the POC of the pictures of the corresponding Base view video stream is employed. The POC is a value representing the display sequence of pictures stipulated by the AVC/H.264 standard, and is obtained by calculation at the time of decoding.

For example, the value of the POC of the pictures of the Base view video stream is obtained by calculation, the pictures of the Base view video stream are output from the decoder in the order indicated by the obtained value. Also, at the same time as a picture of the Base view video stream being output being output, the corresponding picture of the Dependent view video stream is output. Thus, substantially, the same value as the value of the POC of the pictures of the Base view video stream is used as the value of the POC of the pictures of the Dependent view video stream.

Also, SEI (Supplemental Enhancement Information) is added to the data of each picture making up the Base view video stream and the Dependent view video stream. The SEI is additional information including secondary information relating to decoding, stipulated by H.264/AVC.

Picture Timing SEI, which is one of the SEI, includes readout point-in-time from a CPB (Coded Picture Buffer) at the time of decoding, readout point-in-time from a DPB, and so forth. Also, the information of display point-in-time, the information of a picture structure, and so forth are included in the Picture Timing SEI.

Figure 51:
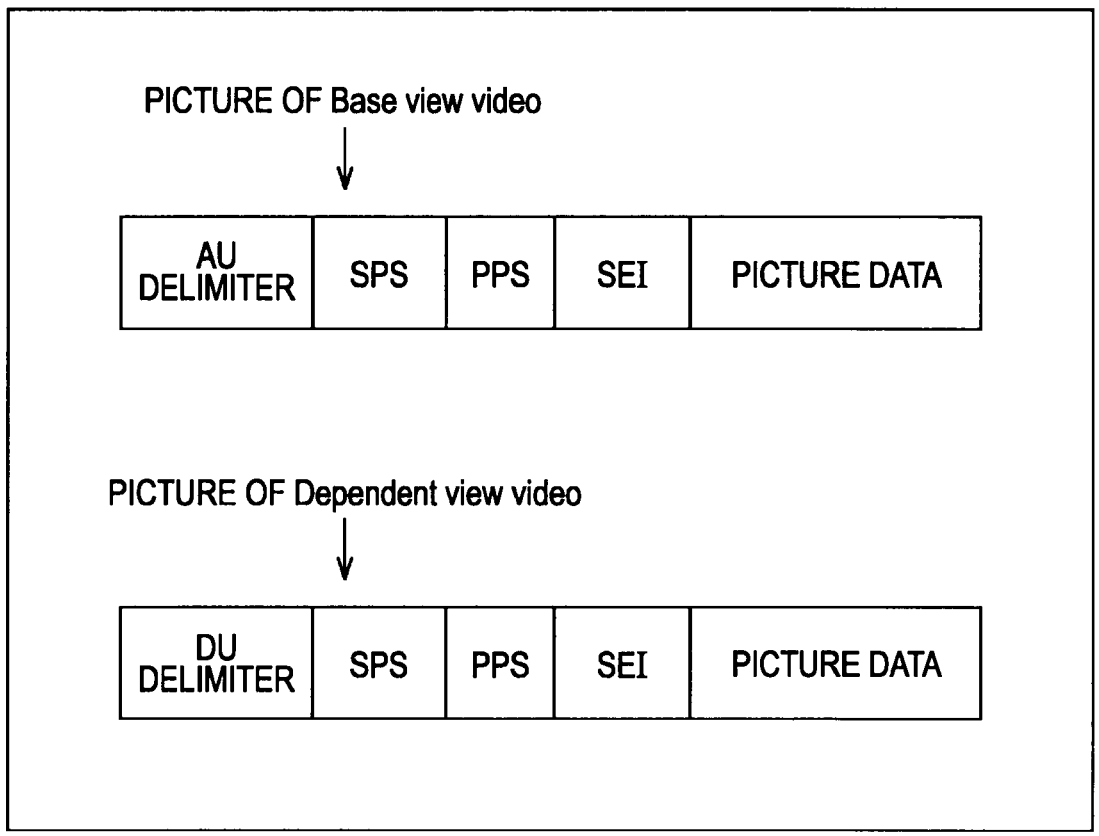
FIG. 51 is a diagram illustrating the configuration of an Access Unit.

FIG. 51 is a diagram illustrating the configuration of an Access Unit.

As illustrated in FIG. 51, the Access Unit of the Base view video including the data of one picture of the Base view video stream, and the Dependent Unit of the Dependent view video including the data of one picture of the Dependent view video stream have the same configuration. One unit is configured of a delimiter indicating the boundary of each unit, an SPS, a PPS, SEI, and picture data.

At the time of encoding, Picture Timing SEI to be added to a picture of the Base view video stream, and Picture Timing SEI to be added to a picture of the Dependent view video stream are operated in a unified manner.

For example, in the event that the Picture Timing SEI representing that the readout point-in-time from the CPB is T1 is added to the first picture in the encoding sequence of the Base view video stream, the Picture Timing SEI representing that the readout point-in-time from the CPB is T1 is also added to the first picture in the encoding sequence of the Dependent view video stream.

That is to say, the Picture Timing SEI having the same content regarding the corresponding pictures in encoding sequence or decoding sequence is added to each picture of the Base view video stream and the Dependent view video stream.

Thus, the playback device 1 can process a view component to which the same Picture Timing SEI is added as the corresponding view component in decoding sequence.

The Picture Timing SEI includes the elementary streams of the Base view video and the Dependent view video, and is referenced by the video decoder 110 at the playback device 1.

The video decoder 110 can identify the corresponding view components based on information included in the elementary streams. Also, the video decoder 110 can perform decoding processing in correct decoding sequence based on the Picture Timing SEI.

There is no need to reference a PlayList and so forth to identify the corresponding view components, whereby handling in the event that a problem occurs regarding a System Layer, and a Layer thereupon can be realized. Also, decoder mounting not depending on a Layer where a problem occurs can be realized.

[Configuration of the Recording Device]

Figure 52:
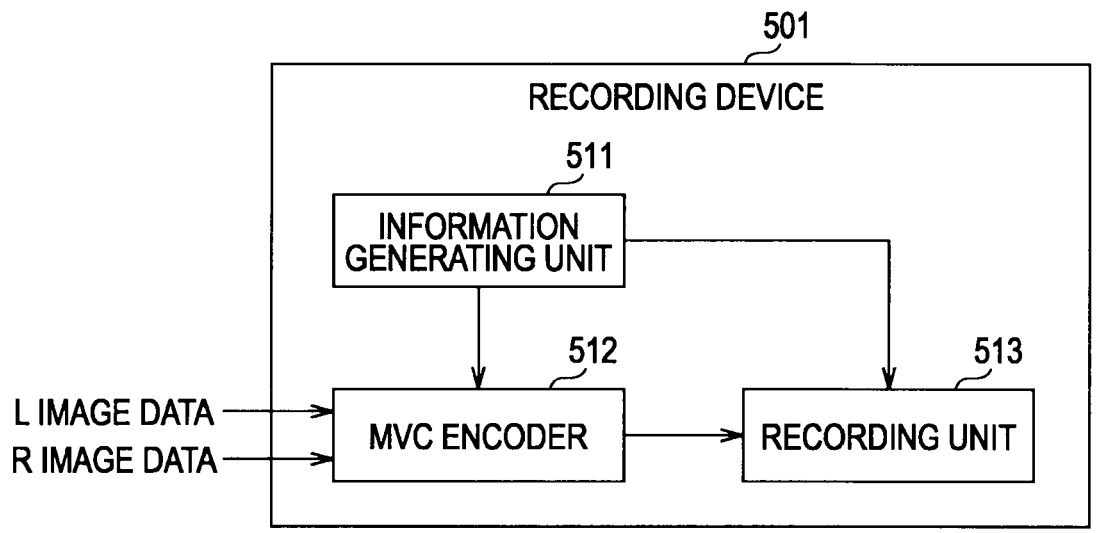
FIG. 52 is a block diagram illustrating a configuration example of the recording device.

FIG. 52 is a block diagram illustrating a configuration example of the recording device for performing encoding in accordance with the above operations to record the Base view video stream and the Dependent view video stream in a recording medium.

With a recording device 501 in FIG. 52, the Base view video stream is generated, and also the D1 view video stream is generated as the Dependent view video stream. That is to say, with the recording device 501, the information of Depth described with reference to FIG. 3 is not generated.

As illustrated in FIG. 52, the recording device 501 is configured of an information generating unit 511, an MVC encoder 512, and a recording unit 513. The information generating unit 511 corresponds to the above-mentioned data encoder 315 in FIG. 29, and the MVC encoder 512 corresponds to the video encoder 311 in FIG. 29. L image data and R image data are input to the MVC encoder 512.

The information generating unit 511 generates database information made up of a PlayList file, a Clip Information file including an EP_map for Base view video, and a Clip Information file including an EP_map for Dependent view video. Generation of the database information by the information generating unit 511 is performed in accordance with input by the user (contents creator) of the recording device 501. The information generating unit 511 outputs the generated database information to the recording unit 513.

Also, the information generating unit 511 generates additional information for Base view video such as the SPS, PPS, SEI, and so forth in FIG. 51 to be added to each picture of Base view video, and additional information for Dependent view video such as the SPS, PPS, SEI, and so forth to be added to each picture of Dependent view video. The additional information for Base view video, and the additional information for Dependent view video to be generated by the information generating unit 511 each include Picture Timing SEI. The information generating unit 511 outputs the generated additional information to the MVC encoder 512.

The MVC encoder 512 encodes L image data and R image data in accordance with the H.264 AVC/MVC profile standard, and generates the data of each picture of the Base view video obtained by encoding the L image data, and the data of each picture of the Dependent view video obtained by encoding the R image data.

Also, the MVC encoder 512 generates a Base view video stream by adding the additional information for Base view video generated by the information generating unit 511 to the data of each picture of Base view video. Similarly, the MVC encoder 512 generates a Dependent view video stream by adding the additional information for Dependent view video generated by the information generating unit 511 to the data of each picture of Dependent view video.

The MVC encoder 512 outputs the generated Base view video stream and Dependent view video stream to the recording unit 513.

The recording unit 513 records the database information supplied from the information generating unit 511, and the Base view video stream and Dependent view video stream supplied from the MVC encoder 512 in a recording medium such as a BD or the like. The recording medium in which data has been recorded by the recording device 513 is provided to a device on the playback side, for example, as the above-mentioned optical disc 2.

Note that, with the recording unit 513, various types of processing is performed before the Base view video stream and the Dependent view video stream are recorded. For example, processing for multiplexing the Base view video stream and the Dependent view video stream in the same TS, or multiplexing each of the streams in a different TS along with other data, processing for removing an MVC header from the Access Unit of Base view video, packetizing processing for dividing the Base view video stream and the Dependent view video stream into source packets, or the like is performed.

Figure 53:
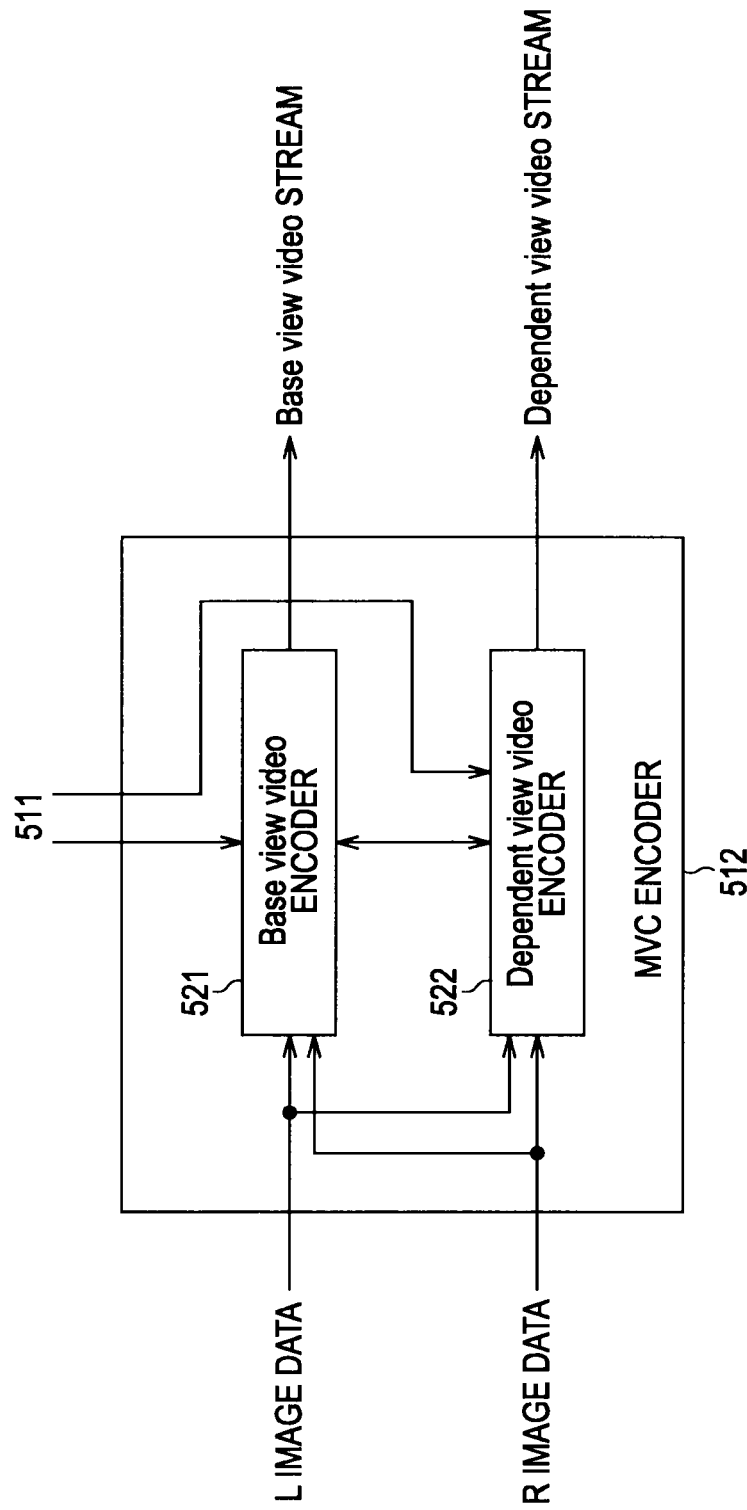
FIG. 53 is a block diagram illustrating a configuration example of the MVC encoder in FIG. 52.

FIG. 53 is a block diagram illustrating a configuration example of the MVC encoder 512 in FIG. 52.

As illustrated in FIG. 53, the MVC encoder 512 is configured of a Base view video encoder 521, and a Dependent view video encoder 522. L image data is input to the Base view video encoder 521 and the Dependent view video encoder 522, and R image data is input to the Dependent view video encoder 522. An arrangement may be made wherein R image data is input to the Base view video encoder 521, and is encoded as Base view video.

The Base view video encoder 521 encodes L image data in accordance with the H.264 AVC standard. Also, the Base view video encoder 521 adds the additional information for Base view video to each picture obtained by encoding, and outputs this as the Base view video stream.

The Dependent view video encoder 522 references L image data as appropriate to encode R image data in accordance with the H.264 AVC/AVC profile standard. Also, the Dependent view video encoder 522 adds the additional information for Dependent view video to each picture obtained by encoding, and outputs this as the Dependent view video stream.

[Operation of the Recording Device]

Figure 54:
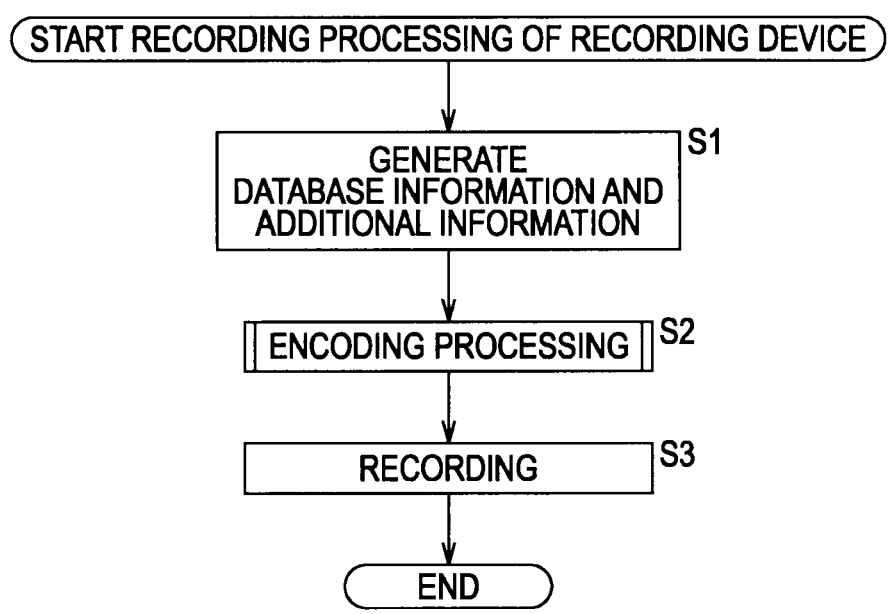
FIG. 54 is a flowchart for describing recording processing of the recording device.

Now, description will be made regarding the recording processing of the recording device 501, with reference to the flowchart in FIG. 54.

In step S1, the information generating unit 511 generates database information made up of a PlayList file, and a Clip Information file, and additional information to be added to each picture of L image data and R image.

In step S2, encoding processing is performed by the MVC encoder 512. The Base view video stream and the Dependent view video stream generated by the encoding processing are supplied to the recording unit 513.

In step S3, the recording unit 513 records the database information generated by the information generating unit 511, and the Base view video stream and the Dependent view video stream generated by the MVC encoder 512 in a recording medium. Thereafter, the processing is ended.

Figure 55:
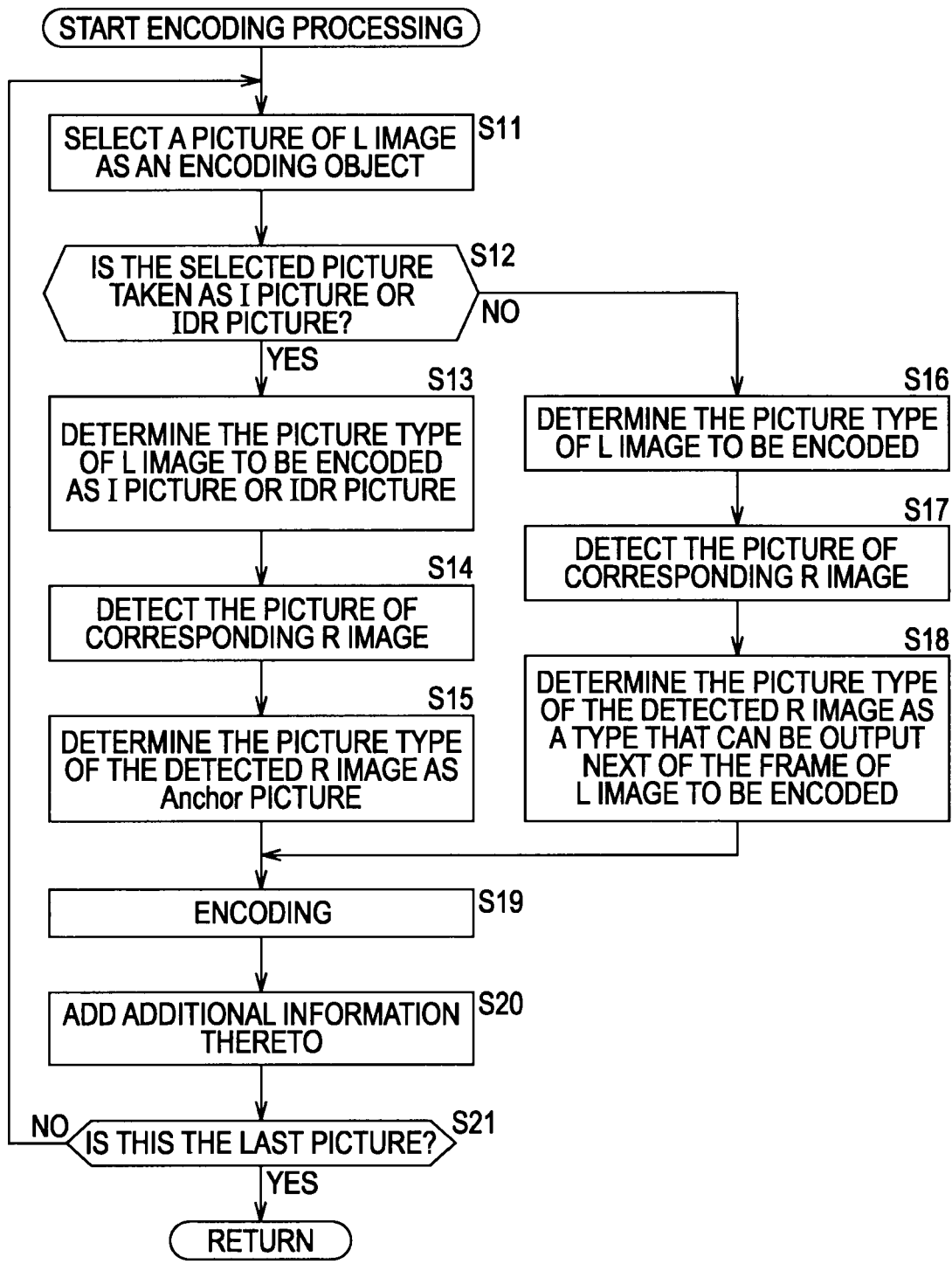
FIG. 55 is a flowchart for describing encoding processing to be performed in step S2 in FIG. 54.

Next, description will be made regarding the encoding processing to be performed in step S2 in FIG. 54, with reference to the flowchart in FIG. 55.

In step S11, the Base view video encoder 521 selects one picture (one frame) of the input L image as an encoding object picture.

In step S12, the Base view video encoder 521 determines whether to encode the L image to be encoded as an I picture or IDR picture. In the event that encoding conditions have been set, such as the number of pictures making up 1GOP, the number of I pictures or IDR pictures included in 1GOP, and so forth, the picture type of the L image to be encoded is determined, for example, according to the position of a picture arrayed in encoding sequence.

In the event that determination is made in step S12 that the L image to be encoded is encoded as an I picture or IDR picture, in step S13 the Base view video encoder 521 determines the picture type of the L image to be encoded to be an I picture or IDR picture.

In step S14, the Dependent view video encoder 522 detects, of the input R image, one picture corresponding to the L image of which the picture type has been determined in step S13. As described above, the L image and R image positioned at the same point-in-time in the same position when arraying each picture in display sequence in encoding sequence becomes corresponding pictures.

In step S15, the Dependent view video encoder 522 determines the picture type of the detected R image to be an Anchor picture.

On the other hand, in the event that determination is made in step S12 that the L image to be encoded is not encoded as an I picture or IDR picture, in step S16 the Base view video encoder 521 determines the picture type according to the position of the L image to be encoded.

In step S17, the Dependent view video encoder 522 detects, of the input R image, one picture corresponding to the L image of which the picture type has been determined in step S16.

In step S18, the Dependent view video encoder 522 determines a type that can be output next of the L image selected as an encoding object as the picture type of the detected R image.

In step S19, the Base view video encoder 521 encodes the L image to be encoded in accordance with the determined picture type. Also, the Dependent view video encoder 522 encodes the R image detected in step S14 or S17 according to the determined picture type.

In step S20, the Base view video encoder 521 adds the additional information to the Base view video picture obtained by encoding. Also, the Dependent view video encoder 522 adds the additional information to the Dependent view video obtained by encoding.

In step S21, the Base view video encoder 521 determines whether or not the L image currently selected as an encoding object is the last picture.

In the event that determination is made in step S21 that the L image currently selected as an encoding object is not the last picture, the flow returns to step S11, where the picture to be encoded is switched, and the above processing is repeated. In the event that determination is made in step S21 that the currently selected L image is the last picture, the flow returns to step S2 in FIG. 54, and this processing and thereafter will be performed.

According to the above processing, the data of an L image and the data of an R image can be encoded such that the Base view video stream after encoding, and the Dependent view video stream after encoding have the same GOP structure.

Also, the additional information having the same content can be added to the picture of Base view video, and the corresponding picture of Dependent view video.

[Configuration of the Playback Device]

Figure 56:
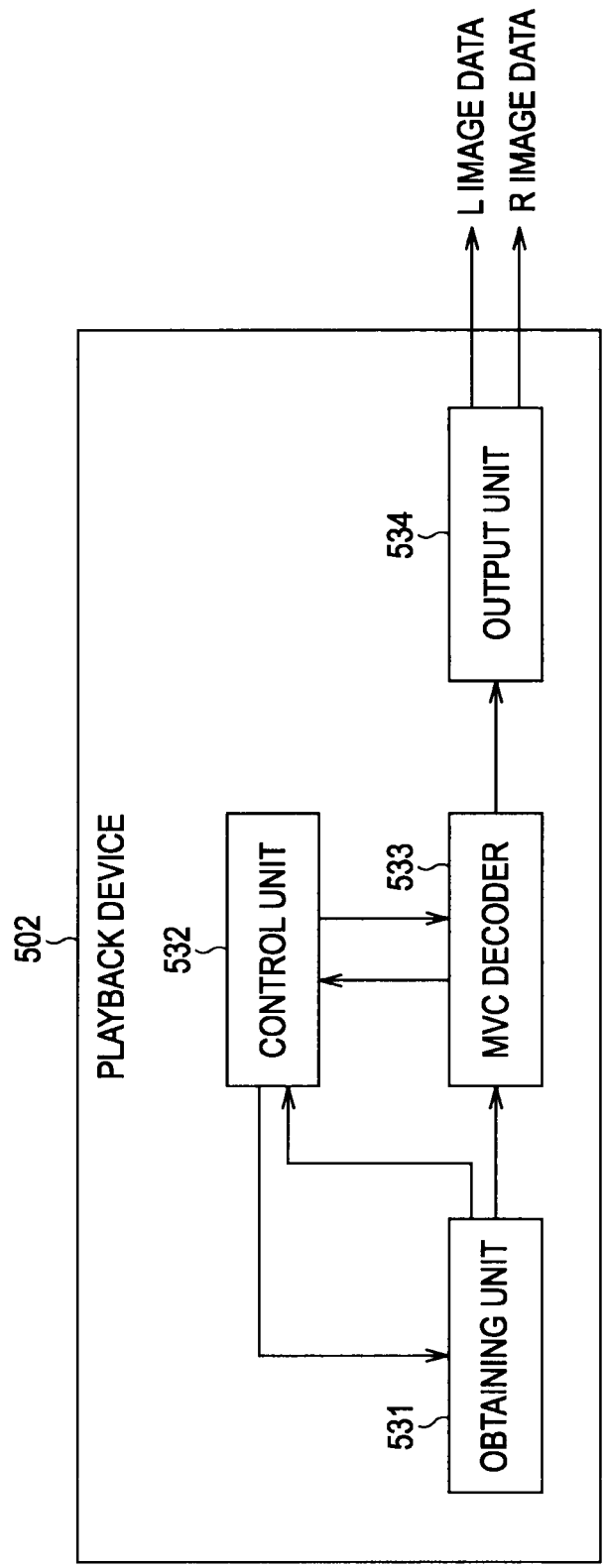
FIG. 56 is a block diagram illustrating a configuration example of the playback device.

FIG. 56 is a block diagram illustrating a configuration example of a playback device for playing a recording medium in which data is recorded by the recording device 501.

As illustrated in FIG. 56, a playback device 502 is configured of an obtaining unit 531, a control unit 532, an MVC decoder 533, and an output unit 534. The obtaining unit 531 corresponds, for example, the disk drive 52 in FIG. 20, and the control unit 532 corresponds to the controller 51 in FIG. 20. The MVC decoder 533 corresponds to a partial configuration of the decoder unit 56 in FIG. 20.

The obtaining unit 531 reads out data from a recording medium in which data has been recorded by the recording device 501, which has been mounted on the playback device 502, in accordance with the control by the control unit 532. The obtaining unit 531 outputs the database information read out from the recording medium to the control unit 532, and outputs the Base view video stream and the Dependent view video stream to the MVC decoder 533.

The control unit 532 controls the whole operation of the playback device 502, such as readout of data from a recording medium.

For example, the control unit 532 obtains database information by controlling the obtaining unit 531 to read out the database information from a recording medium. Also, in the event that playback of a PlayList for 3D playback (PlayList having the 3D_PL_type in FIG. 13 of which the value is 01) included in the obtained database information is instructed, the control unit 532 supplies information such as a stream ID described in the PlayList to the obtaining unit 531, and controls the obtaining unit 531 to read out the Base view video stream and the Dependent view video stream from a recording medium. The control unit 532 controls the MVC decoder 533 to decode the Base view video stream and the Dependent view video stream.

The MVC decoder 533 decodes the Base view video stream and the Dependent view video stream in accordance with the control by the control unit 532. The MVC decoder 533 outputs the data obtained by decoding the Base view video stream and the Dependent view video stream to the output unit 534. For example, the MVC decoder 533 outputs, in accordance with the view_type (FIG. 14), the data obtained by decoding the Base view video stream as L image data, and the data obtained by decoding the Dependent view video stream as R image data, respectively.

The output unit 534 outputs the L image data and the R image data supplied from the MVC decoder 533 to the display to display an L image and an R image.

Figure 57:
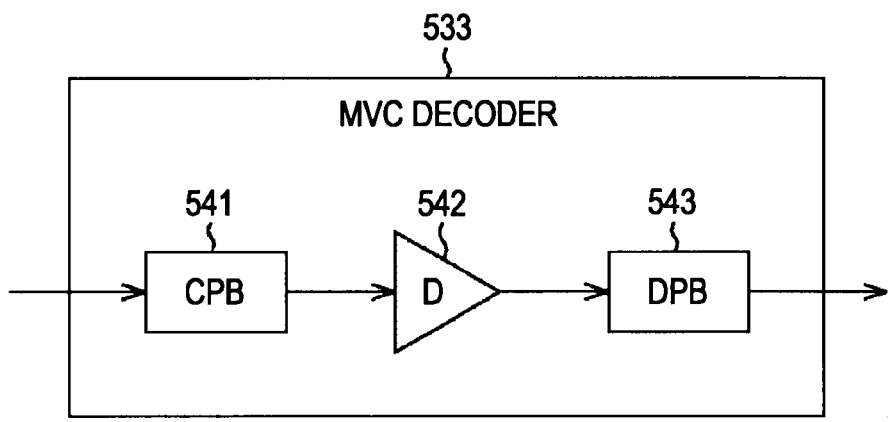
FIG. 57 is a block diagram illustrating a configuration example of the MVC decoder in FIG. 56.

FIG. 57 is a block diagram illustrating a configuration example of the MVC decoder 533.

As illustrated in FIG. 57, the MVC decoder 533 is configured of a CPB 541, a decoder 542, and a DPB 543. The CPB 541 includes the B video buffer 106 and the D video buffer 108 in FIG. 22. The decoder 542 corresponds to the video decoder 110 in FIG. 22, and the DPB 543 corresponds to the DPB 151 in FIG. 22. Though not illustrated in the drawing, a circuit corresponding to the switch 109 in FIG. 22 is also provided between the CPB 541 and the decoder 542.

The CPB 541 stores the data of the Base view video stream and the data of the Dependent view video stream supplied from the obtaining unit 531. The data of the Base view video stream stored in the CPB 541 is read out by the decoder 542 in increments of data making up one Access Unit. The data of the Dependent view video stream stored in the CPB 541 is also similarly read out by the decoder 542 in increments of data making up one Dependent Unit.

The decoder 542 decodes the data read out from the CPB 541, and outputs the data of each picture of the Base view video and the Dependent view video obtained by decoding, to the DPB 543.

The DPB 543 stores the data supplied from the decoder 542. The data of each picture of the Base view video and the Dependent view video stored in the DPB 543 is referenced by the decoder 542 as appropriate when decoding the subsequent pictures in decoding sequence. The data of each picture stored in the DPB 543 is output in accordance with the display point-in-time of each picture represented by the Picture Timing SEI.

[Operation of the Playback Device]

Now, description will be made regarding the playback processing of the playback device 502, with reference to the flowchart in FIG. 58.

Figure 58:
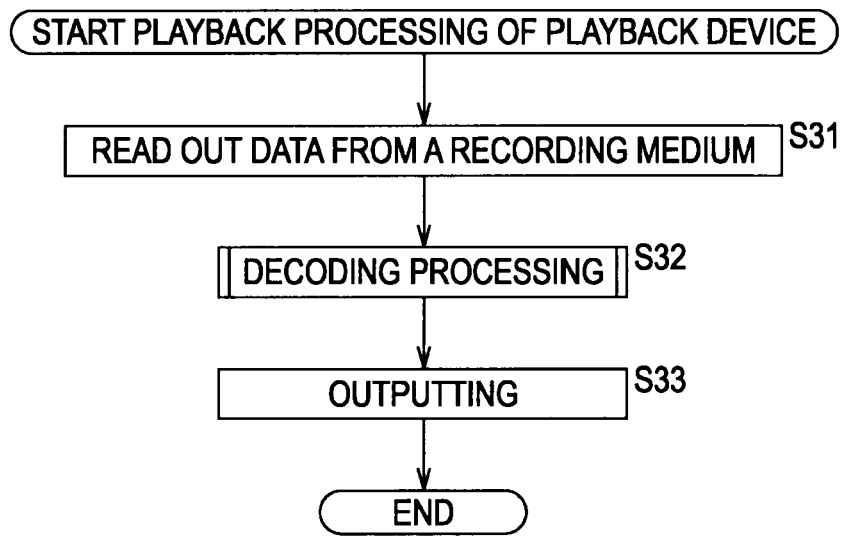
FIG. 58 is a flowchart for describing playback processing of the playback device.

Note that FIG. 58 illustrates each step so as to perform the processing of the Dependent view video stream after performing the processing of the Base view video stream, but the processing of the Base view video stream, and the processing of the Dependent view video stream are performed in parallel as appropriate. This is true for other flowcharts relating to the processing of the Base view video stream, and the processing of the Dependent view video stream.

In step S31, the obtaining unit 531 reads out data from a recording medium mounted on the playback device 502. The obtaining unit 531 outputs the readout database information to the control unit 532, and outputs the data of the Base view video stream, and the data of the Dependent view video stream to the MVC decoder 533.

In step S32, the MVC decoder 533 performs decoding processing.

In step S33, the output unit 534 outputs the L image data and the R image data supplied from the MVC decoder 533 to the display to display an L image and an R image. Subsequently, the processing is ended.

Figure 59:
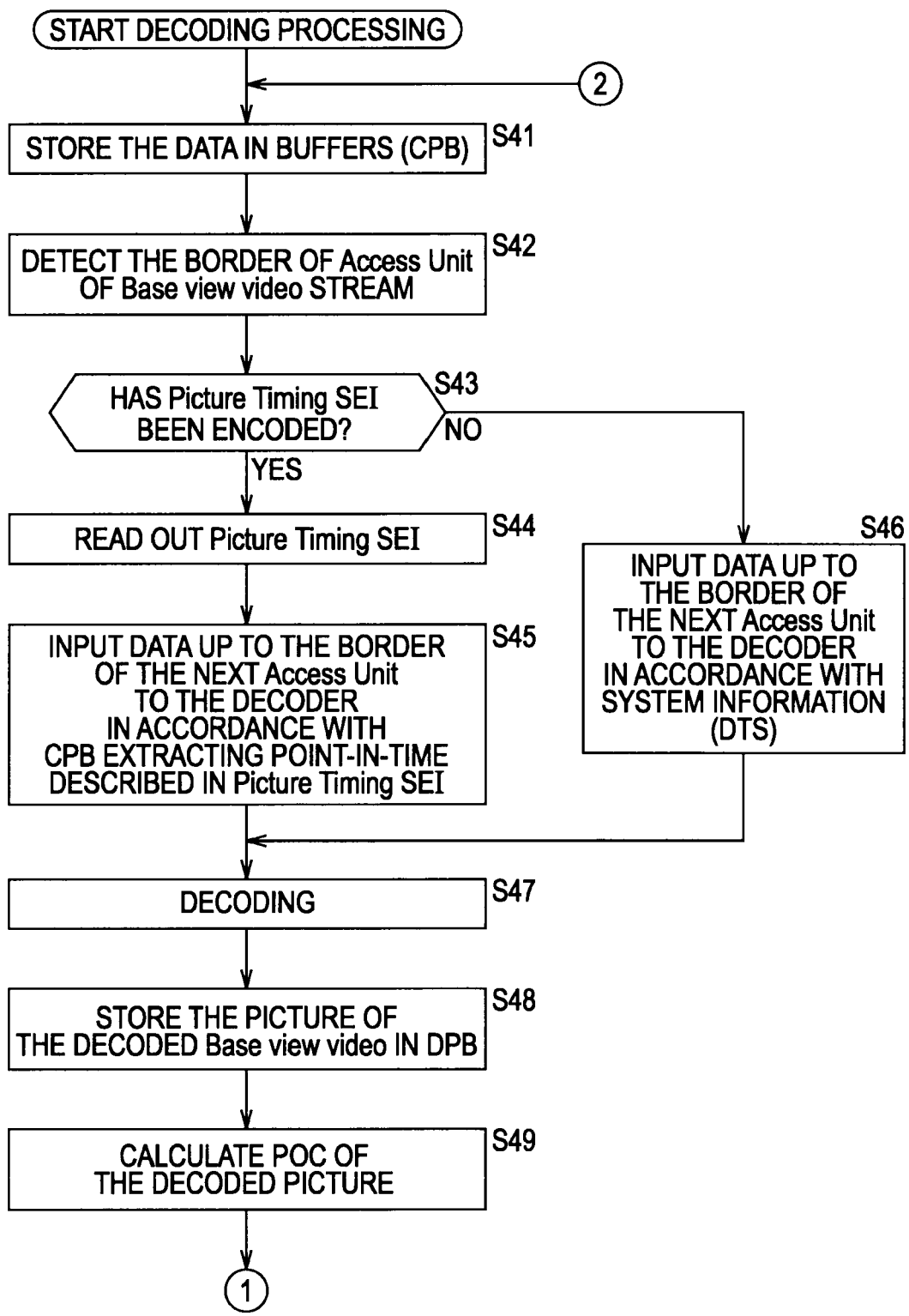
FIG. 59 is a flowchart for describing decoding processing to be performed in step S32 in FIG. 58.
Figure 60:
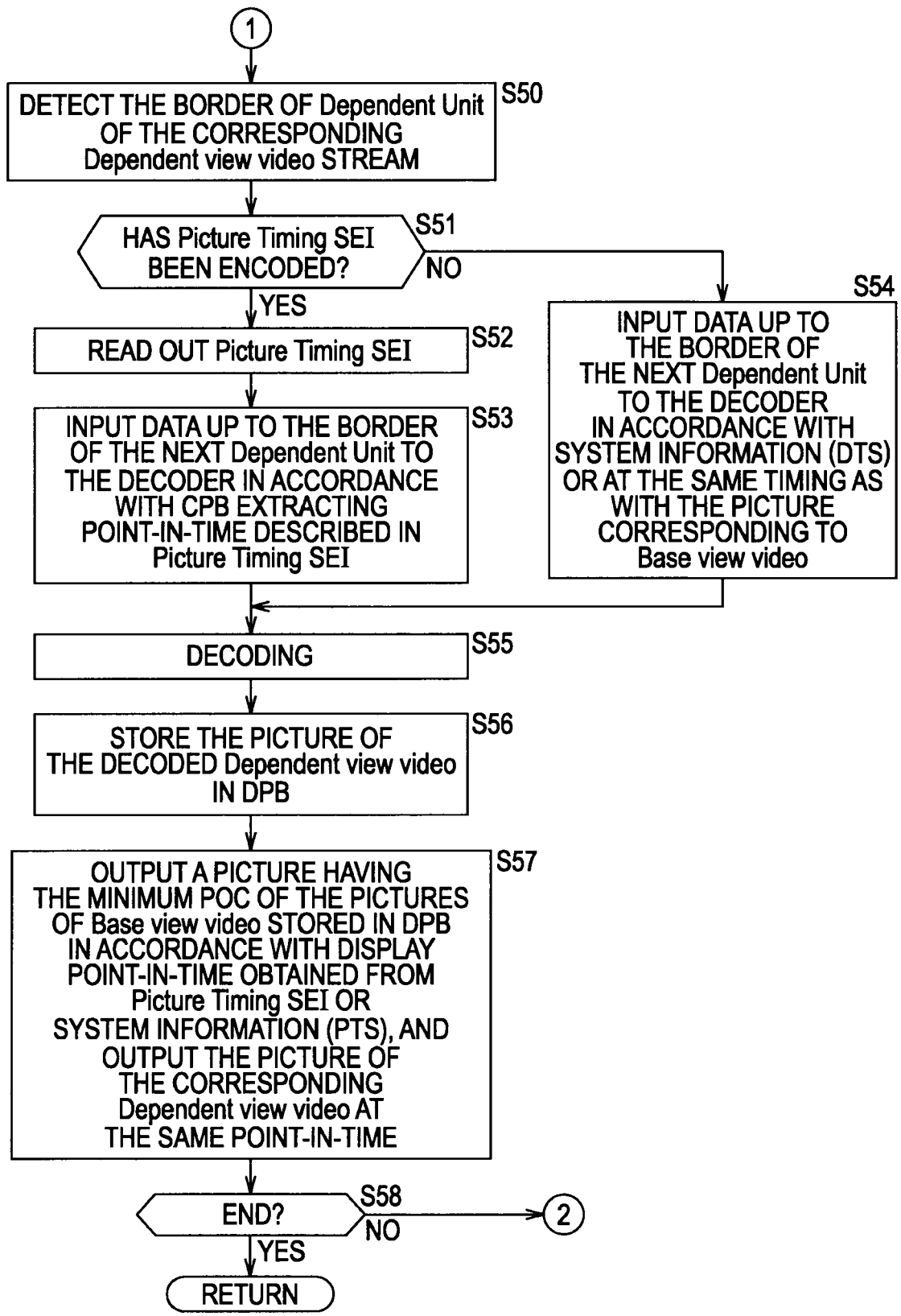
FIG. 60 is a flowchart for describing the decoding processing to be performed in step S32 in FIG. 58, which is continued from FIG. 59.

Next, description will be made regarding the decoding processing to be performed in step S32 in FIG. 58, with reference to the flowcharts in FIG. 59 and FIG. 60.

In step S41, the CPB 541 stores the data of the Base view video stream, and the data of the Dependent view video stream. The data stored in the CPB 541 is read out by the control unit 532 as appropriate.

In step S42, the control unit 532 references the data stored in the CPB 541 to detect the border of an Access Unit of the Base view video stream. Detection of the border of an Access Unit is performed by detecting an Access Unit delimiter for example. Data from the border of a certain position to the next border becomes the data of one Access Unit. The data of one Access Unit includes the data of one picture of the Base view video, and the additional information added thereto.

In step S43, the control unit 532 determines whether or not the Picture Timing SEI has been encoded in (included in) one Access Unit of the Base view video of which the border has been detected.

In the event that determination is made in step S43 that the Picture Timing SEI has been encoded, in step S44 the control unit 532 reads out the Picture Timing SEI.

In step S45, the control unit 532 supplies the picture data of the Base view video, of the data of one Access Unit of which the border has been detected, to the decoder 542 from the CPB 541, in conformity to the extracted point-in-time (readout point-in-time) described in the readout Picture Timing SEI.

On the other hand, in the event that determination is made in step S43 that the Picture Timing SEI has not been encoded, in step S46 the control unit 532 supplies the picture data of the Base view video, of the data of one Access Unit of which the border has been detected, to the decoder 542 from the CPB 541, in conformity to the system information (DTS).

In step S47, the decoder 542 decodes the data supplied from the CPB 541. At the time of decoding of the picture of the Base view video, a decoded picture stored in the DPB 543 is referenced as appropriate.

In step S48, the DPB 543 stores the picture data of the Base view video obtained by decoding.

In step S49, the control unit 532 calculates the POC of the decoded pictures of the Base view video, and stores this.

In step S50, the control unit 532 detects the border of a Dependent Unit of the Dependent view video stream, and detects the Dependent Unit of the Dependent view video stream corresponding to the Access Unit of the Base view video stream of which the border has been detected in step S42.

In step S51, the control unit 532 determines whether or not the Picture Timing SEI has been encoded in one Dependent Unit of the Dependent view video of which the border has been detected.

In the event that determination is made in step S51 that the Picture Timing SEI has been encoded, in step S52 the control unit 532 reads out the Picture Timing SEI.

In step S53, the control unit 532 supplies the picture data of the Dependent view video, of the data of one Dependent Unit of which the border has been detected, to the decoder 542 from the CPB 541, in conformity to the extracted point-in-time described in the readout Picture Timing SEI.

On the other hand, in the event that determination is made in step S51 that the Picture Timing SEI has not been encoded, in step S54 the control unit 532 supplies the picture data of the Dependent view video, of the data of one Dependent Unit of which the border has been detected, to the decoder 542 from the CPB 541, in conformity to the system information.

Note that, in the event that a decoder for Base view video, and a decoder for Dependent view video are each provided to the MVC decoder 533, the picture data of the Dependent view video stored in the CPB 541 is supplied to the decoder for Dependent view video at the same timing as timing when the picture data of the Base view video is supplied to the decoder for Base view video from the CPB 541.

In step S55, the decoder 542 decodes the data supplied from the CPB 541. At the time of decoding of the picture of the Dependent view video, the decoded picture of the Base view video, and the decoded picture of the Dependent view video, stored in the DPB 543 are referenced as appropriate.

In step S56, the DPB 543 stores the picture data of the Dependent view video obtained by decoding. According to the above processing being repeated, multiple pictures of the Base view video of which the value of POC has been calculated, and the corresponding pictures of the Dependent view video are stored in the DPB 543. With regard to the pictures of the Dependent view video, calculation of the value of POC is not performed.

In step S57, the control unit 532 outputs, of the pictures of the Base view video stored in the DPB 543, a picture of which the value of POC is the least from the DPB 543, and also outputs the corresponding picture of the Dependent view video from the DPB 543 at the same timing. The pictures output from the DPB 543 are supplied to the output unit 534.

Output of the picture of the Base view video is, in the event that the Picture Timing SEI is added to the picture thereof, performed in conformity to the display point-in-time described in the Picture Timing SEI. On the other hand, in the event that the Picture Timing SEI is not added, this is performed in conformity to the display point-in-time represented by the system information (PTS).

In step S58, the control unit 532 determines whether or not output of all the pictures of the Base view video and the Dependent view video has been completed. In the event that determination is made in step S58 that output of all the pictures has not been completed, the control unit 532 returns to step S41, and repeatedly performs the above-mentioned processing. In the event that determination is made in step S58 that output of all the pictures has been completed, the control unit 532 returns to step S32 in FIG. 58, and this processing and thereafter will be performed.

According to the above-mentioned processing, encoding is performed so as to have the same GOP structure, and also the Base view video stream and the Dependent view video stream, each picture of which has been added with the same additional information, can be decoded.

Figure 61:
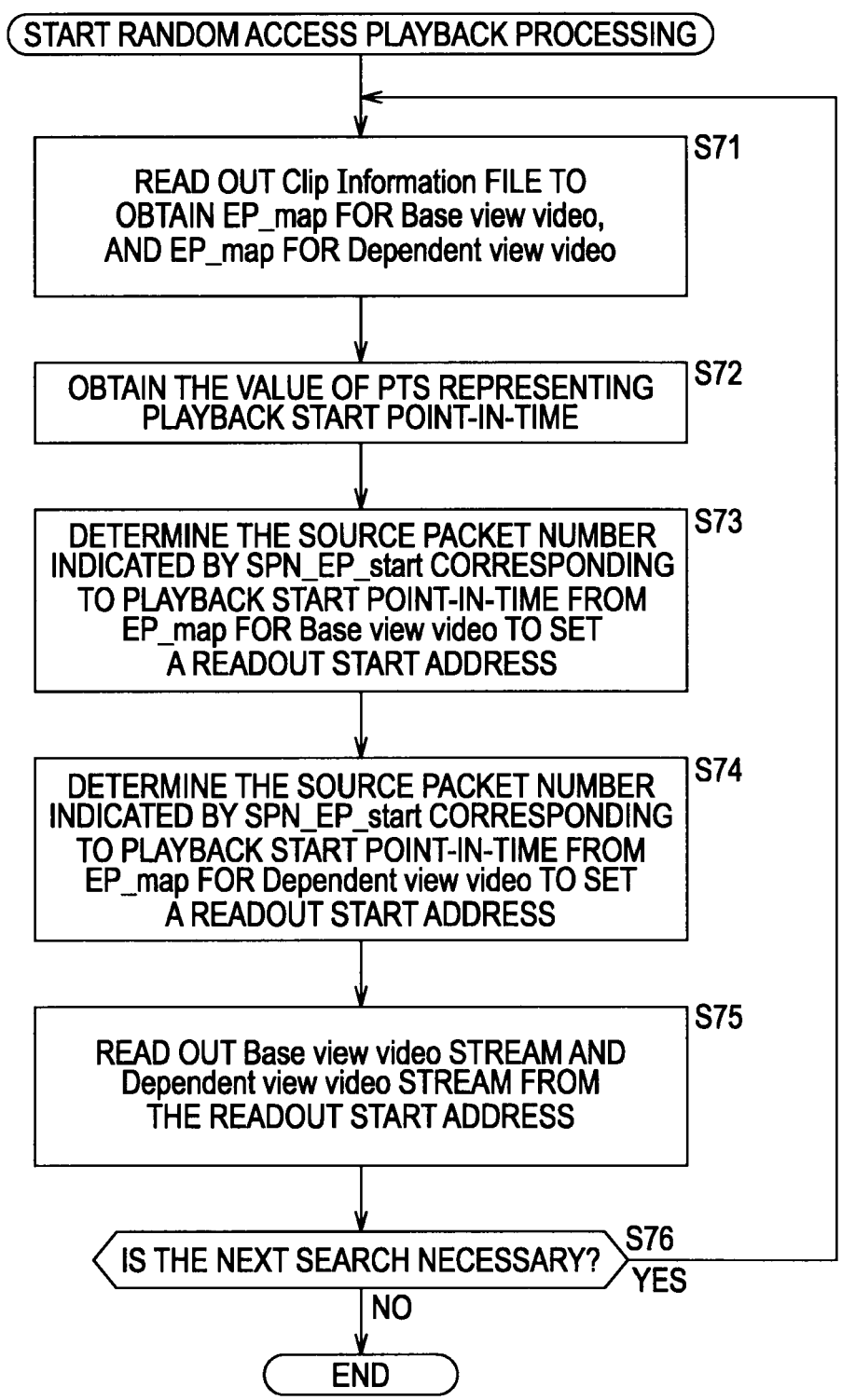
FIG. 61 is a flowchart for describing random access playback processing of the playback device.

Next, description will be made regarding the random access playback processing of the playback device 502 to be performed using the EP_map, with reference to the flowchart in FIG. 61.

In step S71, the control unit 532 controls the obtaining unit 531 to read out the Clip information file of each of the Clip of the Base view video stream, and the Clip of the Dependent view video stream. Also, the control unit 532 obtains the EP_map for Base view video, and the EP_map for Dependent view video. As described above, the EP_map for Base view video, and the EP_map for Dependent view video are prepared, respectively.

In step S72, the control unit 532 obtains a PTS representing the start point-in-time of random access playback based on an operation by the user, or the like. For example, in the event that a chapter set to a video stream has been selected from the menu screen, the PTS of the selected chapter is obtained.

In step S73, the control unit 532 determines the source packet number indicated by the SPN_EP_start corresponding to the obtained PTS of playback start point-in-time from the EP_map for Base view video. Also, the control unit 532 sets an address on a recording medium in which the source packet identified by the determined source packet number is recorded as a readout start address.

For example, based on 14 bits on the MSB side of the 32 bits making up a PTS, search is performed with the EP_coarse that is a sub table of the EP_map for Base view video as an object, the PTS_EP_coarse, corresponding ref_to_EP_fine_id, and SPN_EP_coarse are determined. Also, based on the determined ref to EP_fine_id, search is performed with the EP_fine as an object, the entry PTS_EP_fine corresponding to a 11-bit value from the 10th bit on the LSB side is determined.

The source packet number indicated by the SPN_EP_coarse corresponding to the PTS_EP_fine is determined, an address where the source packet identified by the source packet number is recorded is determined as a readout start address. The address on a recording medium of each of the source packets is determined by a file system for managing data recorded in the recording medium.

In step S74, the control unit 532 determines the source packet number indicated by the SPN_EP_start corresponding to the obtained PTS of playback start point-in-time from the EP_map for Dependent view video. Determination of the source packet number indicated by the SPN_EP_start corresponding to the PTS is also performed using a sub table making up the EP_map for Dependent view video. Also, the control unit 532 sets an address on the recording medium where the source packet identified by the determined source packet number is recorded as a readout start address.

In step S75, the obtaining unit 531 starts readout of the data of each source packet making up the Base view video stream from the readout start address set in step S73. Also, the obtaining unit 531 starts readout of the data of each source packet making up the Dependent view video stream from the readout start address set in step S74.

The readout data of the Base view video stream, and the readout data of the Dependent view video stream are supplied to the MVC decoder 533. The processing described with reference to FIG. 59 and FIG. 60 is performed, and accordingly, decoding from the playback start position specified by the user is performed.

In step S76, the control unit 532 determines whether to perform search next, i.e., whether or not starting of random access playback from another position has been instructed, and in the event that determination is made that starting of random access playback from another position has been instructed, the control unit 532 repeatedly performs processing in step S71 and thereafter.

In the event that determination is made in step S76 that starting of random access playback from another position has not been instructed, the processing is ended.

[Buffer Control Information]

As described above, with the H.264 AVC/MVC profile standard, the Base view video stream that is a video stream serving as a basis, and the Dependent view video stream that is a video stream for performing encoding/decoding with the Base view video stream as a basis are defined.

With the H.264 AVC/MVC profile standard, it is allowed that the Base view video stream and the Dependent view video stream exist as a single video stream, or as independent video streams respectively.

A in FIG. 62 is a diagram illustrating a state in which the Base view video stream and the Dependent view video stream exist as a single video stream.

With the example in A in FIG. 62, each of the whole Base view video stream and the whole Dependent view video stream is divided for each predetermined section, and a single elementary stream is configured such that each section is mixed. With A in FIG. 62, a section denoted with a letter "B" represents a section of the Base view video stream, and a section denoted with a letter "D" represents a section of the Dependent view video stream.

B in FIG. 62 is a diagram illustrating a state in which the Base view video stream and the Dependent view video stream exist as independent video streams, respectively.

With the BD-ROM 3D standard, as illustrated in B in FIG. 62, it is required that the Base view video stream and the Dependent view video stream are recorded on a disc as independent elementary streams, respectively. Also, it is required that the Base view video stream is a stream encoded in accordance with the H.264/AVC standard. These restrictions are for allowing playback (2D playback) of the Base view video stream alone by a BD player incompatible with 3D playback.

Accordingly, with the BD-ROM 3D standard, even in the event of playing the Base view video stream alone encoded in accordance with the H.264/AVC standard, or even in the event that of playing the Base view video stream and the Dependent view video stream together, it is necessary to encode the streams on the recording device side beforehand so as to correctly play the streams. Specifically, encoding needs to be performed so as not to cause buffer underflow or overflow.

With the H.264/AVC standard, it is allowed to encode two types of buffer control information within a stream so as not to cause buffer underflow or the like. With the BD-ROM 3D standard as well, the buffer control information needs to be encoded within a stream assuming decoding of the Base view video stream alone, and decoding of the Base view video stream and the Dependent view video stream together.

Incidentally, playback devices compatible with the BD-ROM 3D standard include a playback device for decoding the Base view video stream and the Dependent view video stream using one decoder, and a playback device for decoding the Base view video stream and the Dependent view video stream using two decoders of a decoder for Base view video, and a decoder for Dependent view video. With the BD-ROM 3D standard, the number of decoders is not stipulated.

Accordingly, with the BD-ROM 3D standard, even in the event that the Base view video stream and the Dependent view video stream were decoded by one decoder, or two decoders, the buffer control information needs to have been encoded within the streams on the recording device side so as to correctly play the streams.

Therefore, with the recording device, the buffer control information is encoded as follows.

1. In the event of playing the Base view video stream alone, a value for enabling this playback to be correctly performed is encoded with the Base view video stream.

2. In the event of playing the Dependent view video stream using an independent decoder (decoder for Dependent view video), a value for enabling this playback to be correctly performed is encoded within the Dependent view video stream.

3. In the event of playing the Base view video stream and the Dependent view video stream together using a single decoder, a value for enabling this playback to be correctly performed is encoded within the Dependent view video stream.

[Specific Example of Encoding Positions]

With the Base view video stream and the Dependent view video stream, HRD parameters and max_dec_frame_buffering are encoded as the buffer control information.

The HRD parameters include information representing the maximum bit rate of input to the decoder from the CPB.

Information representing the maximum bit rate of input to the CPB, information representing the buffer size of the CPB, or a flag indicating whether or not the HRD is a CBR (Constant Bit Rate) may be included.

The max_dec_frame_buffering is information representing the maximum number of sheets of pictures (reference pictures) that can be stored in the DPB.

FIG. 63 is a diagram illustrating an example of the encoding position of the HRD parameters in the Base view video stream.

As illustrated in FIG. 63, the HRD parameters are encoded as single information of the SPS included in each of the Access Units making up the Base view video stream. With the example in FIG. 63, the HRD parameters are encoded as single information of VUI (Video Usability Information) included in the SPS.

The HRD parameters represent the maximum bit rate of input to the decoder in the event of playing the Base view video stream alone. In the event of employing a bus between the CPB and the decoder for transmission of the data alone of the Base view video stream, the transmission rate is restricted to the bit rate or less represented by the HRD parameters.

Note that AUD in FIG. 63 corresponds to the Au delimiter described with reference to FIG. 51, Slices correspond to the data of one picture include in the Access Unit in FIG. 63.

FIG. 64 is a diagram illustrating the description format of seq_parameter_set_data( ) (SPS) in the event of having encoded the HRD parameters in the position indicated in FIG. 63.

As illustrated in FIG. 64, hrd_parameters( ) (HRD parameters) is described in vui_parameters( ) (VUI) within the seq_parameter_set_data( ).

Figure 65:
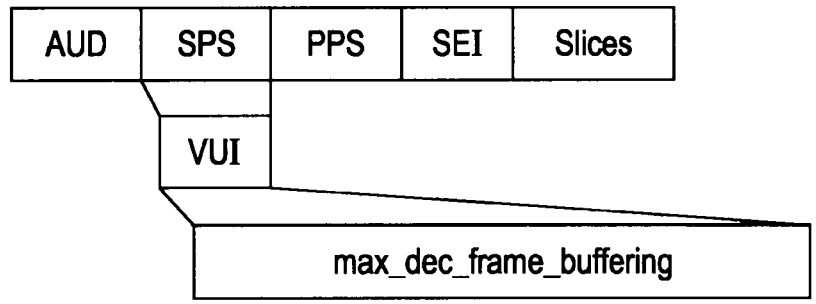
FIG. 65 is a diagram illustrating an example of the encoding position of max_dec_frame_buffering of the Base view video stream.

FIG. 65 is a diagram illustrating an example of the encoding position of the max_dec_frame_buffering in the Base view video stream.

As illustrated in FIG. 65, the max_dec_frame_buffering is also encoded as single information included in each of the Access Units making up the Base view video stream. With the example in FIG. 65, the max_dec_frame_buffering is encoded as single information of the VUI included in the SPS.

The max_dec_frame_buffering in FIG. 65 represents the maximum number of sheets of pictures that can be stored in the DPB in the event of playing the Base view video stream alone. In the event that one DPB is employed for storage of the decoded picture alone of the Base view video stream, the number of sheets of pictures to be stored in the DPB is restricted to the number of sheets or less represented by the max_dec_frame_buffering.

Figure 66:
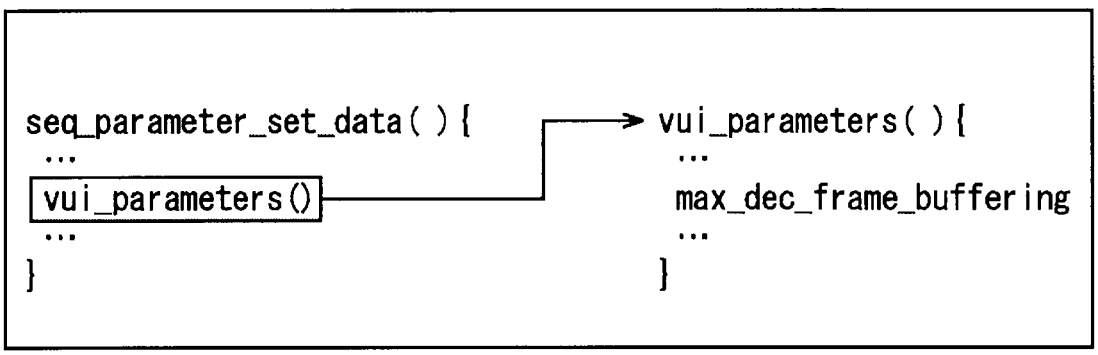
FIG. 66 is a diagram illustrating a description format in the event of having encoded the max_dec_frame_buffering at the position illustrated in FIG. 65.

FIG. 66 is a diagram illustrating the description format of the seq_parameter_set_data( ) in the event of having encoded the max_dec_frame_buffering in the position illustrated in FIG. 65.

As illustrated in FIG. 66, the max_dec_frame_buffering is described in the vui_parameters( ) within the seq_parameter_set_data( ).

Hereafter, as illustrated in FIG. 63, the HRD parameters encoded in the Base view video stream will be referred to as first HRD parameters as appropriate. Also, as illustrated in FIG. 65, the max_dec_frame_buffering encoded in the Base view video stream will be referred to as first max_dec_frame_buffering.

Figure 67:
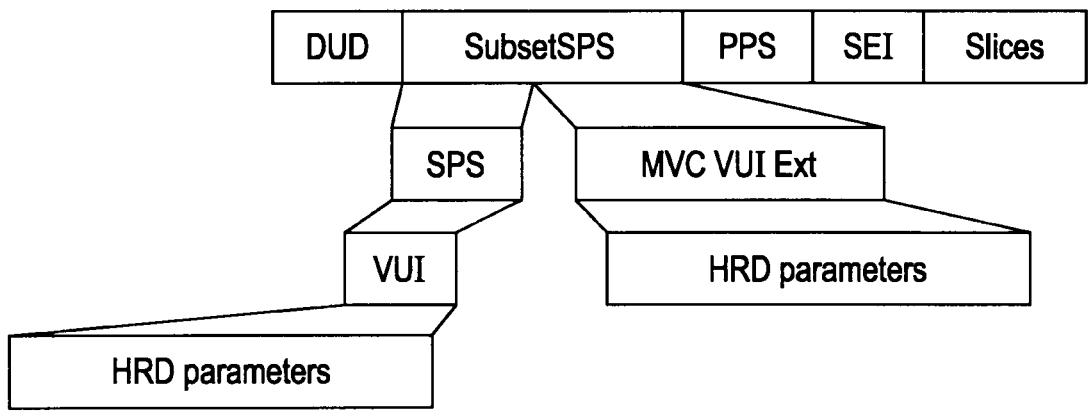
FIG. 67 is a diagram illustrating an example of the encoding position of HRD parameters of the Dependent view video stream.

FIG. 67 is a diagram illustrating an example of the encoding position of the HRD parameters in the Dependent view video stream.

As illustrated in FIG. 67, the HRD parameters are encoded as single information of the SubsetSPS included in each of the Dependent Units making up the Dependent view video stream. With the example in FIG. 67, the HRD parameters are encoded as single information of the SPS included in the SubsetSPS.

The HRD parameters encoded as single information of the SPS represent the maximum bit rate of input to the decoder for Dependent view video in the event of playing the Dependent view video stream by an independent decoder. In the event of employing a bus between the CPB and the independent decoder for transmission of the data alone of the Dependent view video stream, the transmission rate is restricted to the bit rate or less represented by the HRD parameters.

Figure 68:
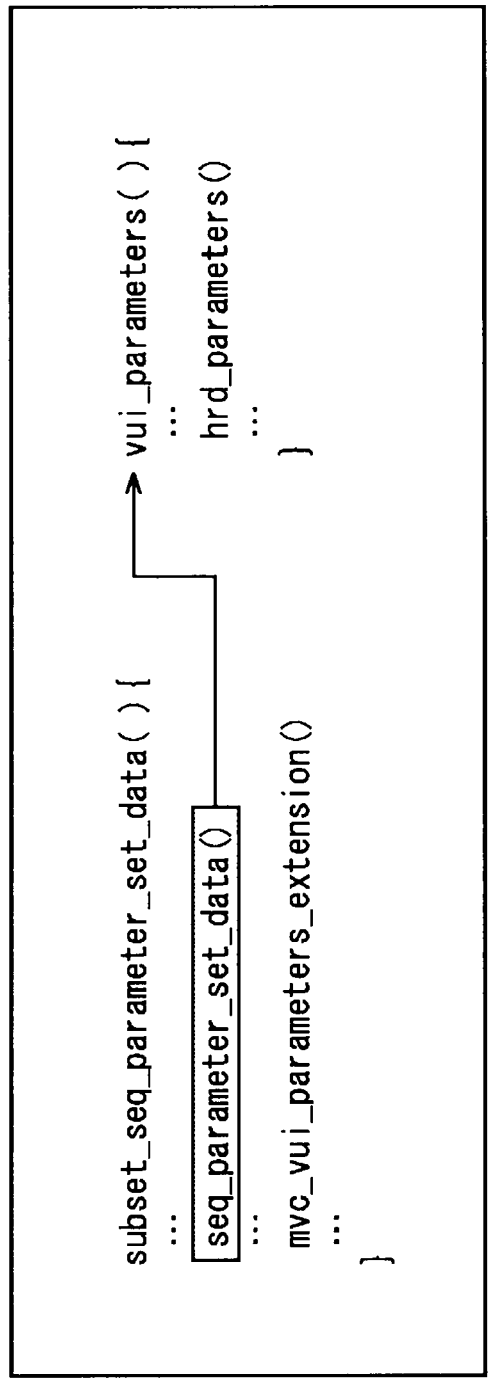
FIG. 68 is a diagram illustrating a description format in the event of having encoded HRD parameters at the position illustrated in FIG. 67.

FIG. 68 is a diagram illustrating the description format of the subset_seq_parameter_set_data( ) (SubsetSPS) in the event of having encoded the HRD parameters as single information of the SPS. The SubsetSPS is the description of a parameter expanded from the SPS of the H.264/AVC, and includes information representing dependence relationship between views, and so forth.

As illustrated in FIG. 68, hrd_parameters( ) is described in the vui_parameters( ) in the seq_parameter_set_data( ) in the subset_seq_parameter_set_data( ).

With the example in FIG. 67, the HRD parameters are encoded as single information of MVC VUI Ext include in the SubsetSPS.

The HRD parameters encoded as single information of the MVC VUI Ext represent the maximum bit rate of input to the decoder in the event of playing the Base view video stream and the Dependent view video stream together using the single decoder. In the event of employing a bus between the CPB and the single decoder for transmission of the data of the Base view video stream, and the data of the Dependent view video stream, the transmission rate is restricted to the bit rate or less represented by the HRD parameters.

FIG. 69 is a diagram illustrating the description format of the subset_seq_parameter_set_data( ) in the event of having encoded the HRD parameters as single information of the MVC VUI Ext.

As illustrated in FIG. 69, hrd_parameters( ) is described in the mvc_vui_parameters_extension( ) in the subset_seq_parameter_set_data( ) (MVC VUI Ext).

Hereafter, As illustrated in FIG. 67, the HRD parameters (left side in FIG. 67) encoded in the Dependent view video stream as single information of the SPS will be referred to as second HRD parameters as appropriate. Also, the HRD parameters encoded in the Dependent view video stream (right side in FIG. 67) as single information of the MVC VUI Ext will be referred to as third HRD parameters.

Figure 70:
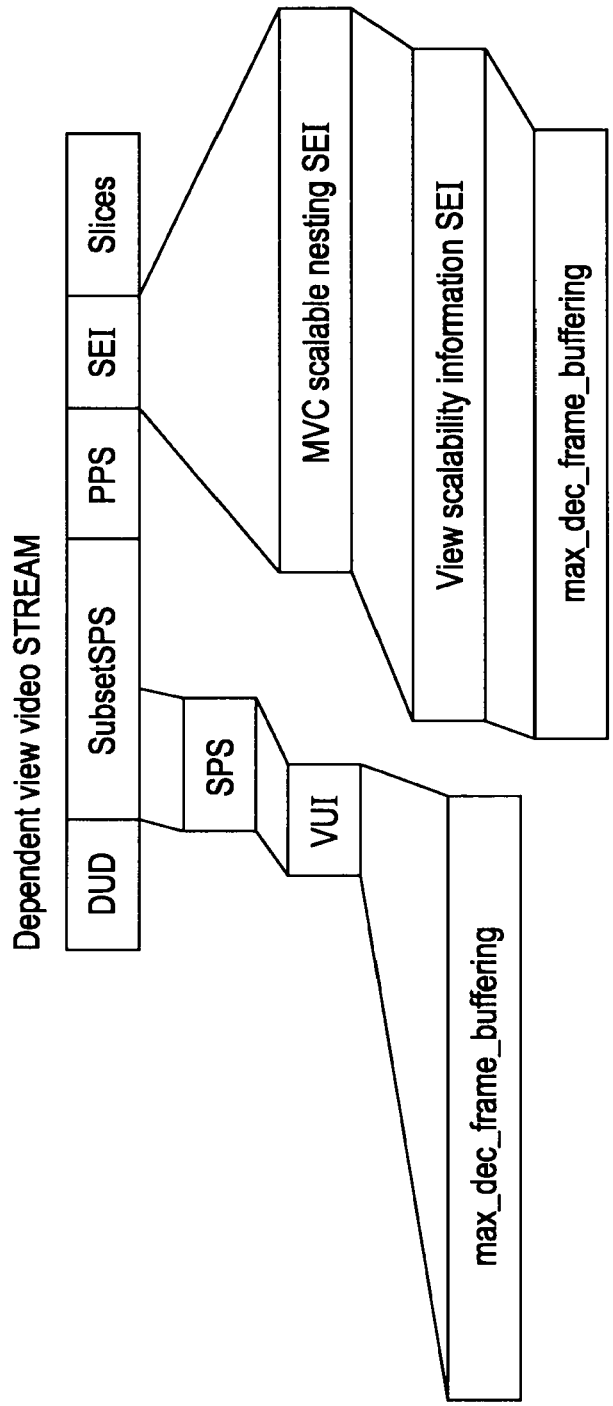
FIG. 70 is a diagram illustrating an example of the encoding position of the max_dec_frame_buffering in the Dependent view video stream.

FIG. 70 is a diagram illustrating an example of the encoding position of the max_dec_frame_buffering in the Dependent view video stream.

As illustrated in FIG. 70, the max_dec_frame_buffering is encoded as single information of the SubsetSPS included in each of the Dependent Units making up the Dependent view video stream. With the example in FIG. 70, the max_dec_frame_buffering is encoded as single information of the SPS included in the SubsetSPS.

The max_dec_frame_buffering encoded as single information of the SPS represents the maximum number of sheets of pictures that can be stored in the DPB in the event of playing the Dependent view video stream by the independent decoder. In the event that the single DPB is employed for storage of the decoded picture alone of the Dependent view video stream, the number of sheets of pictures to be stored in the DPB is restricted to the number of sheets or less represented with the max_dec_frame_buffering.

FIG. 71 is a diagram illustrating the description format of the subset_seq_parameter_set_data( ) in the event of having encoded the max_dec_frame_buffering as single information of the SPS.

As illustrated in FIG. 71, the max_dec_frame_buffering is described in the vui_parameters( ) in the seq_parameter_set_data( ) in the subset_seq_parameter_set_data( ).

With the example in FIG. 70, the max_dec_frame_buffering has been encoded as single information of the SEI.

The max_dec_frame_buffering encoded as single information of the SEI represents the maximum number of sheets of pictures that can be stored in the DPB in the event of playing the Base view video stream and the Dependent view video stream together by the single decoder. In the event that the single DPB is employed for storage of the decoded picture of the Base view video stream, and the decoded picture of the Dependent view video stream, the number of sheets of pictures to be stored in the DPB is restricted to the number of sheets or less represented with the max_dec_frame_buffering.

Figure 72:
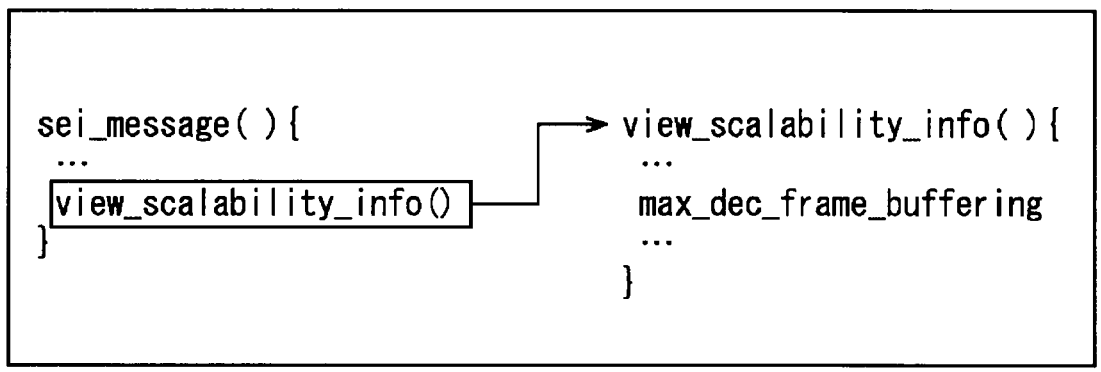
FIG. 72 is a diagram illustrating another description format in the event of having encoded the max_dec_frame_buffering at the position illustrated in FIG. 70.

FIG. 72 is a diagram illustrating the description format of the sei_message( ) (SEI) in the event that the max_dec_frame_buffering has been encoded as single information of the SEI.

As illustrated in FIG. 72, the max_dec_frame_buffering is described in the view_sealability_info( ) (View scalability information SEI) in the sei_message( ).

Hereafter, As illustrated in FIG. 70, the max_dec_frame_buffering (left side in FIG. 70) encoded in the Dependent view video stream as single information of the SPS will be referred to as second max_dec_frame_buffering as appropriate. Also, the max_dec_frame_buffering encoded in the Dependent view video stream (right side in FIG. 70) as single information of the SEI will be referred to as third max_dec_frame_buffering.

In this way, the HRD parameters and the max_dec_frame_buffering are encoded in increments of three types in the Base view video stream and the Dependent view video stream.

[Configuration of the Device]

A recording device for recording data including the buffer control information in a BD has the same configuration as the recording device 501 illustrated in FIG. 52. Also, a playback device for playing data recorded in a BD has the same configuration as the playback device 502 illustrated in FIG. 56.

Hereafter, description will be made regarding the configurations of the recording device and playback device for performing processing using the buffer control information with reference to the configurations in FIG. 52 and FIG. 56. Description redundant with the above description will be omitted as appropriate.

The information generating unit 511 of the recording device 501 generates database information made up of a PlayList file and a Clip information file, and also additional information for Base view video, and additional information for Dependent view video. The additional information for Base view video includes the first HRD parameters, and first max_dec_frame_buffering. Also, the additional information for Dependent view video includes the second and third HRD parameters, and the second and third max_dec_frame_buffering.

The information generating unit 511 outputs the generated database information to the recording unit 513, and outputs the generated additional information to the MVC encoder 512.

The MVC encoder 512 encodes L image data and R image data in accordance with the H.264 AVC/MVC profile standard to generate the data of each picture of the Base view video obtained by encoding the L image data, and the data of each picture of the Dependent view video obtained by encoding the R image data.

Also, the MVC encoder 512 generates a Base view video stream by adding the additional information for Base view video generated by the information generating unit 511 to the data of each picture of the Base view video. With the Base view video stream, the first HRD parameters are encoded in the position illustrated in FIG. 63, and the first max_dec_frame_buffering is encoded in the position illustrated in FIG. 65.

Similarly, the MVC encoder 512 generates a Dependent view video stream by adding the additional information for Dependent view video generated by the information generating unit 511 to the data of each picture of the Dependent view video. With the Dependent view video stream, the second and third HRD parameters are encoded in the positions illustrated in FIG. 67, and the second and third max_dec_frame_buffering is encoded in the positions illustrated in FIG. 70.

The MVC encoder 512 outputs the generated Base view video stream and Dependent view video stream to the recording unit 513.

The recording unit 513 records the database information supplied from the information generating unit 511, and the Base view video stream and Dependent view video stream supplied from the MVC encoder 512 in a BD. The BD in which data has been recorded by the recording unit 513 is provided to the playback device 502.

The obtaining unit 531 of the playback device 502 reads out data from a BD in which data has been recorded by the recording device 501, and has been mounted on the playback device 502. The obtaining unit 531 outputs the database information read out from the BD to the control unit 532, and outputs the Base view video stream and the Dependent view video stream to the MVC decoder 533.

The control unit 532 controls the whole operation of the playback device 502 such as readout of data from a recording medium, and so forth.

For example, in the event of playing the Base view video stream alone, the control unit 532 reads out the first HRD parameters, and the first max_dec_frame_buffering from the Base view video stream. The control unit 532 controls decoding of the Base view video stream by the MVC decoder 533 based on the readout information.

Also, in the event of playing the Base view video stream and the Dependent view video stream (3D playback), when the MVC decoder 533 include a single decoder, the control unit 532 reads out the third HRD parameters and the third max_dec_frame_buffering from the Dependent view video stream. The control unit 532 controls decoding of the Base view video stream and the Dependent view video stream by the MVC decoder 533 based on the readout information.

The MVC decoder 533 decodes the Base view video stream alone, or the Base view video stream and the Dependent view video stream in accordance with the control by the control unit 532. The MVC decoder 533 outputs the data obtained by decoding to the output unit 534.

The output unit 534 outputs the image supplied from the MVC decoder 533 to the display to display a 2D image or 3D image.

[Operation of the Device]

Figure 73:
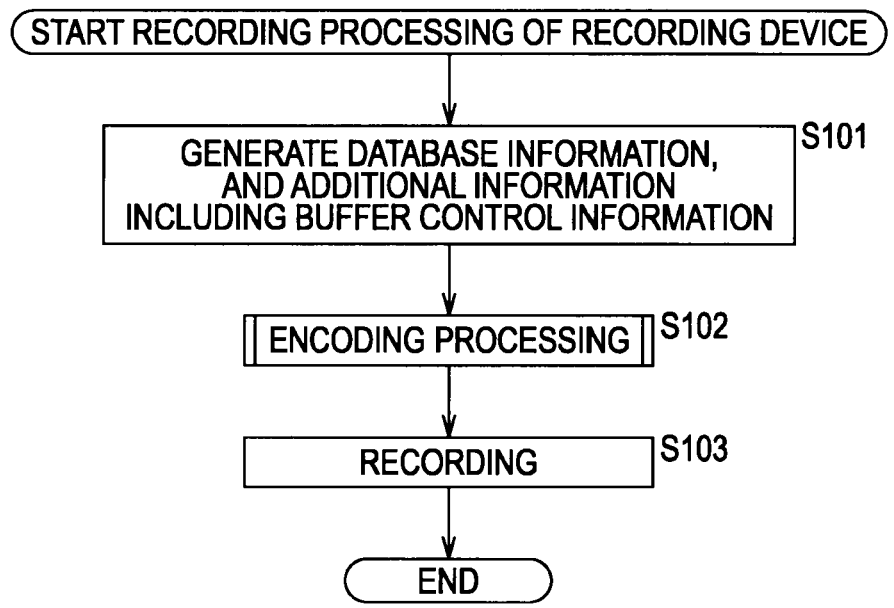
FIG. 73 is a flowchart for describing the recording processing of the recording device.

Now, description will be made regarding the recording processing of the recording device 501, with reference to the flowchart in FIG. 73.

In step S101, the information generating unit 511 generates additional information including database information, and buffer control information to be added to each picture of the Base view video and the Dependent view video.

In step S102, encoding processing is performed by the MVC encoder 512. Here, the same processing as the processing described with reference to FIG. 55 is performed. The buffer control information generated in step S101 is added to each picture of the Base view video and the Dependent view video. The Base view video stream and the Dependent view video stream generated by the encoding processing are supplied to the recording unit 513.

In step S103, the recording unit 513 records the database information generated by the information generating unit 511, and the Base view video stream and the Dependent view video stream generated by the MVC encoder 512 in a BD. Subsequently, the processing is ended.

Figure 74:
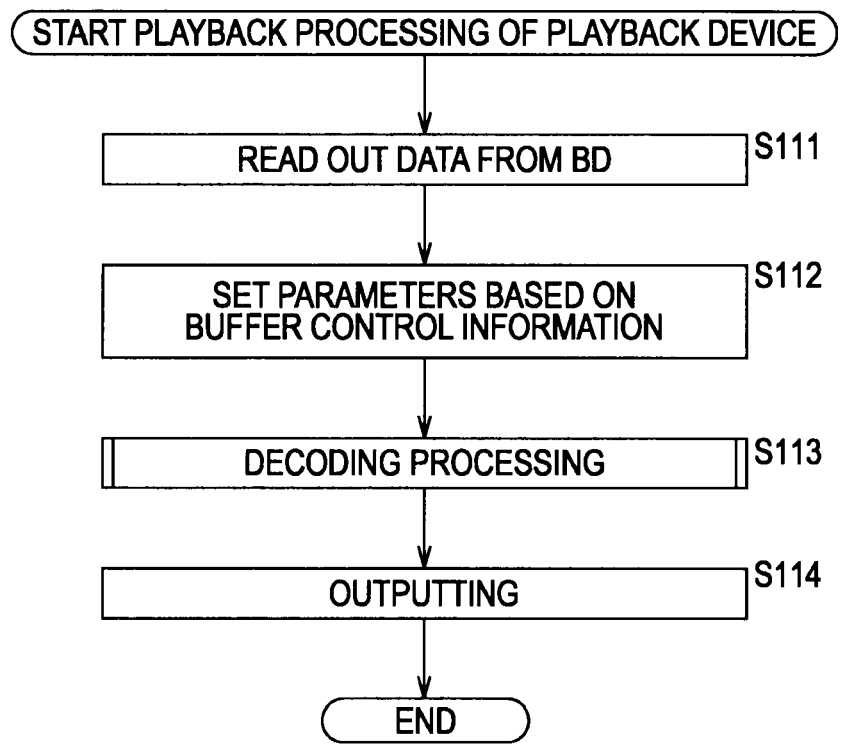
FIG. 74 is a flowchart for describing the playback processing of the playback device.

Next, description will be made regarding the playback processing of the playback device 502, with reference to the flowchart in FIG. 74.

In step S111, the obtaining unit 531 reads out data from the BD mounted on the playback device 502. The obtaining unit 531 outputs the readout database information to the control unit 532, and in the event of performing 3D playback for example, outputs the data of the Base view video stream and the Dependent view video stream to the MVC decoder 533.

In step S112, the control unit 532 reads out the buffer control information from the data of the stream read out and supplied from the BD, and sets parameters to the MVC decoder 533. A stream serving as a readout source of the buffer control information changes according to the stream read out from the BD, or the configuration of the MVC decoder 533, which will be described later.

In step S113, the MVC decoder 533 performs the decoding processing described with reference to FIG. 59 and FIG. 60 in accordance with the parameters set by the control unit 532.

In step S114, the output unit 534 outputs the image data obtained by performing the decoding processing by the MVC decoder 533 to the display. Subsequently, the processing is ended.

[Specific Example of Setting of Parameters]

Description will be made regarding a specific example of setting of parameters to be performed using the buffer control information.

Now, let us say that the maximum bit rate of input to the decoder in the event of having played the Base view video stream alone is 40 Mbps. Also, let us say that the maximum bit rate of input to the decoder for Dependent view video in the event of having played the Dependent view video stream by the independent decoder is 40 Mbps. Let us say that the maximum bit rate of input to the decoder in the event of having played the Base view video stream and the Dependent view video stream together by the single decoder is 60 Mbps.

In this case, with the recording device 501, as the value of the first HRD parameters, and the value of the second HRD parameters, a value representing 40 Mbps is encoded in any case. A value representing 60 Mbps is encoded as the value of the third HRD parameters.

Also, let us say that the maximum number of sheets of pictures that can be stored in the DPB in the event of having played the Base view video stream alone is four sheets. Let us say that the maximum number of sheets of pictures that can be stored in the DPB in the event of having played the Dependent view video stream by the independent decoder is four sheets. Let us say that the maximum number of sheets of pictures that can be stored in the DPB in the event of having played the Base view video stream and the Dependent view video stream together by the single decoder is six sheets.

In this case, with the recording device 501, as the value of the first max_dec_frame_buffering, and the value of the second max_dec_frame_buffering, a value representing four sheets is encoded in any case. A value representing six sheets is encoded as the value of the third max_dec_frame_buffering.

Figure 75:
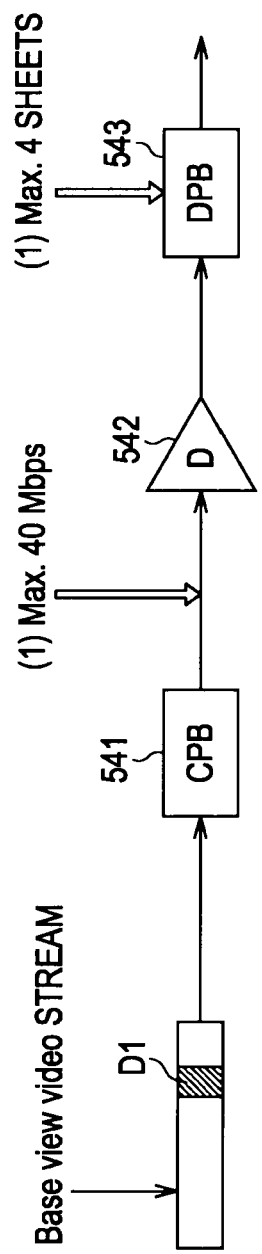
FIG. 75 is a diagram a setting example of a parameter.

FIG. 75 is a diagram illustrating an example in the event of decoding the Base view video stream alone at the MVC decoder 533 including the single decoder.

In this case, as illustrated in FIG. 75, the first HRD parameters and the first max_dec_frame_buffering encoded in the Base view video stream are read out by the control unit 532. Buffer control information D1 denoted by adding slanting lines on the Base view video stream represents the first HRD parameters, and the first max_dec_frame_buffering.

Also, the maximum bit rate of input to the decoder 542 from the CPB 541 is set as 40 Mbps based on the first HRD parameters. For example, the maximum bit rate is set by the bandwidth of a bus between the CPB 541 and the decoder 542 being secured by 40 Mbps worth.

Further, the maximum number of sheets of pictures that can be stored in the DPB 543 is set to four sheets by the control unit 532 based on the first max_dec_frame_buffering. For example, of the storage region of the DPB 543, a region that can store four sheets worth alone of decoded pictures is secured, and accordingly, the maximum number of sheets of pictures that can be stored is set.

Thus, decoding of the Base view video stream is performed using the single decoder such as assumed by the recording side. In the event that the Base view video stream has been encoded on the recording side so as to decode this within a constraint range, the buffer on the playback side can be prevented from collapse.

Figure 76:
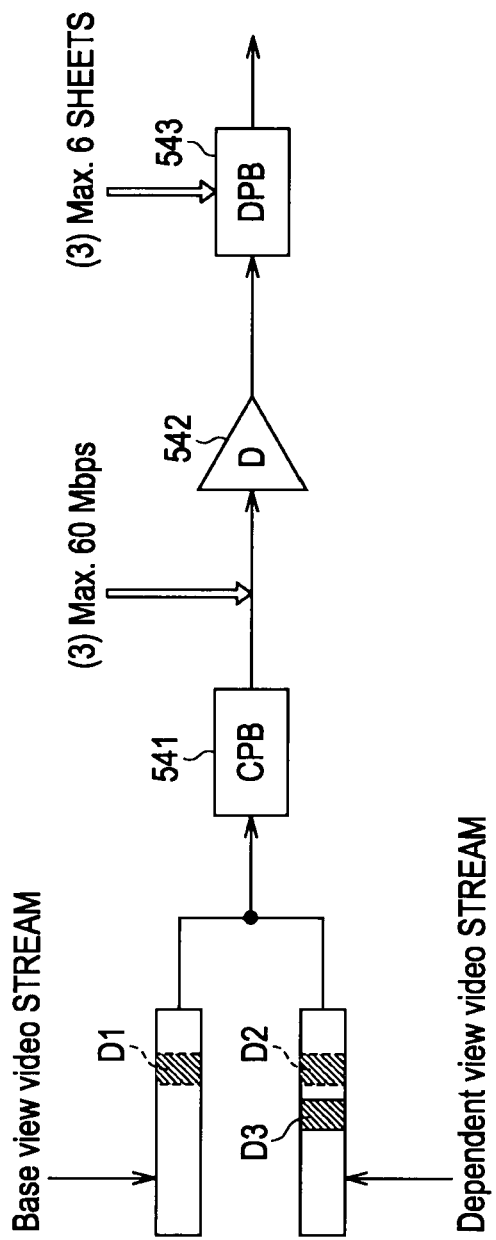
FIG. 76 is a diagram another setting example of a parameter.

FIG. 76 is a diagram illustrating an example of a case where the Base view video stream and the Dependent view video stream are decoded by the MVC decoder 533 including the single decoder.

In this case, as illustrated in FIG. 76, the third HRD parameters and the third max_dec_frame_buffering encoded in the Dependent view video stream are read out by the control unit 532. Buffer control information D2 denoted by adding slanting lines on the Dependent view video stream represents the second HRD parameters and the second max_dec_frame_buffering. Also, buffer control information D3 represents the third HRD parameters and the third max_dec_frame_buffering.

Also, the maximum bit rate of input to the decoder 542 from the CPB 541 is set to 60 Mbps by the control unit 532 based on the third HRD parameters.

Further, the maximum number of sheets of pictures that can be stored in the DPB 543 is set to six sheets by the control unit 532 based on the third max_dec_frame_buffering.

Thus, decoding of the Base view video stream and the Dependent view video stream is performed such as assumed by the recording side. In the event that the Base view video stream and the Dependent view video stream have been encoded on the recording side so as to decode these within a constraint range, the buffer on the playback side can be prevented from collapse.

Figure 77:
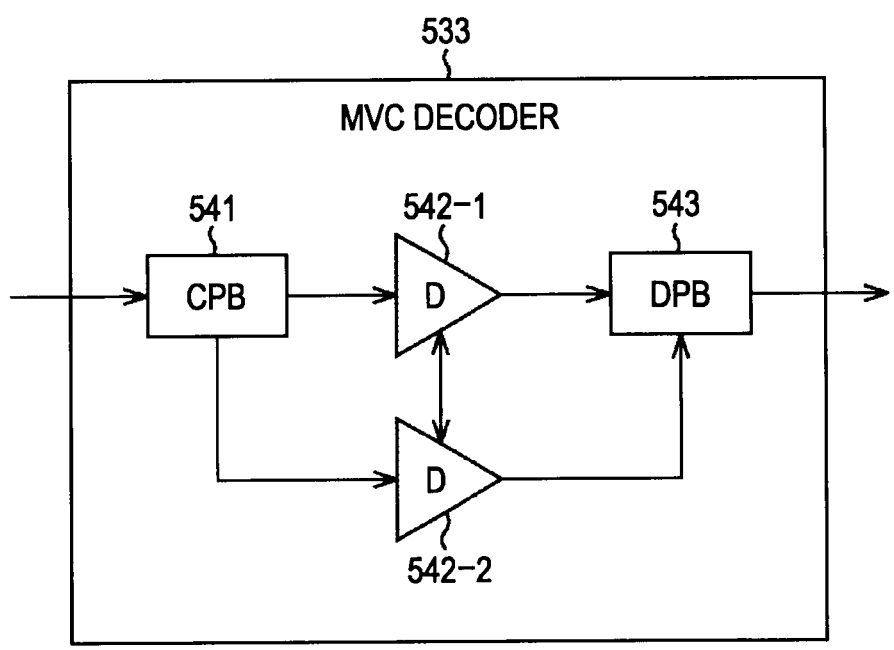
FIG. 77 is a block diagram illustrating another configuration example of the MVC decoder.

FIG. 77 is a block diagram illustrating another configuration example of the MVC decoder 533.

Of the configuration illustrated in FIG. 77, the same configuration as the configuration illustrated in FIG. 57 are denoted with the same reference numeral. Redundant description will be omitted as appropriate.

With the example in FIG. 77, two decoders of a decoder 542-1 and a decoder 542-2 are provided. The decoder 542-1 is a decoder for Base view video, and the decoder 542-2 is a decoder for Dependent view video.

The data of the Base view video stream stored in the CPB 541 is read out by the decoder 542-1 in increments of data making up one Access Unit. Also, the Dependent view video stream stored in the CPB 541 is read out by the decoder 542-2 in increments of data making up one Dependent Unit.

The decoder 542-1 decodes the data read out from the CPB 541 to output the data of each picture of the Base view video obtained by decoding, to the DPB 543.

The decoder 542-2 decodes the data read out from the CPB 541 to output the data of each picture of the Dependent view video obtained by decoding, to the DPB 543.

Description will be made regarding such a case where the MVC decoder 533 includes the two decoders.

Figure 78:
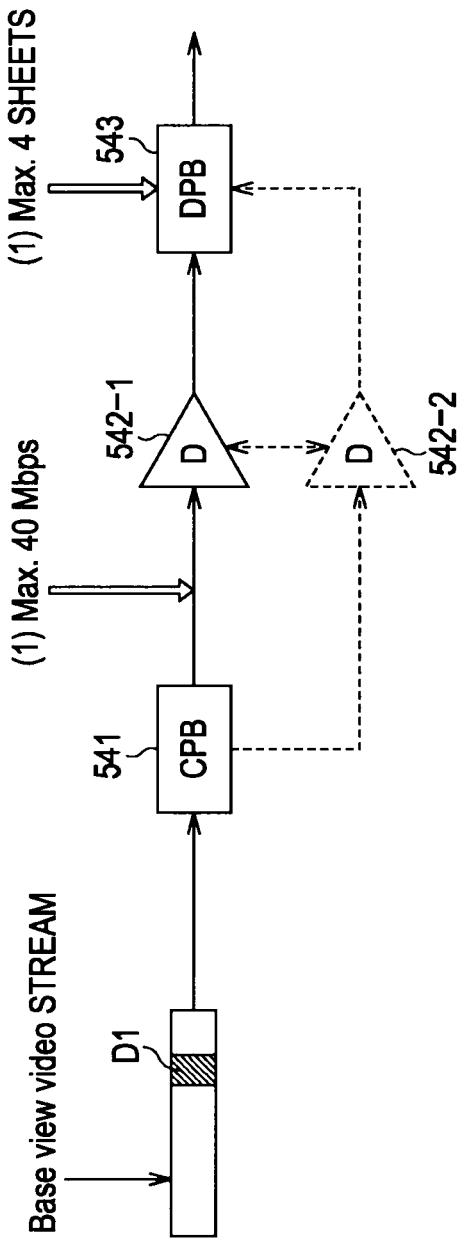
FIG. 78 is a diagram illustrating yet another setting example of a parameter.

FIG. 78 is a diagram illustrating an example in the event that the Base view video stream alone is decoded at the MVC decoder 533 including the two decoders.

In this case, as illustrated in FIG. 78, the first HRD parameters and the first max_dec_frame_buffering encoded in the Base view video stream are read out by the control unit 532.

Also, the maximum bit rate of input to the decoder 542 from the CPB 541 is set to 40 Mbps by the control unit 532 based on the first HRD parameters.

Further, the maximum number of sheets of pictures that can be stored in the DPB 543 is set to four sheets by the control unit 532 based on the first max_dec_frame_buffering.

In FIG. 78, the decoder 542-2 is denoted with a dashed line, which indicates that processing is not performed at the decoder 542-2.

Figure 79:
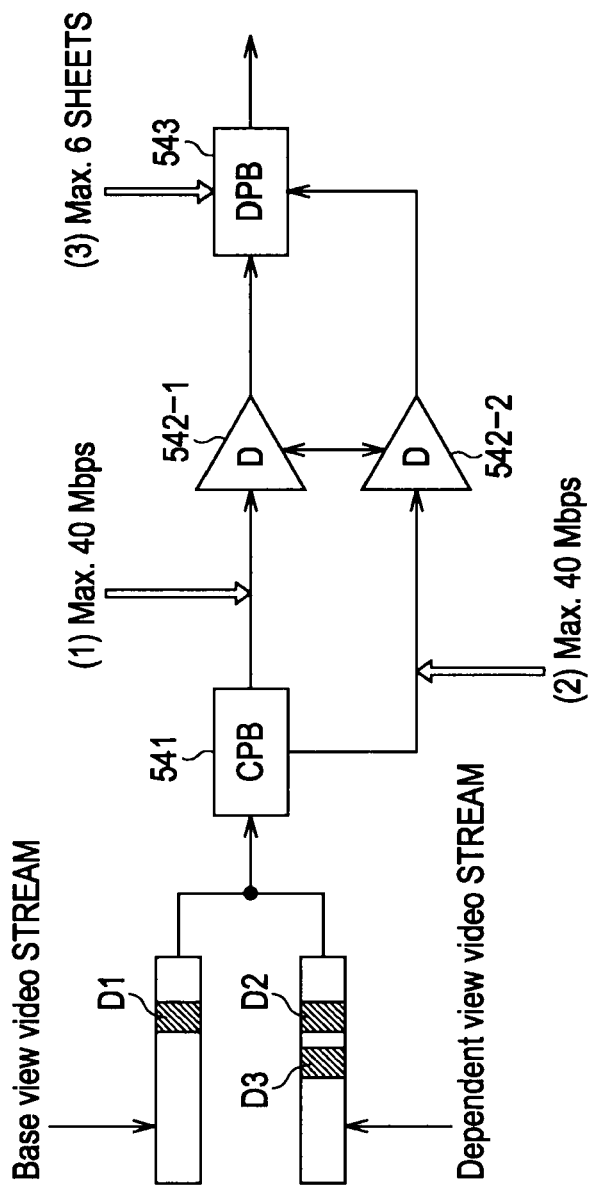
FIG. 79 is a diagram illustrating a setting example of a parameter.

FIG. 79 is a diagram illustrating an example in the event that the Base view video stream and the Dependent view video stream are decoded at the MVC decoder 533 including the two decoders.

In this case, as illustrated in FIG. 79, the first HRD parameters encoded in the Base view video stream, and the second HRD parameters and the third max_dec_frame_buffering encoded in the Dependent view video stream are read out by the control unit 532.

Also, the maximum bit rate of input to the decoder 542-1 from the CPB 541 is set to 40 Mbps based on the first HRD parameters, and the maximum bit rate of input to the decoder 542-2 from the CPB 541 is set to 40 Mbps based on the second HRD parameters, by the control unit 532.

Further, the maximum number of sheets of pictures that can be stored in the DPB 543 is set to six sheets by the control unit 532 based on the third max_dec_frame_buffering. The DPB 543 is commonly employed for the Base view video and the Dependent view video, and accordingly, the third max_dec_frame_buffering is employed as a parameter for setting the maximum number of sheets of pictures that can be stored in the DPB 543.

Figure 80:
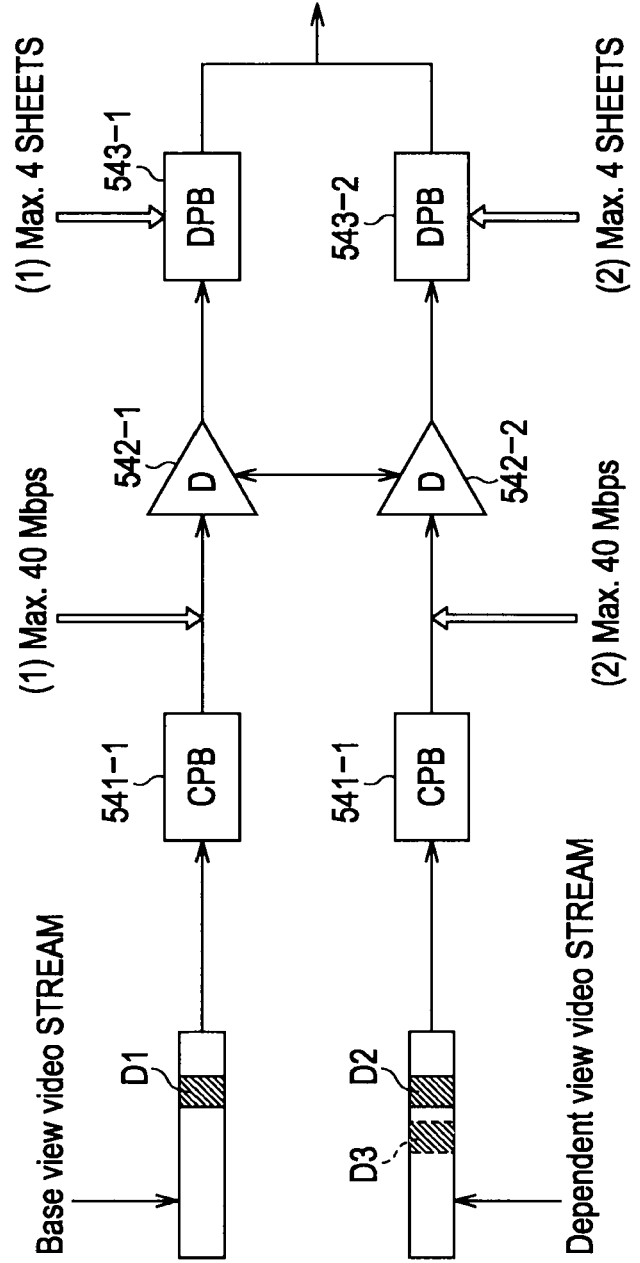
FIG. 80 is a diagram illustrating another setting example of a parameter.

FIG. 80 is a diagram illustrating another example in the event that the Base view video stream and the Dependent view video stream are decoded at the MVC decoder 533 including the two decoders.

With the MVC decoder 533 in FIG. 80, there are also provided a buffer for Base view video, and a buffer for Dependent view video regarding each of the CPB 541 and the DPB 543.

In this case, as illustrated in FIG. 80, the first HRD parameters and the first max_dec_frame_buffering encoded in the Base view video stream are read out by the control unit 532. Also, the second HRD parameters and the second max_dec_frame_buffering encoded in the Dependent view video stream are read out by the control unit 532.

The maximum bit rate of input to the decoder 542-1 from the CPB 541-1 that is a CPB for Base view video is set to 40 Mbps by the control unit 532 based on the first HRD parameters. Also, the maximum bit rate of input to the decoder 542-2 from the CPB 541-2 that is a CPB for Dependent view video is set to 40 Mbps based on the second HRD parameters.

Further, the maximum number of sheets of pictures that can be stored in the DPB 543-1 that is a DPB for Base view video is set to four sheets by the control unit 532 based on the first max_dec_frame_buffering. Also, the maximum number of sheets of pictures that can be stored in the DPB 543-2 that is a DPB for Dependent view video is set to four sheets based on the second max_dec_frame_buffering.

Figure 81:
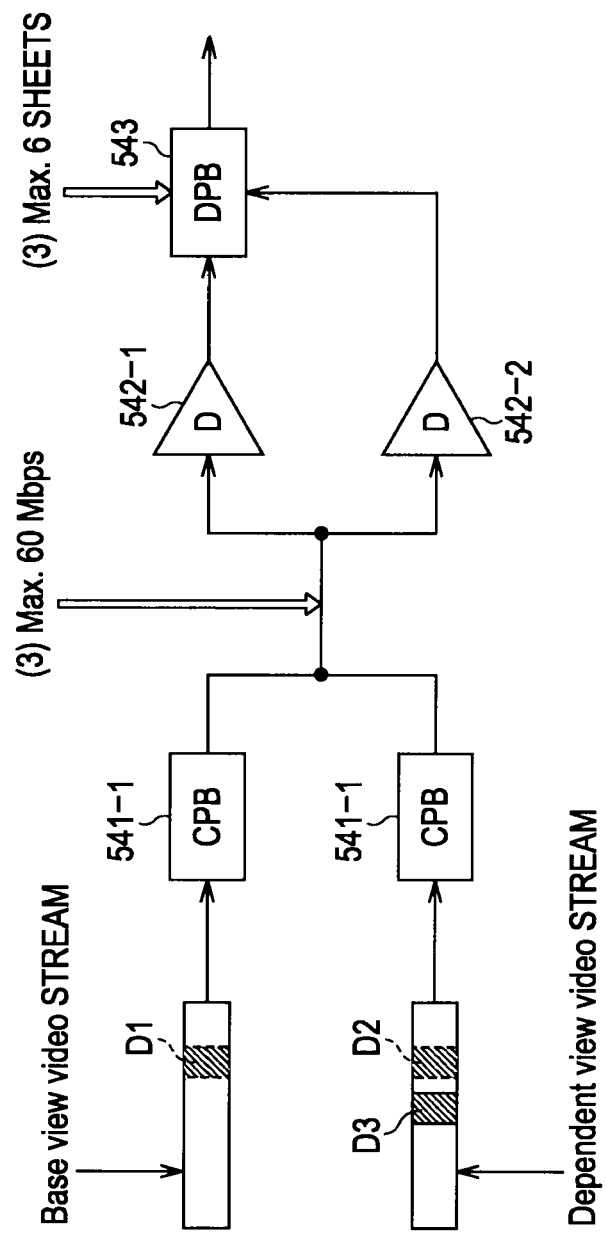
FIG. 81 is a diagram illustrating yet another setting example of a parameter.

FIG. 81 is a diagram illustrating yet another example in the event that the Base view video stream and the Dependent view video stream are decoded at the MVC decoder 533 including the two decoders.

With the MVC decoder 533 in FIG. 81, there are provided a buffer for Base view video, and a buffer for Dependent view video regarding the CPB, but a buffer is commonly provided for Base view video and Dependent view video regarding the DPB. Also, transmission of data between the CPB 541-1 that is a CPB for Base view video and the decoder 542-1, and transmission of data between the CPB 541-2 that is a CPB for Dependent view video and the decoder 542-2 are performed via the same bus.

In this case, as illustrated in FIG. 81, the third HRD parameters and the third max_dec_frame_buffering encoded in the Dependent view video stream are read out by the control unit 532.

Also, the maximum bit rate of a bus to be used for data transmission between the CPB 541-1 and the decoder 542-1, and data transmission between the CPB 541-2 and the decoder 542-2 is set to 60 Mbps by the control unit 532 based on the third HRD parameters.

Further, the maximum number of sheets of pictures that can be stored in the DPB 543 is set to six sheets by the control unit 532 based on the third max_dec_frame_buffering.

[Verification Device]

Figure 82:
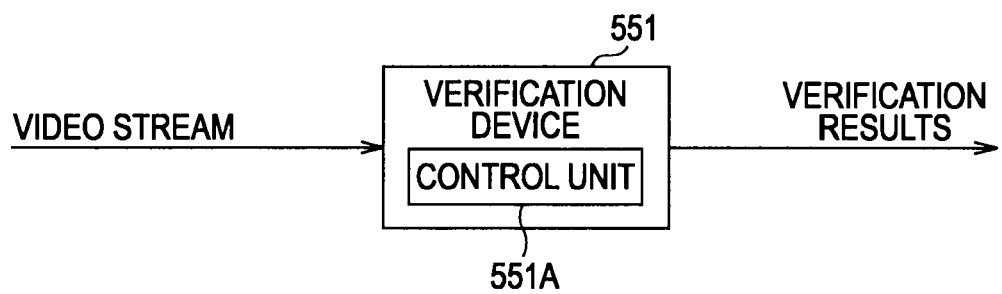
FIG. 82 is a diagram illustrating a verification device.

FIG. 82 is a diagram illustrating a verification device for verifying whether or not a video stream recorded in a BD by the recording device 501 can correctly be played at the playback device 502.

The verification device 551 in FIG. 82 is configured of a computer. The video stream read out from the BD is input to the verification device 551.

With the Base view video stream to be input to the verification device 551 as a video stream, the first HRD parameters and the first max_dec_frame_buffering are encoded. Also, with the Dependent view video stream, the second and third HRD parameters, and the second and third max_dec_frame_buffering are encoded.

With the verification device 551, a control unit 551A is realized by a predetermined program being executed by a CPU. The control unit 551A verifies whether or not an input video stream can correctly be played at the playback device 502, and outputs information representing the verification results. The verification results are displayed for example, and are confirmed by the user who performs verification using the verification device 551.

Also, with the verification device 551, an HRD (Hypothetical Reference Decoder) is realized by the CPU executing a predetermined program. The HRD virtually reproduces the MVC decoder 533 of the playback device 502. The functional configuration of the HRD is illustrated in FIG. 83.

Figure 83:
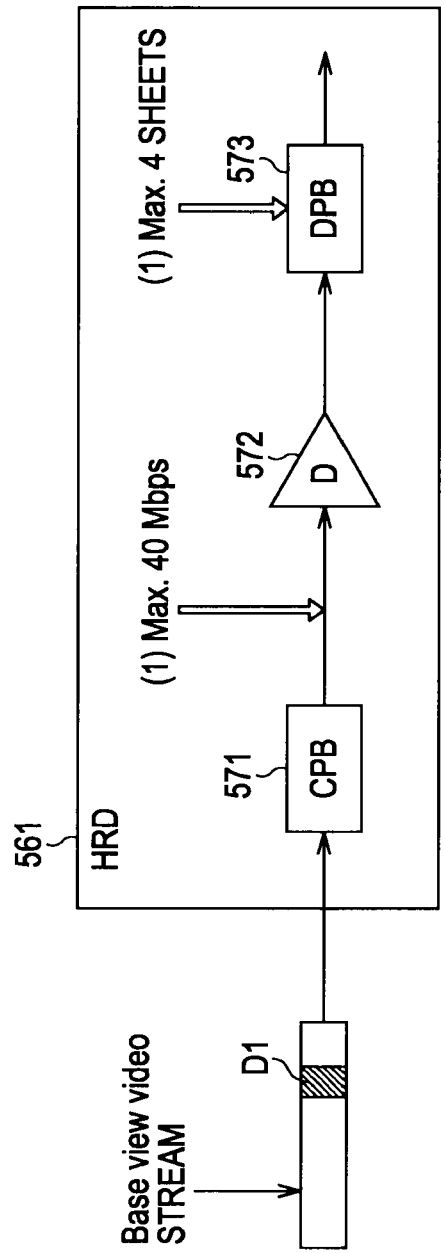
FIG. 83 is a diagram illustrating the functional configuration of an HRD.

As illustrated in FIG. 83, an HRD 561 is configured of a CPB 571, a decoder 572, and a DPB 573.

The CPB 571 stores the data of an input Base view video stream, and the data of an input Dependent view video stream. The data of the Base view video stream stored in the CPB 571 is read out by the decoder 572 in increments of data making up one Access Unit. Similarly, the data of the Dependent view video stream stored in the CPB 571 is read out by the decoder 572 in increments of data making up one Dependent Unit.

The decoder 572 decodes the data read out from the CPB 571, and outputs the data of each picture of the Base view video and Dependent view video obtained by decoding, to the DPB 573.

The DPB 573 stores the data supplied from the decoder 573. The data of each picture of the Base view video and Dependent view video stored in the DPB 573 is output in accordance with the display point-in-time of each picture represented by the Picture Timing SEI.

A specific example of verification will be described.

In the same way as described above, let us say that as the values of the first, second, and third HRD parameters, values representing 40 Mbps, 40 Mbps, and 60 Mbps have been encoded, respectively. Also, as the values of the first, second, and third max_dec_frame_buffering, values representing four sheets, four sheets, and six sheets have been encoded, respectively.

FIG. 83 is a diagram illustrating an example in the event of decoding the Base view video stream alone.

In this case, as illustrated in FIG. 83, the first HRD parameters and the first max_dec_frame_buffering encoded in the Base view video stream are read out by the control unit 551A.

Also, the maximum bit rate of input to the decoder 572 from the CPB 571 is set to 40 Mbps by the control unit 551A based on the first HRD parameters. Further, the maximum number of sheets of pictures that can be stored in the DPB 573 is set to four sheets by the control unit 551A based on the first max_dec_frame_buffering.

In this state, whether or not decoding of the Base view video stream can correctly be performed is verified by the control unit 551A, and information representing the verification results is output. In the event that determination is made that decoding can correctly be performed, the input Base view video stream is determined to be a stream that can be correctly played, based on the first HRD parameters and the first max_dec_frame_buffering encoded thereon, as described with reference to FIG. 75, FIG. 78, and FIG. 80.

Figure 84:
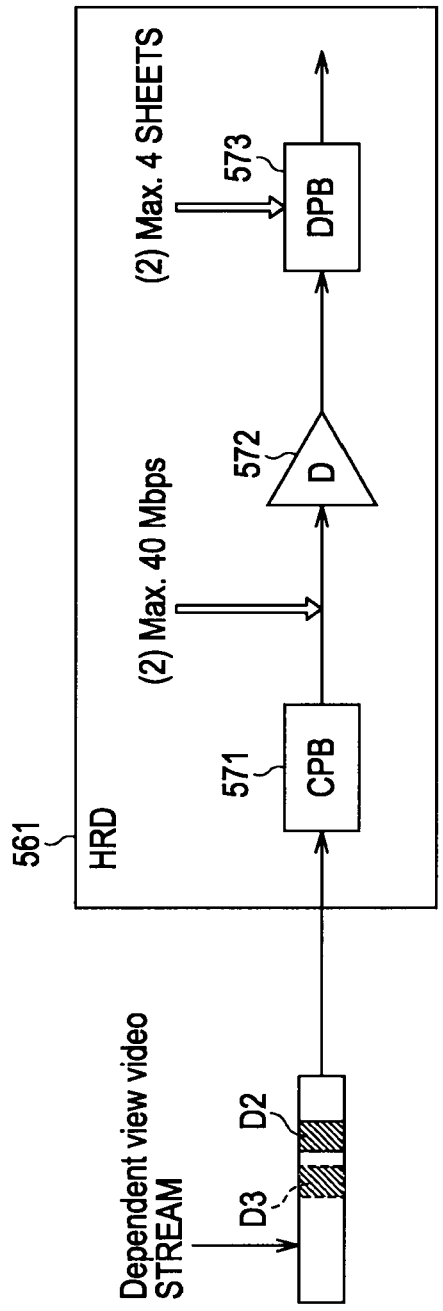
FIG. 84 is a diagram illustrating a verification example.

FIG. 84 is a diagram illustrating an example in the event of decoding the Dependent view video stream alone by the decoder for Dependent view video.

In this case, as illustrated in FIG. 84, the second HRD parameters and the second max_dec_frame_buffering encoded in the Dependent view video stream are read out by the control unit 551A.

Also, the maximum bit rate of input to the decoder 572 from the CPB 571 is set to 40 Mbps by the control unit 551A based on the second HRD parameters. Further, the maximum number of sheets of pictures that can be stored in the DPB 573 is set to four sheets by the control unit 551A based on the second max_dec_frame_buffering.

In this state, whether or not decoding of the Dependent view video stream can correctly be performed is verified by the control unit 551A, and information representing the verification results is output. In the event that determination is made that decoding can correctly be performed, the input Dependent view video stream is, based on the second HRD parameters and the second max_dec_frame_buffering encoded thereon, determined to be a stream that can correctly be played by the decoder for Dependent view video as described with reference to FIG. 80.

Note that, in order to decode the Dependent view video stream, the Base view video stream is necessary. The data of decoded picture of the Base view video stream is input to the decoder 572 in FIG. 84 as appropriate, and is used for decoding of the Dependent view video stream.

Figure 85:
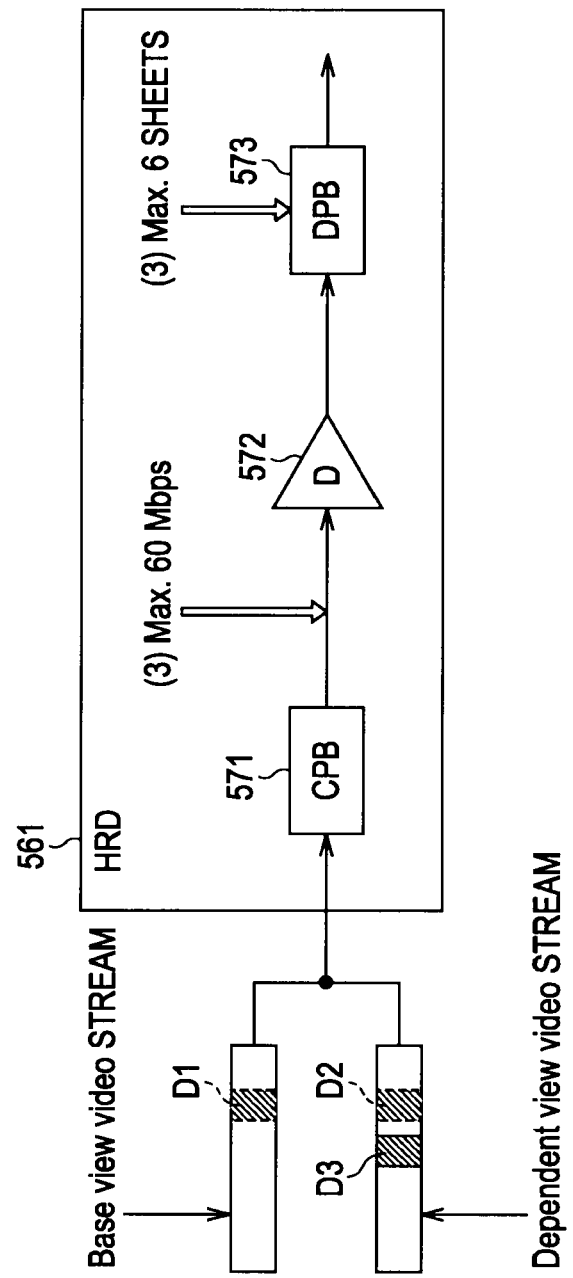
FIG. 85 is a diagram illustrating another verification example.

FIG. 85 is a diagram illustrating an example in the event that the Base view video stream and the Dependent view video stream are decoded by the single decoder.

In this case, as illustrated in FIG. 85, the third HRD parameters and the third max_dec_frame_buffering encoded in the Dependent view video stream are read out by the control unit 551A.

Also, the maximum bit rate of input to the decoder 572 from the CPB 571 is set to 60 Mbps by the control unit 551A based on the third HRD parameters.

Further, the maximum number of sheets of pictures that can be stored in the DPB 573 is set to six sheets by the control unit 551A based on the third max_dec_frame_buffering.

In this state, whether or not decoding of the Base view video stream and the Dependent view video stream can correctly be performed is verified by the control unit 551A, and information representing the verification results is output. In the event that determination is made that decoding can correctly be performed, the input Base view video stream and Dependent view video stream are, based on the third HRD parameters and the third max_dec_frame_buffering, determined to be streams that can correctly be played as described with reference to FIG. 76.

[Position of the View_Type]

With the above description, as described with reference to FIG. 12, the view_type representing whether the Base view video stream is an L image stream or an R image stream is arranged to be described in a PlayList, but may be described in another position.

For example, it can be conceived that the Base view video stream and the Dependent view video stream are multiplexed in the same TS, or are each multiplexed in a different TS, and are transmitted via broadcast waves or a network. In this case, the view_type is described, for example, in PSI that is transmission control information, or in the Base view video stream or Dependent view video stream (elementary stream).

FIG. 86 is a diagram illustrating an example in the event that the view_type is described in a PMT (Program Map Table) included in the PSI (Program Specific Information).

As illustrated in FIG. 86, an arrangement may be made wherein MVC_video_stream_descriptor( ) is newly defined as a descriptor for MVC, and the view_type is described in the MVC_video_stream_descriptor( ). Note that 65 is assigned as the value of a descriptor_tag, for example.

With the playback device 1 which has received a TS, based on the value of the view_type described in the PMT, determination is made whether the Base view video stream multiplexed in the TS is an L image stream or R image stream, and consequently, processing described with reference to FIG. 24 and FIG. 26 is performed, such as switching of the output destination of the decoding results, or the like.

The view_type may be described in another position such as an SIT (Selection Information Table) instead of within the PMT.

Figure 87:
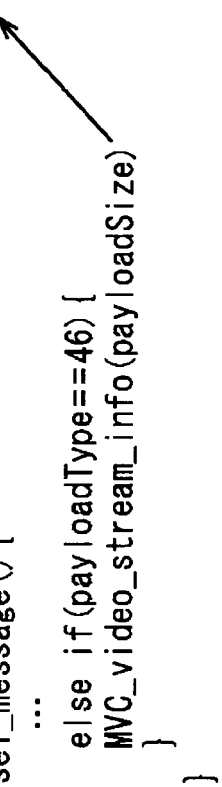
FIG. 87 is a diagram illustrating another description example of the view_type.

FIG. 87 is a diagram illustrating an example in the event that the view_type is described in an elementary stream.

As illustrated in FIG. 87, the view_type may be described in the MVC_video_stream_info( ) within the SEI. As described above, the SEI is additional information to be added to the data of each picture making up the Base view video stream and the Dependent view video stream. The SEI including the view_type is added to each picture of at least one stream of the Base view video stream and the Dependent view video stream.

With the playback device 1 which has read out the SEI, based on the value of the view_type described in the SEI, determination is made whether the Base view video stream is an L image stream or R image stream, and consequently, processing described with reference to FIG. 24 and FIG. 26 is performed, such as switching of the output destination of the decoding results, or the like.

The above-mentioned series of processing may be executed by hardware or may be executed by software. In the event of executing the series of processing by software, a program making up the software thereof is installed from a program recorded medium to a computer housed in dedicated hardware, a general-purpose personal computer, or the like.

Figure 88:
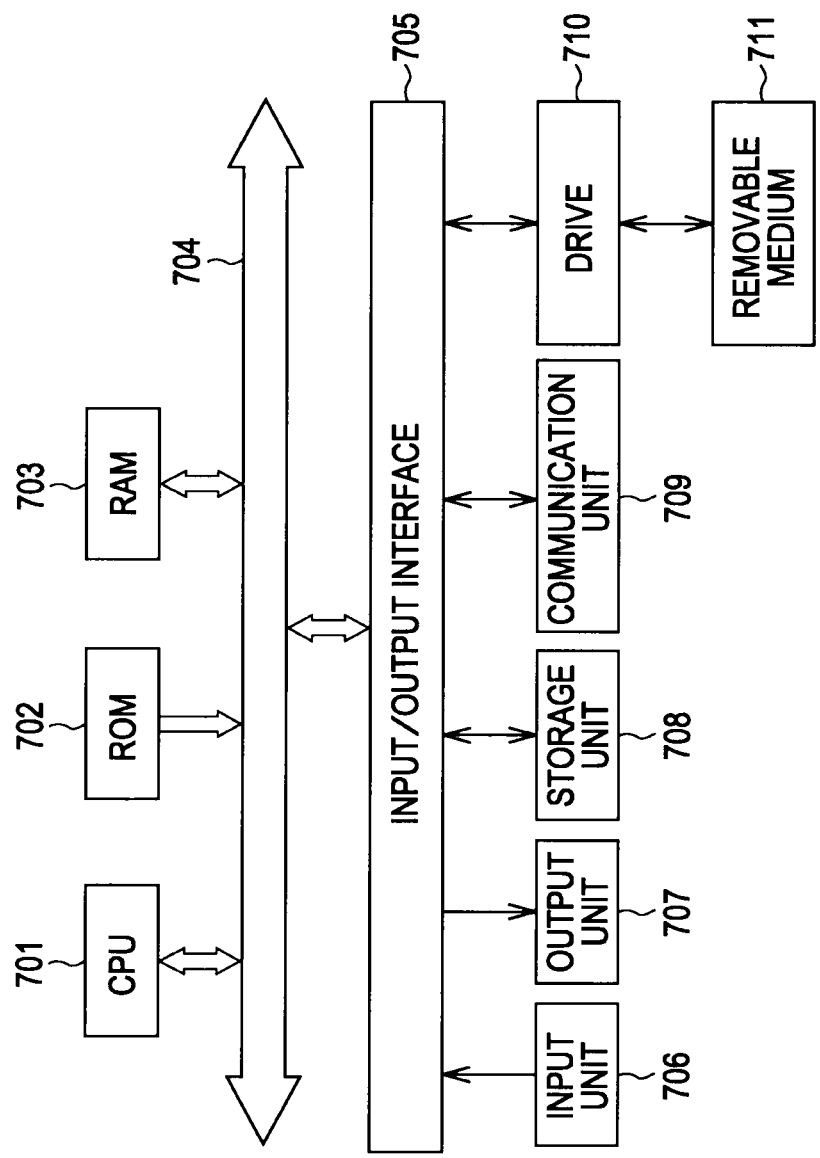
FIG. 88 is a block diagram illustrating a configuration example of the hardware of a computer.

FIG. 88 is a block diagram illustrating a configuration example of the hardware of a computer which executes the above-mentioned series of processing by a program.

A CPU (Central Processing Unit) 701, ROM (Read Only Memory) 702, and RAM (Random Access Memory) 703 are mutually connected by a bus 704.

The bus 704 is further connected with an input/output interface 705. The input/output interface 705 is connected with an input unit 706 made up of a keyboard, mouse, and so forth, and an output unit 707 made up of a display, speaker, and so forth. Also, the bus 704 is connected with a storage unit 708 made up of a hard disk, nonvolatile memory, and so forth, a communication unit 709 made up of a network interface and so forth, and a drive 710 for driving a removable medium 711.

With the computer thus configured, the above-mentioned series of processing is performed, for example, by the CPU 701 loading a program stored in the storage unit 708 to the RAM 703 via the input/output interface 705 and bus 704 and executing this.

The program that the CPU 701 executes is recorded in, for example, the removable medium 711, provided via a cable or wireless transmission medium such as a local area network, the Internet, digital broadcasting, or the like, and installed in the storage unit 708.

Note that the program that the computer executes may be a program for performing processing in time sequence in accordance with the sequence described in the present Specification, or may be a program for performing processing in parallel or at necessary timing such as call-up being performed, or the like.

Embodiments of the present invention are not restricted to the above embodiments, and various types of modifications can be made without departing from the essence of the present invention.

Reference Signs List 1 playback device, 2 optical disc, 3 display device, 11 MVC encoder, 21 H.264/AVC encoder, 22 H.264/AVC decoder, 23 Depth calculating unit, 24 Dependent view video encoder, 25 multiplexer, 51 controller, 52 disk drive, 53 memory, 54 local storage, 55 internet interface, 56 decoder unit, 57 operation input unit

The invention claimed is:

1. A playback device comprising:
an obtaining circuit configured to obtain access unit data that includes basic view video and dependent view video, the dependent view video including a header with a view identifier that identifies which of the basic view video and the dependent view video is a left view video and which of the basic view video and the dependent view video is a right view video, the view identifier is not included in a header of the basic view video;
a decoding circuit configured to decode the basic view video and the dependent view video obtained by the obtaining circuit from the access unit data; and
a switching circuit configured to process the view identifier from the header and switch an output destination of the decoded basic view video and the decoded dependent view video between a left video plane and a right video plane based on the processed view identifier.

2. The playback device according to claim 1, further comprising:
a first generating circuit configured to generate a left image plane; and
a second generating circuit configured to generate a right image plane, wherein
the switching circuit is further configured to switch the output destination of the decoded basic view video and the decoded dependent view video between the first generating circuit and the second generating circuit for generation of the left image plane and the right image plane based on the processed view identifier.

3. The playback device according to claim 1, wherein the switching circuit is further configured to identify which of the basic view video and the dependent view video is the left video plane and which of the basic view video and the dependent view video is the right video plane based on PIDs.

4. The playback device according to claim 1, wherein the obtaining circuit is further configured to
read out and obtain the access unit data that includes the basic view video and the dependent view video from a mounted recording medium, and
read out playback control information to be used for playback control of the basic view video and the dependent view video from the recording medium, and
the switching circuit is further configured to process the view identifier and switch the output destination of the decoded basic view video and the decoded dependent view video based on the view identifier processed from the header of the dependent view video read out from the recording medium by the obtaining circuit.

5. The playback device according to claim 1, wherein the obtaining circuit is further configured to obtain additional information in which the view identifier is described, and
the switching circuit is further configured to process the view identifier and switch the output destination of the decoded basic view video and the decoded dependent view video based on the view identifier processed from the header of the dependent view video obtained by the obtaining circuit.

6. The playback device according to claim 5, wherein the obtaining circuit is further configured to obtain the additional information in which the view identifier is described and been broadcast.

7. The playback device according to claim 1, wherein the obtaining circuit is further configured to
receive and obtain the access unit data that includes the basic view video and dependent view video which have been transmitted, and
receive transmission control information to be used for transmission control of the basic view video and dependent view video.

8. The playback device according to claim 7, wherein the obtaining circuit is further configured to receive and obtain the basic view video and dependent view video which have been transmitted via broadcast waves.

9. The playback device according to claim 1, wherein the switching circuit is further configured to
identify the decoded dependent view video when a viewpoint of an identification information is set, and
identify the decoded basic view video when the viewpoint of the identification information is not set.

10. The playback device according to claim 1, further comprising circuitry configured to remove the header with the view identifier from the dependent view video.

11. The playback device according to claim 1, wherein
the header of the dependent view video obtained by the obtaining unit further includes dimensional information that indicates whether the playlist file is for only a 2D playback output mode, for only a first type of 3D playback output mode, or for only a second type of 3D playback output mode, and
the decoding circuit is further configured to decode the basic view video and the dependent view video in accordance with the dimensional information included in the header of the dependent view video obtained by the obtaining unit.

12. A playback method comprising:
obtaining access unit data that includes basic view video and dependent view video, the dependent view video including a header with a view identifier that identifies which of the basic view video and the dependent view video is a left view video and which of the basic view video and the dependent view video is a right view video, the view identifier is not included in a header of the basic view video;
decoding the basic view video and the dependent view video which have been obtained from the access unit data;
processing the view identifier from the header; and
switching an output destination of the decoded basic view video and the decoded dependent view video between a left video plane and a right video plane based on the processed view identifier.

13. The playback method according to claim 12, further comprising:
generating a left image plane; and
generating a right image plane, wherein
the output destination of the decoded basic view video and the decoded dependent view video is switched between the left image plane and the right image plane based on the view identifier from the header.

14. The playback method according to claim 12, further comprising:
removing the header with the view identifier from the dependent view video.

15. The playback method according to claim 12, wherein
the header of the dependent view video that is obtained further includes dimensional information that indicates whether the playlist file is for only a 2D playback output mode, for only a first type of 3D playback output mode, or for only a second type of 3D playback output mode, and
the basic view video and the dependent view video are decoded in accordance with the dimensional information included in the header of the dependent view video obtained by the obtaining unit.

16. A non-transitory computer readable medium that stores computer readable instructions that, when executed by a computer, cause the computer to execute a method comprising:
obtaining access unit data that includes basic view video and dependent view video, the dependent view video including a header with a view identifier that identifies which of the basic view video and the dependent view video is a left view video and which of the basic view video and the dependent view video is a right view video, the view identifier is not included in a header of the basic view video;
decoding the basic view video and the dependent view video which have been obtained from the access unit data; and
processing the view identifier from the header; and
switching an output destination of the decoded basic view video and the decoded dependent view video between a left video plane and a right video plane based on the processed view identifier.

17. The non-transitory computer readable medium according to claim 16, wherein the method further comprises:
generating a left image plane; and
generating a right image plane, wherein
the output destination of the decoded basic view video and the decoded dependent view video is switched between the left image plane and the right image plane based on the view identifier from the header.

18. The non-transitory computer readable medium according to claim 16, wherein the method further comprises:
removing the header with the view identifier from the dependent view video.

19. The non-transitory computer readable medium according to claim 16, wherein
the header of the dependent view video that is obtained further includes dimensional information that indicates whether the playlist file is for only a 2D playback output mode, for only a first type of 3D playback output mode, or for only a second type of 3D playback output mode, and
the basic view video and the dependent view video are decoded in accordance with the dimensional information included in the header of the dependent view video obtained by the obtaining unit.

* * * * *